United States Patent
Kim et al.

(10) Patent No.: US 9,930,358 B2
(45) Date of Patent: Mar. 27, 2018

(54) METHOD AND APPARATUS FOR ENCODING/DECODING IMAGES USING ADAPTIVE MOTION VECTOR RESOLUTION

(75) Inventors: Sunyeon Kim, Seoul (KR); Jeongyeon Lim, Gyeonggi-do (KR); Joohee Moon, Seoul (KR); Yunglyul Lee, Seoul (KR); Haekwang Kim, Seoul (KR); Byeungwoo Jeon, Gyeonggi-do (KR); Juock Lee, Seoul (KR); Dongwon Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 1102 days.

(21) Appl. No.: 13/391,568

(22) PCT Filed: Aug. 21, 2010

(86) PCT No.: PCT/KR2010/005571
§ 371 (c)(1),
(2), (4) Date: Apr. 28, 2012

(87) PCT Pub. No.: WO2011/021914
PCT Pub. Date: Feb. 24, 2011

(65) Prior Publication Data
US 2012/0224635 A1 Sep. 6, 2012

(30) Foreign Application Priority Data
Aug. 21, 2009 (KR) .................. 10-2009-0077452
Aug. 20, 2010 (KR) .................. 10-2010-0081099

(51) Int. Cl.
H04N 7/34 (2006.01)
H04N 19/517 (2014.01)
(Continued)

(52) U.S. Cl.
CPC .......... *H04N 19/517* (2014.11); *H04N 19/46* (2014.11); *H04N 19/463* (2014.11); *H04N 19/523* (2014.11); *H04N 19/91* (2014.11)

(58) Field of Classification Search
None
See application file for complete search history.

(56) References Cited

U.S. PATENT DOCUMENTS 8,385,420 B2 * 2/2013 Lee et al. ............. 375/240.16
2004/0234144 A1 * 11/2004 Sugimoto ............ H04N 19/176
382/239
(Continued)

FOREIGN PATENT DOCUMENTS

KR 10-2006-0085004 7/2006
KR 10-2008-0009608 1/2008
KR 10-2008-0104385 12/2008

OTHER PUBLICATIONS

International Search Report dated Apr. 21, 2011 for PCT/KR2010/005571.

*Primary Examiner* — Edemio Navas, Jr.
(74) *Attorney, Agent, or Firm* — Hauptman Ham, LLP

(57) ABSTRACT

The present disclosure relates to a method and apparatus for improving the encoding efficiency by adaptively changing the resolution of the motion vector in the inter prediction encoding and inter prediction decoding of a video. The apparatus includes: a predicted motion vector calculator for calculating a predicted motion vector of a current block to be encoded using motion vectors of one or more surrounding blocks; and a skip mode encoder for encoding a result of performing a prediction of the current block and information indicating that the current block is a skip block when the predicted motion vector satisfies a skip condition, wherein at least one motion vector among the motion vectors of the surrounding blocks and the motion vector of the current (Continued)

block has a resolution different from resolutions of the other motion vectors.

20 Claims, 40 Drawing Sheets

(51) Int. Cl.
*H04N 19/46* (2014.01)
*H04N 19/463* (2014.01)
*H04N 19/91* (2014.01)
*H04N 19/523* (2014.01)

(56) References Cited

U.S. PATENT DOCUMENTS

| | | | |
|---|---|---|---|
| 2005/0013372 A1* | 1/2005 | Srinivasan | H04N 19/513 375/240.16 |
| 2005/0286635 A1* | 12/2005 | Kumar et al. | 375/240.16 |
| 2006/0018381 A1* | 1/2006 | Luo et al. | 375/240.16 |
| 2006/0126952 A1* | 6/2006 | Suzuki | G06T 5/002 382/233 |
| 2006/0262979 A1* | 11/2006 | Srinivasan et al. | 382/232 |
| 2008/0049835 A1* | 2/2008 | Kimoto | 375/240.11 |
| 2008/0117976 A1* | 5/2008 | Lu et al. | 375/240.16 |
| 2008/0152000 A1* | 6/2008 | Kaushik | 375/240.03 |
| 2008/0175322 A1* | 7/2008 | Lee | H04N 19/523 375/240.16 |
| 2008/0247462 A1* | 10/2008 | Demos | 375/240.03 |
| 2009/0109342 A1* | 4/2009 | Heng et al. | 348/699 |

\* cited by examiner

*FIG. 2*

| Code Num | Code Word |
|---|---|
| 0 | 0 |
| 1 | 10 |
| 2 | 110 |
| 3 | 1110 |
| 4 | 11110 |
| 5 | 111110 |
| 6 | 1111110 |
| 7 | 11111110 |
| 8 | 111111110 |
| 9 | 1111111110 |
| 10 | 1111111111 |

*FIG. 4*

| Code Num | K=0 | K=1 | K=2 |
|---|---|---|---|
| 0 | 0 | 00 | 000 |
| 1 | 100 | 01 | 001 |
| 2 | 101 | 1000 | 010 |
| 3 | 11000 | 1001 | 011 |
| 4 | 11001 | 1010 | 10000 |
| 5 | 11010 | 1011 | 10001 |
| 6 | 11011 | 110000 | 10010 |
| 7 | 1110000 | 110001 | 10011 |
| 8 | 1110001 | 110010 | 10100 |
| 9 | 1110010 | 110011 | 10101 |
| 10 | 1110011 | 110100 | 10110 |
| ⋮ | ⋮ | ⋮ | ⋮ |

*FIG. 5*

| \|mvd\| | Code Word | |
|---|---|---|
| | Truncated Unary | $3^{th}$ order Exp-Golomb |
| 0 | 0 | |
| 1 | 10 | |
| 2 | 110 | |
| 3 | 1110 | |
| 4 | 11110 | |
| 5 | 111110 | |
| 6 | 1111110 | |
| 7 | 11111110 | |
| 8 | 111111110 | |
| 9 | 111111111 | 0000 |
| 10 | 111111111 | 0001 |
| 11 | 111111111 | 0010 |
| 12 | 111111111 | 0011 |
| 13 | 111111111 | 0100 |
| 14 | 111111111 | 0101 |
| 15 | 111111111 | 0110 |
| 16 | 111111111 | 0111 |
| 17 | 111111111 | 100000 |
| 18 | 111111111 | 100001 |
| ⋮ | ⋮ | ⋮ |

FINAL BITS: 1 0 1/2 1 0 1/4 1 1 0 1/8 0 1/8 1 0 1/4 0 1/8 0 1/8 0 1/8 1/4 1/2 1/4 1/4 1/4 1/8 1/4 1/2

| | | | | | | | |
|---|---|---|---|---|---|---|---|
| 1/2 | 1/2 | 1/2 | 1/2 | 1/4 | 1/2 | 1/8 | 1/8 |
| 1/2 | 1/2 | 1/2 | 1/2 | 1/4 | 1/4 | 1/8 | 1/8 |
| 1/2 | 1/2 | 1/2 | 1/2 | 1/8 | 1/8 | 1/4 | 1/8 |
| 1/2 | 1/2 | 1/2 | 1/2 | 1/8 | 1/8 | 1/4 | 1/2 |
| 1/4 | 1/4 | 1/4 | 1/4 | 1/4 | 1/4 | 1/8 | 1/8 |
| 1/4 | 1/4 | 1/4 | 1/4 | 1/4 | 1/4 | 1/8 | 1/8 |
| 1/4 | 1/4 | 1/4 | 1/4 | 1/8 | 1/8 | 1/8 | 1/8 |
| 1/4 | 1/4 | 1/4 | 1/4 | 1/8 | 1/8 | 1/8 | 1/8 |

*FIG. 12*

| 1/2 | 1/4 | 1/4 | 1/8 | 1/4 | 1/4 | 1/8 | 1/4 |
|-----|-----|-----|-----|-----|-----|-----|-----|
| 1/8 | 1/4 | 1/8 | 1/4 | 1/4 | 1/8 | 1/8 | 1/8 |
| 1/8 | 1/8 | 1/4 | 1/8 | 1/8 | 1/4 | 1/8 | 1/8 |
| 1/8 | 1/8 | 1/8 | 1/8 | 1/4 | 1/4 | 1/8 | 1/8 |
Level 3
| 1/2 | 1/4 | 1/4 | 1/4 |
|-----|-----|-----|-----|
| 1/8 | 1/4 | 1/4 | 1/8 |
Level 2
| 1/2 | 1/4 |
|-----|-----|
Level 1
| 1/2 |
|-----|
Level 0
*FIG. 13*

| 0111 (0,0) | 01 (0,1) | 011 (0,2) | 01 (0,3) | 0111 (0,4) | 1 (0,5) | 101 (0,6) | 1 (0,7) |
|---|---|---|---|---|---|---|---|
| 001 (1,0) | 01 (1,1) | 01 (1,2) | 1 (1,3) | 1 (1,4) | 01 (1,5) | 01 (1,6) | 01 (1,7) |
| 0011 (2,0) | 1 (2,1) | 011 (2,2) | 01 (2,3) | 101 (2,4) | 1 (2,5) | 011 (2,6) | 1 (2,7) |
| 1 (3,0) | 1 (3,1) | 01 (3,2) | 01 (3,3) | 1 (3,4) | 1 (3,5) | 1 (3,6) | 1 (3,7) |

*FIG. 14*

|           | (10, 7) ⅛ | (5, 10) ⅛ |
|-----------|-----------|-----------|
| (4, 5) ½  | Current Block |       |

*FIG. 16*

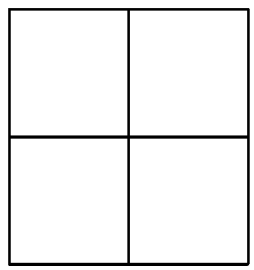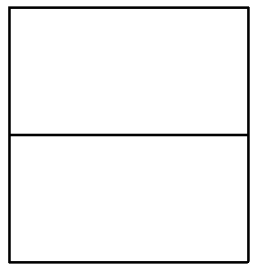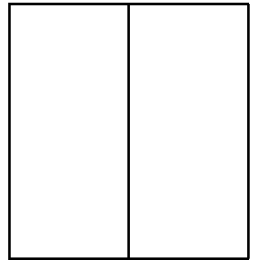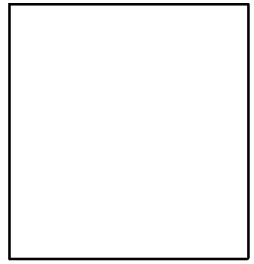
FIG. 20

| Symbol | BIT STRING |
|--------|------------|
| (1)    | 1          |
| (2)    | 00         |
| (3)    | 01         |

FIG. 21

|                      | B<br>1/4<br>(36/4, -28/4) | C<br>1/8<br>(136/8, -104/8) |
|----------------------|---------------------------|------------------------------|
| A<br>1/2<br>(4/2, -8/2) | X<br>1/4<br>(16/4, 20/4) |                              |

FIG. 22

| CURRENT RESOLUTION \ SURROUNDING RESOLUTION | 1/2 | 1/4 | 1/8 |
|---|---|---|---|
| 1/2 | (x, y) | (x×2, y×2) | (x×4, y×4) |
| 1/4 | (round(x/2), round(y/2)) | (x,y) | (x×2, y×2) |
| 1/8 | (round(x/4), round(y/4)) | (round(x/2), round(y/2)) | (x,y) |

*FIG. 23*

| RESOLUTION OF CURRENT BLOCK | A | B | C |
|---|---|---|---|
| 1/4 | (16/4, -32/4) | (36/4, -28/4) | (32/4, -28/4) |

*FIG. 24*

| CODE NUMBER \ MOTION VECTOR RESOLUTION | 1/2 | 1/4 | 1/8 |
|---|---|---|---|
| 0 | 0 | 0 | 0 |
| 1 | 1/2 | 1/4 | 1/8 |
| 2 | 1 | 2/4 | 2/8 |
| 3 | 3/2 | 3/4 | 3/8 |
| 4 | 2 | 1 | 4/8 |
| 5 | 4/2 | 5/4 | 5/8 |
| ⋮ | ⋮ | ⋮ | ⋮ |

*FIG. 25*

|  | B (7/8, -6/8) | C (1/8, -2/8) |
|---|---|---|
| A (2/8, 1/8) | X (1/8, -4/8) |  |

*FIG. 26*

| CODE NUMBER \ DIFFERENTIAL MOTION VECTOR RESOLUTION | 1 | 1/2 | 1/4 | 1/8 |
|---|---|---|---|---|
| 0 | 0 | 0 | 0 | 0 |
| 1 | 1 | 1/2 | 1/4 | 1/8 |
| 2 | 2 | 3/2 | 3/4 | 3/8 |
| 3 | 3 | 5/2 | 5/4 | 5/8 |
| 4 | 4 | 7/2 | 7/4 | 7/8 |
| 5 | 5 | 9/2 | 9/4 | 9/8 |
| ⋮ | ⋮ | ⋮ | ⋮ | ⋮ |

FIG. 27

|  | B<br>(9/4, -7/4) | C<br>(1, -1) |
|---|---|---|
| A<br>(2/4, -1) | X<br>(4/8, 5/8) |  |

FIG. 28

| CODE NUMBER / DIFFERENTIAL REFERENCE MOTION VECTOR RESOLUTION | 1 | 1/2 | 1/4 | 1/8 |
|---|---|---|---|---|
| 0 | 0 | 0 | 0 | 0 |
| 1 | 1 | 1/2 | 1/4 | 1/8 |
| 2 | 2 | 1 | 2/4 | 2/8 |
| 3 | 3 | 3/2 | 3/4 | 3/8 |
| 4 | 4 | 2 | 1 | 4/8 |
| 5 | 5 | 5/2 | 5/4 | 5/8 |
| ⋮ | ⋮ | ⋮ | ⋮ | ⋮ |

| REFERENCE PICTURE INDEX | REFERENCE PICTURE NO. | RESOLUTION |
|---|---|---|
| 0 | 4 | 1/4 |
| 1 |   | 1/8 |
| 2 | 3 | 1/4 |
| 3 |   | 1/8 |
| 4 | 2 | 1/4 |
| 5 |   | 1/8 |
| 6 | 1 | 1/4 |
| 7 |   | 1/8 |

*FIG. 31*

| RESOLUTION | RESOLUTION IDENTIFICATION FLAG |
|---|---|
| 1/2 | 0 |
| 1/4 | 1 |

*FIG. 33*

|   | B | C |
|---|---|---|
| A | X |   |

*FIG. 34*

| CONDITION | CONTEXT MODEL INDEX |
|---|---|
| WHEN BOTH A & B CORRESPOND TO 1/2 RESOLUTION | 0 |
| WHEN ONLY ONE OF A & B CORRESPONDS TO 1/2 RESOLUTION | 1 |
| WHEN BOTH A & B CORRESPOND TO 1/4 RESOLUTION | 2 |

*FIG. 35*

| RESOLUTION | RESOLUTION IDENTIFICATION FLAG |
|---|---|
| 1/4 | 0 |
| 1/2 | 10 |
| 1/8 | 11 |

*FIG. 36*

| BINIDX | CONDITION | CONTEXT MODEL INDEX |
|---|---|---|
| 0 | WHEN BOTH A & B CORRESPOND TO 1/4 RESOLUTION | 0 |
| | WHEN ONLY ONE OF A & B CORRESPONDS TO 1/4 RESOLUTION | 1 |
| | WHEN NEITHER OF A & B CORRESPONDS TO 1/4 RESOLUTION | 2 |
| 1 | WHEN A & B CORRESPOND TO 1/2 RESOLUTION & 1/8 RESOLUTION, RESPECTIVELY, OR WHEN BOTH A & B CORRESPOND TO 1/4 RESOLUTION | 3 |
| | WHEN BOTH A & B CORRESPOND TO 1/2 RESOLUTION | 4 |
| | WHEN BOTH A & B CORRESPOND TO 1/8 RESOLUTION | 5 |

FIG. 37

| CONDITION | ADAPTABILITY DEGREE |
|---|---|
| REFERENCE PICTURE NEAREST TO CURRENT PICTURE | 1/1, 1/2, 1/4, 1/8 |
| REFERENCE PICTURE FARTHEST FROM CURRENT PICTURE | 1/2, 1/4 |
| REFERENCE PICTURE NEITHER NEAREST TO NOR FARTHEST FROM CURRENT PICTURE | 1/2, 1/4, 1/8 |

FIG. 38

| CONDITION | ADAPTABILITY DEGREE (RESOLUTION SET) |
|---|---|
| REFERENCE PICTURE NEAREST TO CURRENT PICTURE | 1/2, 1/4, 1/8 |
| REFERENCE PICTURE FARTHEST FROM CURRENT PICTURE | 1/4 |
| REFERENCE PICTURE NEITHER NEAREST TO NOR FARTHEST FROM CURRENT PICTURE | 1/2, 1/4 |

*FIG. 39*

| RESOLUTION SET INDEX | RESOLUTION ADAPTABILITY (RESOLUTION SET) |
|---|---|
| 0 | 1/4 |
| 1 | 1/2, 1/8 |
| 2 | 1/4, 1/8 |

*FIG. 40*

| RESOLUTION SET | PICTURE NUMBER |
|---|---|
| (1/2, 1/4) | 0, 2, 4, 6, 8, 10, 12, 14, 16 |
| 1/4 | 1, 3, 5, 7, 9, 11, 13, 15 |

| D (1/4) | B (1/4) | C (1/4) |
|---|---|---|
| A (1/8) | X (1/4) | |

FIG. 43

| D (1/4) | B (1/4) | C (1/4) |
|---|---|---|
| A (1/8) | X (1/2) | |

FIG. 44

| RESOLUTION SET | RESOLUTION IDENTIFICATION FLAG |
|---|---|
| 1/8 | 0 |
| 1/4 | - |
| 1/2 | 1 |

*FIG. 45*

| D (1/4) | B (1/4) | C (1/4) |
|---|---|---|
| A (1/2) | X (1/4) | |

*FIG. 46*

| | B<br>1/4<br>(36/4, -28/4) | C<br>1/8<br>(136/8, -104/8) |
|---|---|---|
| A<br>1/2<br>(4/2, -8/2) | X<br>1/4 | |

FIG. 49

| RESOLUTION OF CURRENT BLOCK | A | B | C |
|---|---|---|---|
| 1/4 | (16/4, -32/4) | (36/4, -28/4) | (32/4, -28/4) |

FIG. 50

METHOD AND APPARATUS FOR ENCODING/DECODING IMAGES USING ADAPTIVE MOTION VECTOR RESOLUTION

CROSS REFERENCE TO RELATED APPLICATION

This application claims the priority of Korean Patent Application No. 10-2009-0077452, filed on Aug. 21, 2009; and Korean Patent Application No. 10-2010-0081099, filed on Aug. 20, 2010 in the KIPO (Korean Intellectual Property Office). Further, this application is the National Phase application of International Application No. PCT/KR2010/005571 filed Aug. 21, 2010, which designates the United States and was published in Korean.

CROSS-REFERENCE TO RELATED APPLICATION

If applicable, this application claims priorities under 35 U.S.C § 119(a) of Patent Application No. 10-2009-0077452, filed on Aug. 21, 2009 and Patent Application No. 10-2010-0081099, filed on Aug. 20, 2010 in Korea, the entire contents of which are incorporated herein by reference. In addition, this non-provisional application claims priorities in countries, other than the U.S., with the same reason based on the Korean Patent Applications, the entire contents of which are hereby incorporated by reference.

TECHNICAL FIELD

The present disclosure relates to a method and an apparatus for encoding/decoding images using adaptive motion vector resolution. More particularly, the present disclosure relates to a method and an apparatus for improving the encoding efficiency by adaptively changing the resolution of the motion vector in the inter prediction encoding and inter prediction decoding of a video.

BACKGROUND ART

The statements in this section merely provide background information related to the present disclosure and may not constitute prior art.

Encoding of data for a video generally involves an intra prediction encoding and an inter prediction encoding. The intra prediction encoding and the inter prediction encoding are effective methods capable of reducing the correlation existing between multiple pieces of data, which are widely used in various data compressions. Especially, in the inter prediction encoding, since a motion vector of a current block determined through estimation of the motion of the current block to be currently encoded has a close relation with motion vectors of the surrounding blocks, a predicted motion vector (PMV) for the motion vector of the current block is first calculated from the motion vectors of the surrounding blocks and only a differential motion vector (DMV) for the PMV is encoded instead of encoding the motion vector of the current block itself, so as to considerably reduce the quantity of bits to be encoded and thus improve the encoding efficiency.

That is, in the case of performing the inter prediction encoding, an encoder encodes and transmits only a DMV corresponding to a differential value between the current motion vector and a PMV determined through estimation of the motion of the current block from a reference frame, which has been reconstructed through previous encoding and decoding. A decoder reconstructs the current motion vector by adding the PMV and the DMV transmitted based on a prediction of the motion vector of the current block using the motion vectors of the surrounding blocks previously decoded.

Further, at the time of performing the inter prediction encoding, the resolution may be enhanced en bloc through interpolation of the reference frame, and a DMV corresponding to a differential value between the current motion vector and a PMV determined through estimation of the motion of the current block may then be encoded and transmitted. In this event, the enhancement of the resolution of a reference video (i.e. the video of the reference frame) enables a more exact inter prediction and thus reduces the quantity of bits generated by the encoding of the residual signal between the original video and a predicted video. However, the enhancement of the resolution of the reference video also causes an enhancement of the resolution of the motion vector, which increases the quantity of bits generated by the encoding of the DMV. In contrast, although a decrease of the resolution of the reference video increases the quantity of bits generated by the encoding of the residual signal, it decreases the resolution of the motion vector, resulting in the corresponding decrease of the quantity of bits generated by encoding of the DMV.

As described above, since the conventional inter prediction encoding uses motion vectors of the same resolution obtained by interpolating all video encoding units, such as blocks, slices, and pictures, of a video with the same resolution, it is difficult for the conventional inter prediction encoding to achieve an efficient encoding, which may degrade the compression efficiency.

DISCLOSURE

Technical Problem

Therefore, the present disclosure has been made in view of the above mentioned problems to improve the encoding efficiency by adaptively changing the resolution of the motion vector in the inter prediction encoding and inter prediction decoding of a video.

Technical Solution

An aspect of the present disclosure provides an apparatus for encoding/decoding a video, the apparatus including: a video encoder for calculating a predicted motion vector of a current block to be encoded by using motion vectors of one or more surrounding blocks, and encoding a result of performing a prediction of the current block and information indicating that the current block is a skip block when the predicted motion vector satisfies a skip condition; and a video decoder for decoding information indicating that a current block to be decoded is a skip block, calculating a predicted motion vector of the current block to be decoded by using motion vectors of one or more surrounding blocks, selecting the calculated predicted motion vector as a motion vector of the current block to be decoded, and decoding the current block in a skip mode by using the motion vector of the current block, wherein at least one motion vector among the motion vectors of the surrounding blocks and the motion vector of the current block has a resolution different from resolutions of the other motion vectors.

Another aspect of the present disclosure provides an apparatus for encoding a video in a skip mode, the apparatus including: a predicted motion vector calculator for calculating a predicted motion vector of a current block to be encoded by using motion vectors of one or more surrounding blocks; and a skip mode encoder for encoding a result of prediction of the current block and information indicating that the current block is a skip block when the predicted motion vector satisfies a skip condition, wherein at least one motion vector among the motion vectors of the surrounding blocks and the motion vector of the current block has a resolution different from resolutions of the other motion vectors.

Yet another aspect of the present disclosure provides an apparatus for encoding a video in a skip mode, the apparatus including: a predicted motion vector calculator for calculating a predicted motion vector of a current block to be encoded by using motion vectors of one or more surrounding blocks; a skip mode encoder for encoding a result of performing a prediction of the current block and information indicating that the current block is a skip block when the predicted motion vector satisfies a skip condition; and a resolution encoder for encoding information indicating a resolution of a motion vector of the current block.

Yet another aspect of the present disclosure provides an apparatus for decoding a video, the apparatus including: a skip information extractor for decoding information indicating that a current block to be decoded is a skip block; a predicted motion vector calculator for obtaining a predicted motion vector of the current block to be decoded by using motion vectors of one or more surrounding blocks; and a skip block decoder for selecting the predicted motion vector as a motion vector of the current block and decoding the current block in a skip mode by using the motion vector of the current block, wherein at least one motion vector among the motion vectors of the surrounding blocks and the motion vector of the current block has a resolution different from resolutions of the other motion vectors.

Yet another aspect of the present disclosure provides an apparatus for decoding a video in a skip mode, the apparatus including: a skip information extractor for decoding information indicating that a current block to be decoded is a skip block; a resolution decoder for decoding information indicating a resolution of a motion vector; a predicted motion vector calculator for obtaining a predicted motion vector of the current block to be decoded by using motion vectors of one or more surrounding blocks and the information indicating the resolution of the motion vector; and a skip block decoder for selecting the calculated predicted motion vector as a motion vector of the current block to be decoded and decoding the current block in the skip mode by using the motion vector of the current block.

Yet another aspect of the present disclosure provides a method for encoding/decoding a video, the method including: encoding a video by calculating a predicted motion vector of a current block to be encoded by using motion vectors of one or more surrounding blocks, and encoding a result of performing a prediction of the current block and information indicating that the current block is a skip block when the predicted motion vector satisfies a skip condition; and decoding a video by decoding information indicating that a current block to be decoded is a skip block, calculating a predicted motion vector of the current block to be decoded by using motion vectors of one or more surrounding blocks, selecting the predicted motion vector as a motion vector of the current block to be decoded, and decoding the current block in a skip mode by using the motion vector of the current block, wherein at least one motion vector among the motion vectors of the surrounding blocks and the motion vector of the current block has a resolution different from resolutions of the other motion vectors.

Yet another aspect of the present disclosure provides a method for encoding a video in a skip mode, the method including: calculating a predicted motion vector of a current block to be encoded by using motion vectors of one or more surrounding blocks; and encoding a skip mode by encoding a result of performing a prediction of the current block and information indicating that the current block is a skip block when the predicted motion vector satisfies a skip condition, wherein at least one motion vector among the motion vectors of the surrounding blocks and the motion vector of the current block has a resolution different from resolutions of the other motion vectors.

Yet another aspect of the present disclosure provides a method for encoding a video in a skip mode, the method including: calculating a predicted motion vector of a current block to be encoded by using motion vectors of one or more surrounding blocks; encoding a skip mode by encoding a result of performing a prediction of the current block and information indicating that the current block is a skip block when the predicted motion vector satisfies a skip condition; and encoding a resolution by encoding information indicating a resolution of a motion vector of the current block.

Yet another aspect of the present disclosure provides a method for decoding a video in a skip mode, the method including: extracting skip information by decoding information indicating that a current block to be decoded is a skip block; calculating a predicted motion vector of the current block to be decoded by using motion vectors of one or more surrounding blocks; and decoding a skip block by selecting the predicted motion vector as a motion vector of the current block to be decoded and decoding the current block in the skip mode by using the motion vector of the current block, wherein at least one motion vector among the motion vectors of the surrounding blocks and the motion vector of the current block has a resolution different from resolutions of the other motion vectors.

Yet another aspect of the present disclosure provides a method for decoding a video in a skip mode, the method including: extracting skip information by decoding information indicating that a current block to be decoded is a skip block; decoding a resolution by decoding information indicating a resolution of a motion vector; calculating a predicted motion vector of the current block to be decoded by using motion vectors of one or more surrounding blocks and the information indicating the resolution of the motion vector; and decoding a skip block by selecting the predicted motion vector as a motion vector of the current block and decoding the current block in the skip mode by using the motion vector of the current block.

Advantageous Effects

According to the present disclosure as described above, a video can be encoded efficiently through an inter prediction encoding of the video while adaptively changing the resolution of the motion vector in the unit of a predetermined area.

DESCRIPTION OF DRAWINGS

FIG. 2 is an exemplary diagram for illustrating the process of interpolating a reference picture, FIG. 4 shows an example of truncated unary codes wherein a maximum value T thereof is 10, FIG. 5 shows an example of the 0-th, first, and second order Exp-Golomb codes, FIG. 6 shows an example of the Concatenated Truncated Unary/K-th Order Exp-Golomb Code wherein the maximum value T is 9 and K is 3, FIGS. 10A to 10C are exemplary diagrams for illustrating motion vector resolutions hierarchically expressed by a Quadtree structure according to an aspect of the present disclosure, FIG. 12 illustrates motion vector resolutions of areas determined according to an aspect of the present disclosure, FIG. 13 illustrates an example of motion vector resolution hierarchically expressed in a tag tree structure according to an aspect of the present disclosure, FIG. 14 illustrates a result of the encoding of the motion vector resolutions hierarchically expressed in a tag tree structure according to an aspect of the present disclosure, FIG. 16 is a view for illustrating the process of predicting a predicted motion vector according to an aspect of the present disclosure, FIG. 20 illustrates another scheme of dividing a node into lower layers according to an aspect of the present disclosure, FIG. 21 illustrates an example of a bit string allocated to each of symbols depending on the motion vector resolutions according to an aspect of the present disclosure, FIG. 22 illustrates optimum motion vectors of a current block and surrounding blocks in order to describe a process of determining a resolution of a motion vector, FIG. 23 illustrates a table showing conversion formulas according to the motion vector resolution, FIG. 24 illustrates a table showing the resolutions of motion vectors of surrounding blocks converted based on block X to be currently encoded, FIG. 25 illustrates a code number table of a differential motion vector according to the motion vector resolutions, FIG. 26 illustrates optimum motion vectors of a current block and surrounding blocks in order to describe a process of determining a resolution of a differential motion vector by the resolution determiner, FIG. 27 illustrates a code number table of differential motion vectors according to the differential motion vector resolutions, FIG. 28 illustrates a motion vector of the current block and a reference motion vector of surrounding blocks, FIG. 31 is a table illustrating an example of reference picture indexes according to reference picture numbers and resolutions, FIG. 33 illustrates resolution identification flags in the case in which the appointed resolutions are ½ and ¼, FIG. 34 illustrates current block and its surrounding blocks, FIG. 35 illustrates a context model according to the conditions, FIG. 36 illustrates resolution identification flags in the case in which the appointed resolutions are ½, ¼, and ⅛, FIG. 37 illustrates a context model according to the conditions, FIGS. 38 and 39 illustrate examples of adaptability degrees according to distances between the current picture and reference pictures, FIG. 40 illustrates an example of storing different reference picture index numbers according to predetermined resolution sets, FIG. 43 illustrates an example of a resolution of a current block and resolutions of surrounding blocks, FIG. 44 illustrates another example of a resolution of a current block and resolutions of surrounding blocks, FIG. 45 illustrates resolution identification flags according to resolutions, FIG. 46 illustrates an example of the resolution of the current block and the resolutions of surrounding blocks, FIG. 49 illustrates an example of surrounding motion vectors of current block, FIG. 50 illustrates an example of converted values of surrounding motion vectors according to the current resolution.

MODE FOR INVENTION

Figure 1:
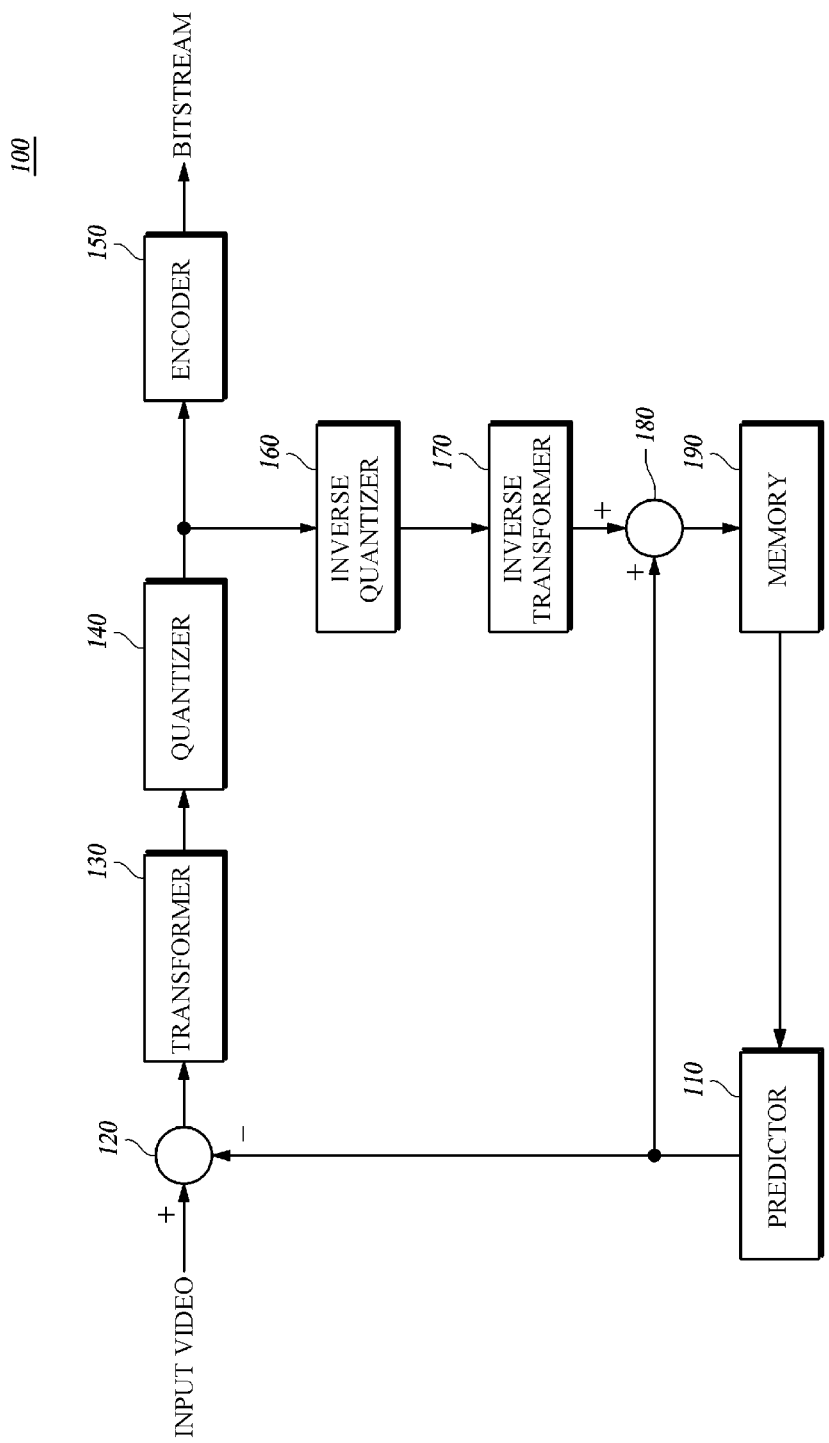
FIG. 1 is a schematic diagram showing a video encoding apparatus.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

A video encoding apparatus or video decoding apparatus described hereinafter may be a personal computer or PC, notebook or laptop computer, personal digital assistant or PDA, portable multimedia player or PMP, PlayStation Portable or PSP, or mobile communication terminal, smart phone or such devices, and represent a variety of apparatuses equipped with, for example, a communication device such as a modem for carrying out communication between various devices or wired/wireless communication networks, a memory for storing various programs for encoding videos and related data, and a microprocessor for executing the programs to effect operations and controls.

In addition, the video encoded into a bitstream by the video encoding apparatus may be transmitted in real time or non-real-time to the video decoding apparatus for decoding the same where it is reconstructed and reproduced into the video after being transmitted via a wired/wireless communication network including the Internet, a short range wireless communication network, a wireless LAN network, a WiBro (Wireless Broadband) also known as WiMax network, and a mobile communication network or a communication interface such as cable or USB (universal serial bus).

In addition, although the video encoding apparatus and the video decoding apparatus may be equipped with the functions of performing the inter prediction as well as the intra prediction, which lacks a direct correlation with the aspects of the present disclosure, a detailed description thereof will not be provided to avoid any confusions.

A video typically includes a series of pictures each of which is divided into predetermined areas, such as blocks. When each picture is divided into blocks, each of the blocks is classified into an intra block or an inter block depending on the method of classification. The intra block means the block that is encoded through an intra prediction coding which is within a current picture where the current encoding is performed for generating a predicted block by predicting a current block using pixels of a reconstructed block that underwent previous encoding and decoding and then encoding the differential value of the predicted block from the pixels of the current block. The inter block means the block that is encoded through an inter prediction coding which generates the predicted block by predicting the current block in the current picture through referencing one or more past pictures or future pictures to predict the current block in the current picture and then encoding the differential value of the predicted block from the current block. Here, the picture that is referenced in encoding or decoding the current picture is called a reference picture.

The following description discusses apparatuses for encoding and decoding a video by blocks through examples shown in FIGS. 1 to 8, wherein the block may be a macroblock having a size of M×N or a subblock having a size of O×P. However, the encoding or decoding of a video by blocks is just an example and a video may be encoded or decoded not only by standardized areas, such as blocks, but also by non-standardized areas.

FIG. 1 is a schematic diagram showing a video encoding apparatus.

The video encoding apparatus 100 may include a predictor 110, a subtracter 120, a transformer 130, a quantizer 140, an encoder 150, an inverse quantizer 160, an inverse transformer 170, an adder 180, and a memory 190.

The predictor 110 generates a predicted block by performing intra prediction on the current block. In other words, in response to an input of a block to be currently encoded, i.e. a current block, the predictor 110 predicts original pixel values of pixels of the current block by using motion vectors of the current block determined through motion estimation, to generate and output the predicted block having predicted pixel values.

The subtracter 120 generates a residual block of the current block by subtracting the predicted block from the current block. Here, the outputted residual block includes a residual signal which has a value obtained by subtracting the predicted pixel value of the predicted block from the original pixel value of the current block.

The transformer 130 generates a transformed block by transforming the residual block. Specifically, the transformer 130 transforms a residual signal of the residual block outputted from the subtracter 120 into the frequency domain to generate and output the transformed block having a transform coefficient. Here, the method used for transforming the residual signal into the frequency domain may be the discrete cosine transform (DCT) based transform or Hadamard transform among various other unlimited transforming techniques available from improving and modifying the DCT transform or the like, whereby the residual signal is transformed into the frequency domain and into the transform coefficient.

The quantizer 140 quantizes the transformed block to generate a transformed and quantized block. Specifically, the quantizer 140 quantizes the transform coefficient of the transformed block outputted from the transformer 130 to generate and output the transformed and quantized block having a quantized transform coefficient. Here, the quantizing method used may be the dead zone uniform threshold quantization (DZUTQ) or the quantization weighted matrix among their various improvement options.

The encoder 150 encodes the transformed and quantized block to output a bitstream. In particular, the encoder 150 encodes a frequency coefficient string resulted from scanning in the zig-zag scanning or other various scanning methods with respect to the quantized transform coefficient of the transformed and quantized block outputted from the quantizer 140, by using various encoding techniques such as the entropy encoding, and generates and outputs the bitstream encompassing additional information needed to decode the involved block such as prediction mode information, quantization parameter, motion vector, etc.

The inverse quantizer 160 carries out the inverse process of quantization with respect to the transformed and quantized block. Specifically, the inverse quantizer 160 inversely quantizes and outputs the quantized transform coefficients of the transformed and quantized block outputted from the quantizer 140.

The inverse transformer 170 carries out the inverse process of transformation with respect to the transformed and inversely quantized block. Specifically, the inverse transformer 170 inversely transforms the inversely quantized transform coefficients from the inverse quantizer 160 to reconstruct the residual block having the reconstructed residual coefficients.

The adder 180 adds the inversely transformed and reconstructed residual block from the inverse transformer 170 to the predicted block from the predictor 110 to reconstruct the current block. The reconstructed current block is stored in the memory 190 and may be accumulated by blocks or by pictures and then transferred in units of pictures to the predictor 110 for possible use in predicting other blocks including the next block or the next picture.

Meanwhile, the predictor 110 determines the motion vector of the current block by estimating the motion of the current block by using the reference picture stored in the memory 190, and may perform the motion estimation after enhancing the resolution of the reference picture by interpolating the reference picture stored in the memory 190.

Figure 2:
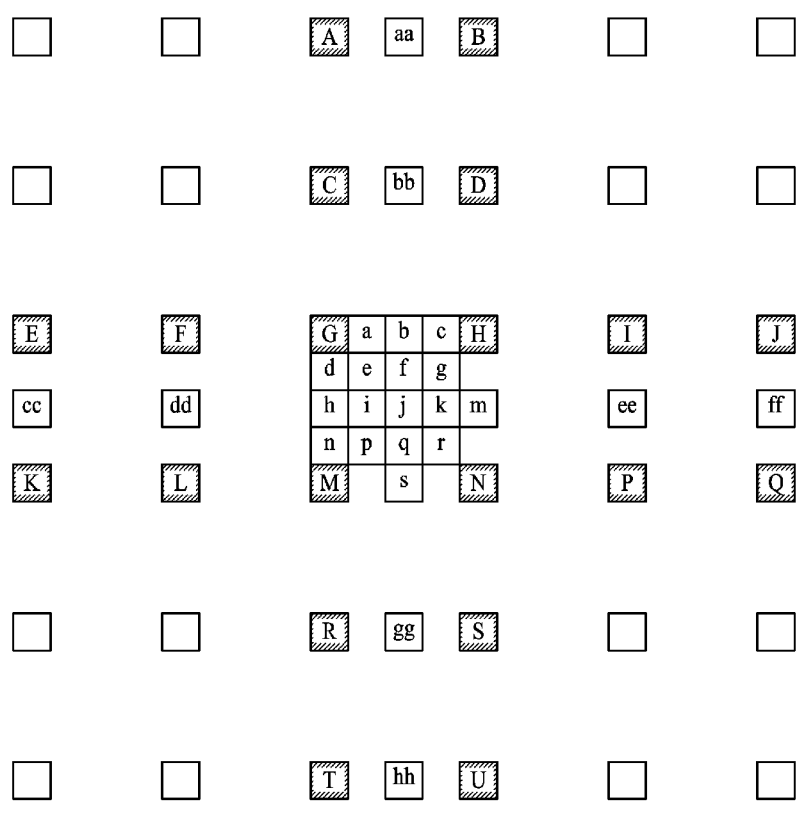

FIG. 2 is a view for illustrating the process of interpolating a reference picture.

FIG. 2 shows pixels of the reference picture stored in the memory 190 and pixels interpolated by using sub-pixels. Sub-pixels a~s can be generated by interpolating previously reconstructed pixels A~U of the reference picture by using an interpolation filter, and the sub-pixels a~s interpolated between the previously reconstructed pixels can increase the resolution of the reference picture fourfold or more.

The motion estimation refers to a process of finding a part of an interpolated reference picture which is most similar to the current block and outputting a block of the part and a motion vector indicating the part. A predicted block found in this process is subtracted from the current block by the subtracter 120, so as to produce a residual block having a residual signal. Further, the motion vector is encoded by the encoder 150.

When encoding the motion vector, the encoder 150 may predict the motion vector of the current block by using motion vectors of blocks adjacent to the current block and may encode the motion vector by using the predicted motion vector.

Figure 3:
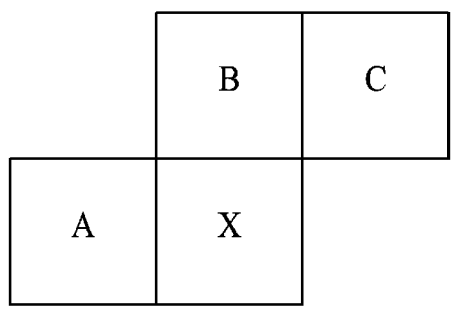
FIG. 3 is an exemplary diagram for illustrating the process of determining a predicted motion vector.

FIG. 3 is a view for illustrating the process of determining a predicted motion vector.

Referring to FIG. 3, based on an assumption that the current block is X, a motion vector of an adjacent block A located at the left side of the current block is MV_A (x component: MVx_A, y component: MVy_A), a motion vector of an adjacent block B located at the upper side of the current block is MV_B (x component: MVx_B, y component: MVy_B), and a motion vector of an adjacent block C located at the right upper side of the current block is MV_C (x component: MVx_C, y component: MVy_C), each component of the predicted motion vector MV_pred_X (x component: MVx_pred_X, y component: MVy_pred_X) of the current block X may be determined as a median value of each component of the motion vector of an adjacent block of the current block as shown in Equation 1 below. Meanwhile, the method of predicting a motion vector according to the present disclosure is not limited to the method introduced herein.

$$MVx\_pred\_X = \text{median}(MVx\_A, MVx\_B, MVx\_C)$$

$$MVy\_pred\_X = \text{median}(MVy\_A, MVy\_B, MVy\_C) \quad \text{Equation 1}$$

The encoder 150 may encode a differential vector having a differential value between a motion vector and a predicted motion vector. Various entropy encoding schemes, such as a Universal Variable Length Coding (UVLC) scheme and a Context-Adaptive Binary Arithmetic Coding (CABAC) scheme, may be used for encoding the differential vector. Meanwhile, in the present disclosure, the encoding method by the encoder 150 is not limited to the method described herein.

In the case of encoding the differential vector by using the UVLC, the differential vector may be encoded by using the K-th order Exp-Golomb code. In this event, K may have a value of "0" or another value. The prefix of the K-th order Exp-Golomb code has a truncated unary code corresponding to $l(x) = \lfloor \log_2(x/2^k + 1) \rfloor$, and a suffix thereof may be expressed by a binary-coded bit stream of a value of $x + 2^k(1 - 2^{l(x)})$ having a length of $k + l(x)$.

FIG. 4 shows an example of truncated unary codes wherein a maximum value T thereof is 10, and FIG. 5 shows an example of the 0-th, first, and second order Exp-Golomb codes.

Further, when the differential vector is encoded using the CABAC, the differential vector may be encoded using code bits of the Concatenated Truncated Unary/K-th Order Exp-Golomb Code.

In the Concatenated Truncated Unary/K-th Order Exp-Golomb Code, the maximum value T is 9 and K may be 3. FIG. 6 shows an example of the Concatenated Truncated Unary/K-th Order Exp-Golomb Code wherein the maximum value T is 9 and K is 3.

Figure 7:
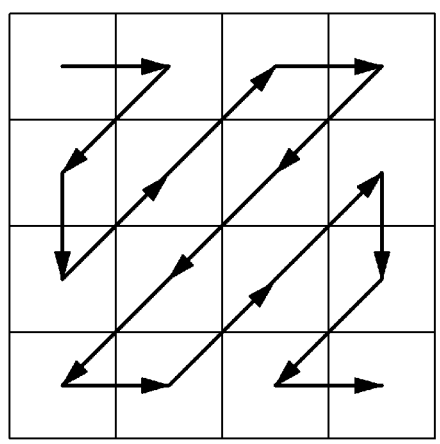
FIG. 7 shows an example of a sequence of Zigzag scanning.

FIG. 7 shows an example of a sequence of Zigzag scanning.

The quantized frequency coefficients quantized by the quantizer 140 may be scanned and encoded into a quantized frequency coefficient string by the encoder 150. Block type quantized frequency coefficients may be scanned according to not only the zigzag sequence as shown in FIG. 7 but also various other sequences.

Figure 8:
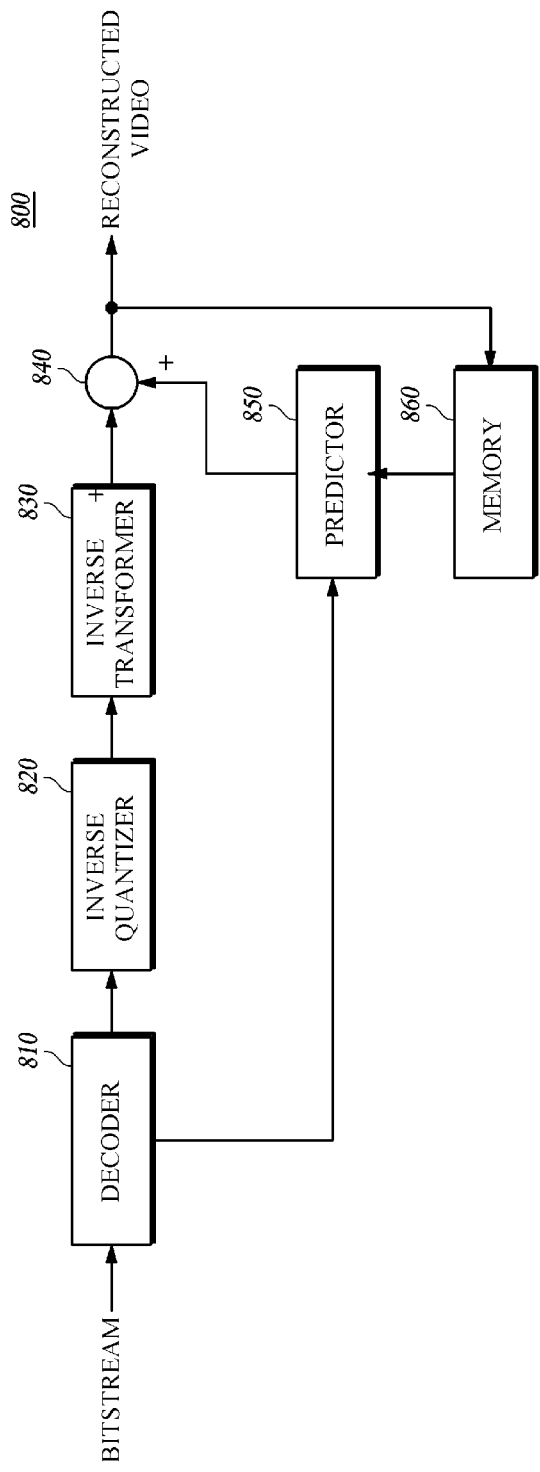
FIG. 8 is a schematic block diagram of a video decoding apparatus.

FIG. 8 is a schematic block diagram of a video decoding apparatus.

The video decoding apparatus 800 may include a decoder 810, an inverse quantizer 820, an inverse transformer 830, an adder 840, a predictor 850, and a memory 860.

The decoder 810 decodes a bitstream to extract the transformed and quantized block. Specifically, the decoder 810 decodes a bit string extracted from the bitstream received and inversely scans the result to reconstruct the transformed and quantized block having a quantized transform coefficient. At the same time, the decoder 810 uses the same encoding technique like the entropy encoding as used by the encoder 150 of the video encoding apparatus 100 to perform the reconstruction.

Further, the decoder 810 may extract and decode an encoded differential vector from the bitstream to reconstruct the differential vector, and may predict a motion vector of the current block and then add the predicted motion vector to the reconstructed differential vector to reconstruct the motion vector of the current block.

The inverse quantizer 820 inversely quantizes the transformed and quantized block. Specifically, the inverse quantizer 820 inversely quantizes the quantized transform coefficient of the transformed and quantized block from the decoder 810. At this time, the inverse quantizer 820 in its operation performs a reversal of the quantization technique used in the quantizer 140 of the video encoding apparatus 100.

The inverse transformer 830 inversely transforms the transformed and inversely quantized block to reconstruct the residual block. Specifically, the inverse transformer 830 reconstructs the inversely quantized transform coefficient of the transformed and inversely quantized block from the inverse quantizer 820, wherein the inverse transformer 830 in its operation performs a reversal of the transform technique used in the transformer 130 of the video encoding apparatus 100.

The predictor 850 generates a predicted block by predicting the current block by using the reconstructed motion vector of the current block extracted and decoded from the bitstream.

The adder 840 adds the reconstructed residual block to the predicted block to reconstruct the current block. Specifically, the adder 840 adds a reconstructed residual signal of the reconstructed residual block outputted from the inverse transformer 830 to the predicted pixel values of the predicted block outputted from the predictor 850 to calculate the reconstructed pixel values of the current block, thereby reconstructing the current block.

The current block reconstructed by the adder 840 is stored in the memory 860. The current blocks may be stored as reference pictures by blocks or by pictures for use in the prediction of a next block by the predictor 850.

As described above with reference to FIGS. 1 to 8, the video encoding apparatus 100 and the video decoding apparatus 800 can perform the inter prediction encoding and inter prediction decoding after enhancing the resolution of the motion vector and the reference picture by interpolating the reference picture in the unit of sub-pixels. Specifically, they can enhance the resolution of the motion vector by interpolating the reference picture with the same resolution in the unit of pictures or picture groups.

However, an inter prediction with an enhanced resolution of a reference picture enables a more precise inter prediction and thus reduces the quantity of bits generated by the encoding of the residual signal. However, the enhancement of the resolution of the reference picture also results in an inevitable an enhancement of the resolution of the motion vector, which increases the quantity of bits generated by encoding of the motion vector. As a result, even the inter prediction with an enhanced resolution of a reference picture may fail to significantly increase the encoding efficiency or may rather degrade the encoding efficiency depending on the images.

The following description discusses a method and an apparatus for inter prediction encoding and inter prediction decoding, which can adaptively enhance the resolution of a reference picture in the unit of areas having predetermined regular or irregular sizes, such as pictures, slices, and blocks of images according to the characteristics of the images, so that an area having a relatively complex image or smaller movements is inter prediction encoded and decoded with an enhanced resolution while an area having a relatively simple image or larger movements is inter prediction encoded and decoded with a lowered resolution.

Figure 9:
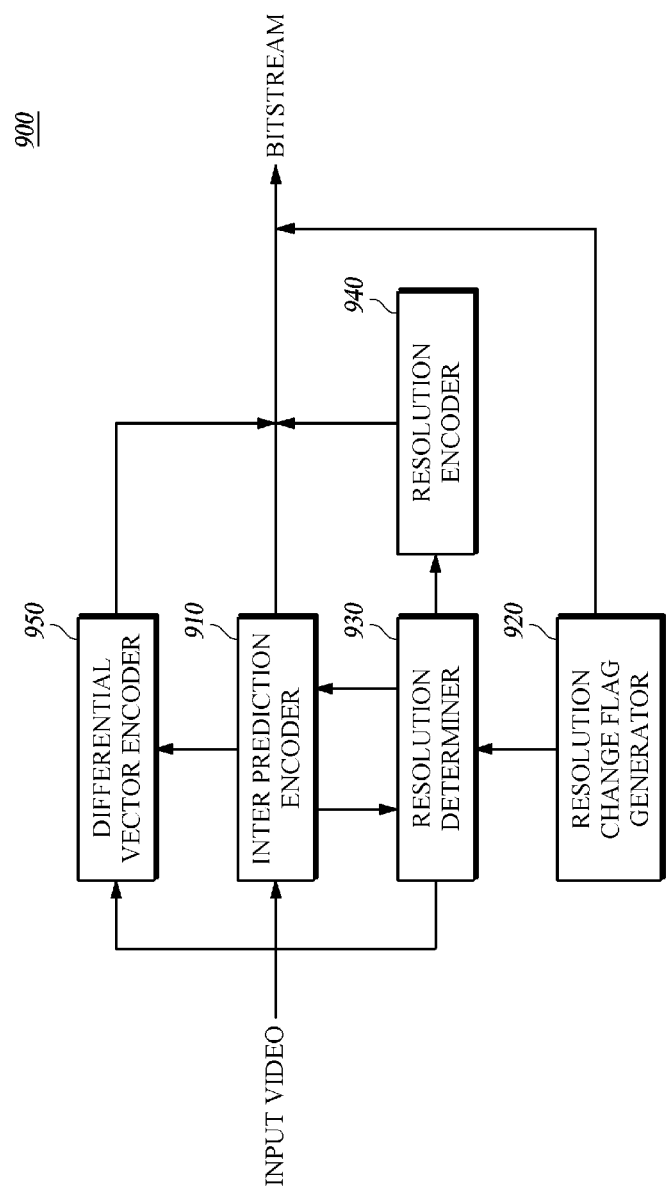
FIG. 9 is a block diagram illustrating a video encoding apparatus according to the first aspect of the present disclosure.

FIG. 9 is a block diagram illustrating a video encoding apparatus according to the first aspect of the present disclosure.

A video encoding apparatus 900 using an adaptive motion vector according to the first aspect of the present disclosure may include an inter prediction encoder 910, a resolution change flag generator 920, a resolution determiner 930, a resolution encoder 940, and a differential vector encoder 950. Meanwhile, it is not required but optional that all of the resolution change flag generator 920, resolution encoder 940, and the differential vector encoder 950 be included in the video encoding apparatus 900, and they may be selectively included in the video encoding apparatus 900.

The inter prediction encoder 910 performs an inter prediction encoding of a video in the unit of areas of the image by using a motion vector according to a motion vector resolution determined for each motion vector or each area of the video. The inter prediction encoder 910 can be implemented by the video encoding apparatus 100 described above with reference to FIG. 1. In this event, when one or more components between the resolution encoder 940 and the differential vector encoder 950 of FIG. 9 are additionally included and the function of the additionally included component or components overlaps with the function of the encoder 150 within the inter prediction encoder 910, the overlapping function may be omitted from the encoder 150. Further, if there is an overlapping area between the function of the predictor 110 within the inter prediction encoder 910 and the function of the resolution determiner 930, the overlapping function may be omitted from the predictor 110.

Further, one or more components between the resolution encoder 940 and the differential vector encoder 950 may be configured either as a component separate from the inter prediction encoder 910 as shown in FIG. 9 or as a component integrally formed with the encoder 150 within the inter prediction encoder 910. Further, the flag information generated in the resolution change flag generator 920 may be transformed into a bitstream either by the resolution change flag generator 920 or by the encoder 150 within the inter prediction encoder 910.

However, although the above description with reference to FIG. 1 discusses encoding of a video in the unit of blocks by the video encoding apparatus 100, the inter prediction encoder 910 may divide the video into areas with various shapes or sizes, such as blocks including macroblocks or subblocks, slices, or pictures, and perform the encoding in the unit of areas each having a predetermined size. Such a predetermined area may be not only a macroblock having a size of 16×16 but also blocks with various shapes or sizes, such as a block having a size of 64×64 and a block having a size of 32×16.

Further, although the video encoding apparatus 100 described above with reference to FIG. 1 performs an inter prediction encoding using motion vectors having the same motion vector resolution for all the blocks of an image, the inter prediction encoder 910 may perform an inter prediction encoding by using motion vectors having motion vector resolutions differently determined according to the video areas. The video areas according to which the motion vector resolutions may be differently determined may be pictures (frames or fields), slices, or image blocks each having a predetermined size.

That is, in the inter prediction encoding of an area, the inter prediction encoder 910 performs a motion estimation after enhancing the resolution of the area by interpolating a reference picture which has been previously encoded, decoded, and reconstructed. For the interpolation of the reference picture, various interpolation filters, such as a Wiener filter, a bilinear filter, and a Kalman filter may be used and there may be resolutions applicable in the unit of various integer pixels or fraction pixels, such as $2/1$ pixel, $1/1$ pixel, $1/2$ pixel, $1/4$ pixel, and $1/8$ pixel. Further, according to such various resolutions, there may be different filter coefficients or different numbers of filter coefficients to be used.

For example, a Wiener filter may be used for the interpolation when the resolution corresponds to the ½ pixel unit and a Kalman filter may be used for the interpolation when the resolution corresponds to the ¼ pixel unit. Moreover, different numbers of filter taps may be used for the interpolation of the respective resolutions. For example, an 8-tap Wiener filter may be used for the interpolation when the resolution corresponds to the ½ pixel unit and a 6-tap Wiener filter may be used for the interpolation when the resolution corresponds to the ¼ pixel unit.

Further, the inter prediction encoder 910 may determine an optimum filter coefficient, which has minimum errors between a picture to be currently encoded and a reference picture, for each motion vector resolution and then encode the filter coefficient. In this event, any of the Wiener filter, Kalman filter, etc. may be used with arbitrary number of filter taps, and each resolution may prescribe distinctive numbers of the filters and filter taps.

In addition, the inter prediction encoder 910 may perform an inter prediction by using reference pictures interpolated using different filters depending on the resolutions of motion vectors or areas. For example, as noted from Equation 2 below, in order to calculate an optimum filter coefficient, which has a minimum Sum of Squared Difference (SSD) between a picture to be currently encoded and a reference picture, the Wiener filter may be used for calculating an optimum filter tap for each resolution.

$$(e^{sp})^2 = \sum_x \sum_y \left( S_{x,y} - \sum_i \sum_j h_{i,j}^{sp} P_{\tilde{x}-i, \tilde{y}-j} \right)^2$$ Equation 2

$S_{x,y}$: Current frame  $P_{x,y}$: Reference frame (x̃ and ỹ indicate positions at which the motion vectors are applied)

In Equation 2, S indicates a pixel of the current picture, $h^{sp}$ indicates a filter coefficient of the pixel domain, P indicates a pixel of a reference picture, $e^{sp}$ indicates an error, and x and y indicate locations of the current pixel.

That is, the inter prediction encoder 910 may calculate the filter coefficient for each resolution by using a Wiener-Hopf Equation like Equation 2, encode an optimum filter coefficient for each resolution, and include the encoded filter coefficient in a bitstream. Then, the inter prediction encoder 910 may perform an interpolation filtering for the reference picture and then generate and encode a reference picture for each resolution. In this event, a filter coefficient of a 6-tap Wiener filter may be calculated and encoded for the ½ resolution, a filter coefficient of an 8-tap Kalman filter for the ¼ resolution, and a filter coefficient of a linear filter for the ⅛ resolution, including the encoded filter coefficients in the bitstream, and the reference picture for each resolution may be then interpolated and encoded. In the encoding, the inter prediction encoder 910 may use the reference picture interpolated by the 6-tap Wiener filter when the resolution of the current area or motion vector is the ½ resolution, and may use a reference picture interpolated by the 8-tap Kalman filter when the resolution of the current area or motion vector is the ¼ resolution.

The resolution change flag generator 920 may generate a resolution change flag into the bitstream, which indicates whether to define a motion vector resolution and/or a resolution of a differential motion vector with respect to each area of an image or each motion vector. The area for the change of a motion vector resolution and/or a resolution of a differential motion vector by the resolution change flag may be a block, a macroblock, a group of blocks, a group of macroblocks, or an area having a predetermined size, such as M×N. Therefore, the resolution change flag generator 920 may generate the resolution change flag into the bitstream, which indicates whether to perform the inter prediction encoding by using motion vectors having a fixed motion vector resolution for sub-areas within a part of or all of areas of a video or whether to determine a motion vector resolution of each area (or motion vector), perform an inter prediction encoding by using a motion vector having the determined motion vector resolution, and generate a differential motion vector having a fixed resolution. Such a resolution change flag may be determined and generated either according to configuration information input by a user or according to a preset determination criteria based on an analysis of the video to be encoded. The resolution change flag may be included in a bitstream header such as a picture parameter set, a sequence parameter set, or a slice header.

When the resolution change flag generated by the resolution change flag generator 920 indicates fixation of the motion vector resolution and/or resolution of the differential motion vectors, the inter prediction encoder 910 performs an inter prediction encoding of each of the sub-areas defined in the header by using motion vectors of the sub-areas having the fixed motion vector resolution. For example, when a resolution change flag included in a slice header of a slice indicates that the motion vector resolution is fixed, the inter prediction encoder 910 may determine a motion vector resolution having the lowest rate-distortion cost for an image of the slice and then perform an inter prediction encoding for all areas of the slice by using motion vectors of the areas having the determined motion vector resolution.

Further, when the resolution change flag indicates that the resolutions of the motion vectors and/or differential motion vectors are adaptively changing for each area or motion vector, the inter prediction encoder 910 performs an inter prediction encoding of each area by using a motion vector of each area having a motion vector resolution determined by the resolution determiner 930. For example, when a resolution change flag included in a slice header of a slice indicates that the resolutions of the motion vector and/or differential motion vector adaptively changes for each area or motion vector, the inter prediction encoder 910 may perform an inter prediction encoding of each area within the slice by using a motion vector of the area having a motion vector resolution determined by the resolution determiner 930. As another example, when a resolution change flag included in a slice header of a slice indicates that the motion vector resolution of the motion vector and/or differential motion vector adaptively changes for each motion vector, the inter prediction encoder 910 may perform an inter prediction encoding of each motion vector within the slice by using a motion vector resolution determined for the motion vector by the resolution determiner 930.

When a resolution change flag indicating that the motion vector resolution of the motion vectors and/or differential motion vectors adaptively changes foe each area or motion vector is generated by the resolution change flag generator 920, the resolution determiner 930 determines an optimum motion vector resolution and/or differential motion vector resolution of each motion vector and/or differential motion vector through changing the motion vector resolution and/or differential motion vector resolution by using a predetermined cost function, such as a rate-distortion cost (RD cost). In this event, the optimum motion vector resolution and/or differential motion vector resolution simply refers to a resolution of a motion vector and/or differential motion vector determined by using a predetermined cost function and does not imply that the determined optimum motion vector resolution and/or differential motion vector resolution always has an optimum performance. When the predetermined cost function is a rate-distortion cost, a motion vector resolution and/or differential motion vector resolution having the lowest rate-distortion cost may be the optimum motion vector resolution and/or differential motion vector resolution.

The resolution encoder 940 may encode the optimum motion vector resolution and/or differential motion vector resolution determined for each area or motion vector. That is, the resolution encoder 940 may encode a motion vector resolution identification flag for indicating a motion vector resolution and/or a differential motion vector resolution identification flag indicating a differential motion vector resolution of each area determined by the resolution determiner 930 and then include the encoded resolution identification flag in a bitstream. There may be various ways for implementing the motion vector resolution identification flag or differential motion vector resolution identification flag. The resolution indicated by the resolution identification flag may be adopted by either only one or both of a motion vector resolution and a differential motion vector resolution.

The differential vector encoder 950 may encode a differential motion vector corresponding to a difference between a predicted motion vector and a motion vector according to a motion vector resolution determined for each motion vector or area. The differential motion vector may be differentially encoded according to the differential motion vector resolution.

A resolution identification flag indicating a motion vector resolution may indicate either one of the resolutions of x component and y component of a motion vector for motion estimation or both. That is, when a camera taking an image moves or when an object within a video moves, the resolution determiner 930 may separately determine the resolutions of the x component and the y component of the motion vector. For example, the resolution determiner may determine a resolution in ⅛ pixel unit for an x component of a motion vector of a certain area as it determines a resolution in ½ pixel unit for a y component of the motion vector. Then, the inter prediction encoder 910 may determine the motion vector of the corresponding area in different resolutions for the x component and the y component and perform motion estimation and motion compensation by using the determined motion vector, so as to perform an inter prediction encoding of the area.

FIG. 22 illustrates optimum motion vectors of a current block and surrounding blocks in order to describe a process of determining the resolution of a motion vector by the resolution determiner 930.

When a flag which indicates that the motion vector resolution and/or differential motion vector resolution adaptively changes according to the area or motion vector, is generated by the resolution change flag generator 920 (in the second aspect, a resolution appointment flag generated by a resolution appointment flag generator 3220 enables setting of whether to change or fix the motion vector resolution and/or differential motion vector resolution), it is assumed that the kinds of resolutions of the current block and surrounding blocks are ½, ¼, and ⅛ and an optimum resolution has been determined as shown in FIG. 22. On this assumption, block A has a resolution of ½ and a motion vector of (4/2, −8/2), block B has a resolution of ¼ and a motion vector of (36/4, −28/4), block C has a resolution of ⅛ and a motion vector of (136/8, −104/8), and the current block has a resolution of ¼ and a motion vector of (16/4, 20/4). In this event, the predicted motion vector may follow the resolution of the current motion vector. Then, in order to calculate the predicted motion vector, a resolution conversion process may be carried out to equalize the resolution of the surrounding motion vectors to the resolution of the current motion vector.

FIG. 23 illustrates a table showing conversion formulas according to the motion vector resolutions, and FIG. 24 illustrates a table showing the resolutions of motion vectors of surrounding blocks converted based on block X to be currently encoded.

The predicted motion vector may be obtained by using surrounding motion vectors. If the surrounding motion vectors have been stored according to their respective resolutions and are different from the current motion vector, the conversion can be made using a multiplication and a division. Further, in this event, the resolution conversion process may be performed at the time of obtaining a predicted motion vector. Otherwise, if the surrounding motion vectors have been stored based on the best resolution and the resolution of the current motion vector is not the best resolution, the conversion can be made using a division. Further, in this event, when the resolution conversion process finds an encoded motion vector which is in less than the highest resolution, it may carry out a resolution conversion into the heist resolution. Otherwise, if the surrounding motion vectors have been stored based on a certain reference resolution and the resolution of the current motion vector is different from the reference resolution in which the surrounding motion vectors are stored, the conversion can be made using a multiplication and a division. Further, in this event, when the resolution conversion process finds an encoded motion vector which is stored in a resolution different from the reference resolution, it may carry out a resolution conversion into the reference resolution. In the case of performing the division, rounding may be used, including a round-off, a round-up, and a round-down. In the aspect shown in FIGS. 23 and 24, a round-off is used. Further, in the shown aspect, surrounding motion vectors in store according to their respective resolutions.

A predicted motion vector may be obtained by referring to the table shown in FIG. 23. In FIG. 23, the predicted motion vector can be obtained by using a median function, and a median value can be obtained for each component.

$$MVPx=\text{median}(16/4, 36/4, 32/4)=32/4$$

$$MVPy=\text{median}(-32/4, -28/4, -28/4)=-28/4$$

As a result, the predicted motion vector has a value of (32/4, −28/7). Then, a differential motion vector is obtained by using the obtained predicted motion vector. The differential motion vector can be obtained by using the difference between the motion vector and the predicted motion vector as noted from Equation 3 below.

$$MVD(-16/4, 48/4)=MV(16/4, 20/4)-MVP(32/4, -28/4) \quad \text{Equation 3}$$

Therefore, the differential motion vector has a value of (−16/4, 48/4), which is equal to (−4, 12).

FIG. 25 illustrates a code number table of a differential motion vector according to the motion vector resolutions.

The differential vector encoder 950 may use the code number table of differential motion vectors according to the motion vector resolutions as shown in FIG. 25 in encoding the differential motion vectors with respect to motion vector values of respective resolutions.

Further, the predicted motion vector may be obtained as follows by using the example shown in FIG. 22. In this event, instead of converting the surrounding motion vectors according to the current resolution, it is possible to first obtain medians of individual components of each surrounding motion vector.

$$MVPx=\text{median}(4/2,36/4,136/8)=36/4$$

$$MVPy=\text{median}(-8/2,-28/4,-104/8)=-104/8$$

As a result, the predicted motion vector has a value of (36/4, −104/8). The differential motion vector is obtained using the predicted motion vector obtained as in the way as described above. The differential motion vector can be obtained using the difference between the motion vector and the predicted motion vectors as noted from Equation 4 below.

$$MVD(-20/4,72/4)=MV(16/4,20/4)-MVP(36/4,-104/8) \quad \text{Equation 4}$$

As a result, the differential motion vector has a value of (−20/4, 72/4), which is equal to (−5, 18).

The differential vector encoder 950 may use the code number table of differential motion vectors according to the motion vector resolutions as shown in FIG. 25 in encoding the differential motion vectors with respect to motion vector values for each of the resolutions.

Further, the predicted motion vectors may be obtained as follows by using the example shown in FIG. 22. In this event, converting the surrounding motion vectors according to the current resolution may be performed only after medians of individual components of each surrounding motion vector are obtained.

$$MVPx=\text{median}(4/2,36/4,136/8)=36/4$$

$$MVPy=\text{median}(-8/2,-28/4,-104/8)=-104/8$$

As a result, the predicted motion vector has a value of (36/4, −52/4) with reference to FIG. 23. The differential motion vector is obtained using the predicted motion vector obtained in the way as described above. The differential motion vector can be obtained using the difference between the motion vector and the predicted motion vectors as noted from Equation 5 below.

$$MVD(-20/4,72/4)=MV(16/4,20/4)-MVP(36/4,-52/4) \quad \text{Equation 5}$$

As a result, the differential motion vector has a value of (−20/4, 72/4) which is equal to (−5, 18).

The differential vector encoder 950 may use the code number table of differential motion vectors according to the motion vector resolutions as shown in FIG. 25 in encoding the differential motion vectors with respect to motion vector values for each of the resolutions.

Further, the predicted motion vectors may be obtained as follows by using the example shown in FIG. 22. The median can be obtained using only surrounding motion vector or vectors having the same resolution as that of the current motion vector. In FIG. 22, since only block B corresponds to the surrounding motion vector having the same resolution as that of the current motion vector, the predicted motion vector has a value of (36/4, −28/4). The differential motion vector is obtained using the predicted motion vector obtained in the way as described above. The differential motion vector can be obtained using the difference between the motion vector and the predicted motion vectors as noted from Equation 6 below.

$$MVD(-20/4,48/4)=MV(16/4,20/4)-MVP(36/4,-28/4) \quad \text{Equation 6}$$

As a result, the differential motion vector has a value of (−20/4, 48/4) which is equal to (−5, 12).

The differential vector encoder 950 may use the code number table of differential motion vectors according to the motion vector resolutions as shown in FIG. 25 in encoding the differential motion vectors with respect to motion vector values for each of the resolutions.

Further, if the surrounding motion vectors have been stored based on a resolution of ⅛, the predicted motion vector may be obtained in the way as described below by using the example shown in FIG. 22. Referring to FIGS. 23 and 24, the predicted motion vector has a value of (32/4, −28/4). The differential motion vector is obtained using the predicted motion vector obtained in the way as described above. The differential motion vector can be obtained by using the difference between the motion vector and the predicted motion vectors as noted from Equation 3. As a result, the differential motion vector has a value of (−16/4, 48/4) which is equal to (−4, 12).

Meanwhile, the resolution encoder 940 may encode the kinds of resolutions and the resolution change flag (the resolution appointment flag in the second aspect) into the header. In this event, the resolution encoder 940 may encode the resolution identification flag, which has been determined as the optimum flag, to ¼, and the differential vector encoder 950 may encode the differential motion vector obtained by using a predicted motion vector calculated by using the surrounding motion vectors converted according to the resolution determined by the resolution determiner 930.

FIG. 26 illustrates optimum motion vectors of a current block and surrounding blocks in order to describe a process of determining a resolution of a differential motion vector by the resolution determiner 930.

As noted from FIG. 26, if the motion vector resolution of the current block and surrounding blocks is ⅛, the predicted motion vector may be calculated by Equation 7 below.

$$PMVx=\text{median}(7/8,1/8,2/8)=2/8$$

$$PMVy=\text{median}(-6/8,1/8,-2/8)=-2/8 \quad \text{Equation 7}$$

As a result, PMV=(2/8, −2/8)=(¼, −¼). The differential motion vector can be obtained by Equation 8 below.

$$MVD(-1/8,-2/8)=MV(1/8,-4/8)-PMV(1/4,-1/4) \quad \text{Equation 8}$$

Therefore, the differential motion vector identification flag MVDx may be encoded to ⅛ and the differential motion vector identification flag MVDy may be encoded to ¼.

FIG. 27 illustrates a code number table of differential motion vectors according to the differential motion vector resolutions.

As noted from FIG. 27, the code number of the differential motion vector is (1, 1) according to the code number table of the differential motion vector. Therefore, the resolution encoder 940 may encode x and y components of the differential motion vector resolution identification flag to (⅛, ¼), encode the code number of the differential motion vector to (1, 1), and separately encode signs of the x and y components of the differential motion vector.

Meanwhile, when the differential vector encoder 950 encodes the differential motion vector, it determines a reference resolution or converts a motion vector having a resolution, other than a reference resolution to one with the reference resolution, and calculates a differential motion vector by using a reference predicted motion vector obtained from a reference motion vector of surrounding blocks. If a motion vector has a resolution other than the reference resolution, there is a method of additionally encoding a reference resolution flag. The reference resolution flag may include data indicating whether the motion vector has the same resolution as the reference resolution and data indicating a location of the actual motion vector.

The reference resolution may be defined in a header, such as a picture parameter set, a sequence parameter set, or a slice header.

FIG. 28 illustrates a motion vector of the current block X and a reference motion vector of surrounding blocks.

When the resolution change flag (the resolution appointment flag in the second aspect) indicates multiple resolutions, the kinds of the resolutions include ½, ¼, and ⅛, the reference resolution is ¼, and the optimum resolution has been determined as shown in FIG. 28, the current motion vector (⅘, ⅝) is converted by using the reference resolution, ¼, to a reference motion vector by Equation 9 below.

$$Ref\_MVx=2/4$$

$$Ref\_MVy=3/4 \qquad \text{Equation 9}$$

If the resolution of the current motion vector is different from the reference resolution, it may be converted by using a multiplication and a division. In the case of using the division, rounding may be used including a round-off, a round-up, and a round-down. The current aspect uses a round-off. Therefore, the reference resolution has a value of (²⁄₄, ¾), and the location of the actual motion vector having a resolution other than the reference resolution can be expressed using the reference resolution flag. In this event, the difference between the motion vector of the current block and the reference motion vector is (0, ⅛), and the value of the reference resolution flag may have, for example, location information, such as (0, 1). In the example of the location information, (0, 1), "0" indicates that the reference motion vector is equal to the motion vector and "1" indicates a motion vector that is smaller by −⅛ than the reference motion vector.

In the meantime, the differential vector of the reference motion vector is calculated using a predicted reference motion vector, which corresponds to a median value of the reference motion vector of the surrounding blocks.

$$Ref\_PMVx=\text{median}(9/4,1,2/4)=1$$

$$Ref\_PMVy=\text{median}(-7/4,-1,-1)=-1 \qquad \text{Equation 10}$$

Therefore, the predicted reference motion vector Ref_PMV has a value of (1, −1). Then, by applying (Ref_MV(²⁄₄, ¾)−Ref_PMV(1, −1)), the differential reference motion vector Ref_MVD has a value of (−²⁄₄, ⅞). Therefore, the encoder encodes the Ref_MVD (−²⁄₄, ⅞) and encodes the reference resolution flag (0, 1).

Figures 29, 30:
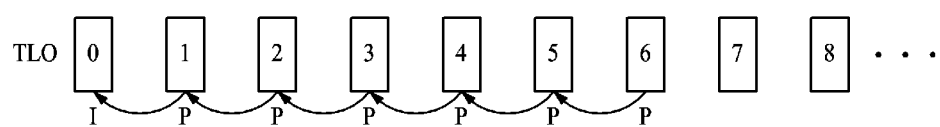
FIG. 29 illustrates a code number table of a differential reference motion vector according to the differential reference motion vector resolution.
FIG. 30 illustrates an example of indexing and encoding a reference picture based on a distance between a current picture and a reference picture.

FIG. 29 illustrates a code number table of a differential reference motion vector according to the differential reference motion vector resolution.

Referring to FIG. 29, the code number is 2 when the reference resolution is ¼ and the value of the differential reference motion vector is ²⁄₄, and the code number is 3 when the reference resolution is ¼ and the value of the differential reference motion vector is ¾, and the code number of each component of the differential reference motion vector is included in the reference resolution flag.

The resolution encoder 940 can encode in various ways the motion vector resolution and/or differential motion vector resolution determined according to each motion vector or area. The following description with reference to FIGS. 10 to 14 discusses various examples of the encoding of the motion vector resolution or differential motion vector resolution. Although the following description deals with only the examples of the encoding of the motion vector resolution, the differential motion vector resolution can also be encoded in the same way as that for the motion vector resolution, which is omitted in the description.

The resolution encoder 940 may integrate the motion vector resolutions and/or differential motion vector resolutions of adjacent areas having the same motion vector resolution with each other, and then generate a resolution identification flag for each integrated area. For example, the resolution encoder 940 may hierarchically generate the resolution identification flags with a Quadtree structure. In this event, the resolution encoder 940 may encode an identifier, which represents the maximum number of the Quadtree layers and the size of the area indicated by the lowest node of the Quadtree layers, and then include the encoded identifier in a header of a corresponding area of a bitstream.

Figure 10C:
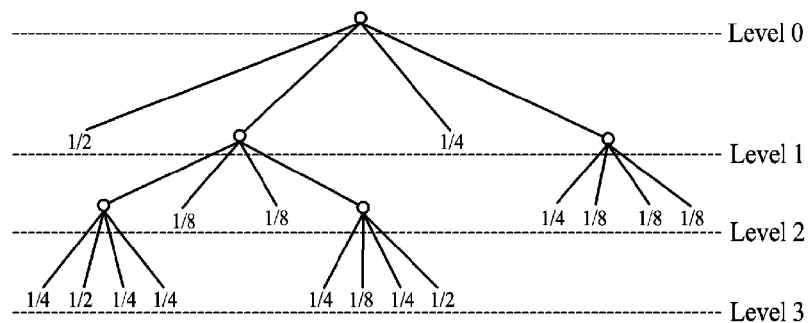

FIGS. 10A to 10C illustrate an example of motion vector resolutions hierarchically expressed by a Quadtree structure according to an aspect of the present disclosure.

FIG. 10A illustrates areas having various motion vector resolutions within one picture. In FIG. 10A, each area may be a macroblock having a size of 16×16 and the number in each area indicates a motion vector resolution of the area. FIG. 10B illustrates grouping of the areas shown in FIG. 10A into grouped areas, each of which includes areas having the same motion vector resolution. FIG. 10C hierarchically illustrates the motion vector resolutions of the grouped areas shown in FIG. 10B in a Quadtree structure. As noted from FIG. 10C, the area indicated by the lowest node corresponds to a macroblock having a size of 16×16 and the maximum number of the layers of the Quadtree structure is 4. Therefore, this information is encoded and is included in a header for the corresponding area.

Figure 11:
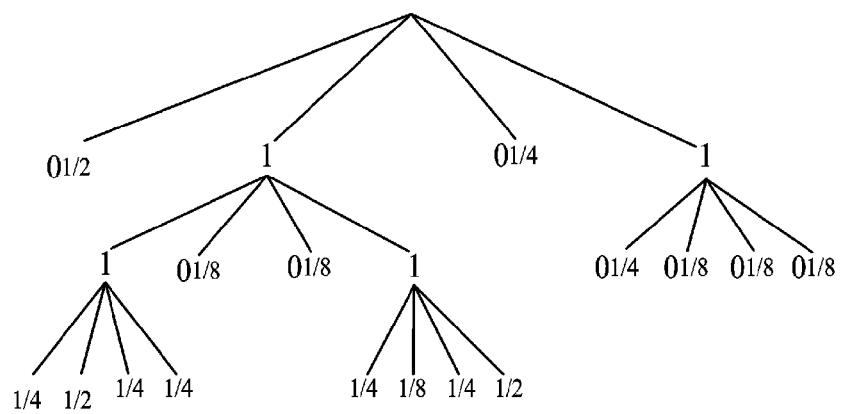
FIG. 11 illustrates a hierarchically expressed result of encoded motion vector resolutions in a Quadtree structure according to an aspect of the present disclosure.

FIG. 11 illustrates a hierarchically expressed result of encoded motion vector resolutions in a Quadtree structure according to an aspect of the present disclosure.

The final bits as shown in FIG. 11 can be obtained by encoding the motion vector resolutions in the Quadtree structure shown in FIG. 10C. One encoded bit may indicate whether a node has been divided. For example, a bit value of "1" may indicate that a corresponding node has been divided into lower nodes and a bit value of "0" may indicate that a corresponding node has not been divided into the lower layers.

In FIG. 10C, since the node of level 0 has been divided into lower layers, it is encoded to a bit value of "1". Since the first node of divided level 1 has a resolution of ½ and has not been divided any more, it is encoded to a bit value of "0" while the motion vector resolution of ½ is encoded. Since the second node of level 1 has been divided into lower layers, it is encoded to a bit value of "1". Since the third node of level 1 has not been divided into lower layers, it is encoded to a bit value of "0" while the motion vector resolution ¼ is encoded. Since the final fourth node of level 1 has been divided into lower layers, it is encoded to a bit value of "1". Nodes of level 2 are encoded in the same way. In level 3, only the motion vector resolutions are encoded, because the maximum number of layers has been determined as 3 in the header, which tells that there are no more layers lower than level 3. The final bits generated by hierarchically encoding the various motion vector resolutions of the areas shown in FIG. 10A in a Quadtree structure may have the structure as shown in FIG. 11.

The motion vector resolutions of ½, ¼, and ⅛ identified in the final bits imply the encoding result of using their representative bits, although the bit values are not represented for the convenience of description. The motion vector resolutions may be expressed by bit values in various ways according to the implementation methods. For example, if there are two type of available motion vector resolutions, they can be indicated by a 1-bit flag. Further, if there are four or less types of available motion vector resolutions, they can be indicated by a 2-bit flag.

If the maximum number of layers and the size of the area indicated by the lowest node are defined in a slice header, the resolution identification flag generated as described above may be included in the field of the slice data. A video decoding apparatus, which will be described later, can extract and decode a resolution identification flag from a bitstream, so as to reconstruct the motion vector resolution of each area.

Further, the aspect shown in FIGS. 10A to 10C discusses only two alternative cases in which a node is either divided into lower layers (i.e. four areas) or undivided, although there may be various divisions as shown in FIG. 20, including the nondivision of the node, its divisions into two transversely lengthy areas, two longitudinally lengthy areas, or four areas.

Further, the resolution encoder 940 may generate a resolution identification flag by encoding the motion vector resolution of each area or motion vector by using a predicted motion vector resolution predicted by motion vector resolutions of surrounding areas of that area. For example, based on an assumption that an area corresponds to a block having a size of 64×64, the motion vector resolution of the area may be predicted by using motion vector resolutions of areas at the left side and upper side of the area. When the predicted motion vector resolution of an area is identical to the motion vector resolution of the area, the resolution encoder 940 may encode a resolution identification flag of the area to a bit value of "1". Otherwise, when the predicted motion vector resolution of an area is not identical to the motion vector resolution of the area, the resolution encoder 940 may encode a resolution identification flag of the area to a bit value of "0" and a bit value indicating a motion vector resolution of the area. For example, if each of the resolutions of the upper area and the left area of an area is ½ and the resolution of the area is also ½, the resolution encoder 940 may encode the resolution identification flag of the area to a bit value of "1" and does not encode the motion vector resolution of the area. If each of the resolutions of the upper area and the left area of an area is ½ and the resolution of the area is ¼, the resolution encoder 940 may encode the resolution identification flag of the area to a bit value of "0" and may additionally encode the motion vector resolution of the area.

Further, the resolution encoder 940 may generate a resolution identification flag by encoding the motion vector resolution of each area of motion vector by using the run and length of the motion vector resolution of each area or motion vector.

FIG. 12 illustrates motion vector resolutions of areas determined according to an aspect of the present disclosure.

In FIG. 12, areas within one picture correspond to macroblocks each having a size of 16×16 and a motion vector resolution of each area is expressed in each area. Hereinafter, an example of encoding the motion vector resolutions of the areas shown in FIG. 12 by using the runs and lengths thereof will be described. When the motion vector resolutions of the areas shown in FIG. 12 are ordered in a raster scan direction, the motion vector resolution of ½ occurs four times in a row, the motion vector resolution of ¼ once, the motion vector resolution of ⅛ twice in a row, and the motion vector resolution of ½ is four times in a row (the motion vector resolutions thereafter are omitted). As a result, using the runs and lengths, those motion vector resolutions can be expressed as (½, 4), (¼, 1), (⅛, 2), (½, 4), . . . . Therefore, the resolution encoder 940 can generate a resolution identification flag by encoding the motion vector resolution of each area expressed using the run and length and expressing the resolution by a bit value.

Further, the resolution encoder 940 may generate a resolution identification flag by hierarchically encoding the motion vector resolutions of each area or motion vector by using a tag tree. In this event, the resolution encoder 940 may include an identifier which indicates the maximum number of the tag tree layers and the size of the area indicated by the lowest node, in a header.

FIG. 13 illustrates an example of motion vector resolution hierarchically expressed in a tag tree structure according to an aspect of the present disclosure.

In particular, FIG. 13 shows the hierarchical tag tree structure of the motion vector resolution respectively determined for the individual areas within a section of an image. It is assumed that each of the areas corresponds to a macroblock having a size of 16×16.

In FIG. 13, since the minimum value is ½ among the motion vector resolutions of the first four areas of level 3, the motion vector resolution of the first area is ½. The areas are hierarchically grouped in this way as many times as the number of layers, and coded bits are then generated from each upper layer to its lower layer to complete the encoding stage thereof.

FIG. 14 illustrates a result of the encoding of the motion vector resolutions hierarchically expressed in a tag tree structure according to an aspect of the present disclosure.

In a method of generating a coded bit of each area, subtracted values between the motion vector resolution number designations in current layers and their higher layers from the root to end nodes of the tree are expressed by a series of "0" finished with the last bit value of "1". In this event, in the case of the highest layer, based on an assumption that a motion vector resolution of its higher layer is designated "0", a motion vector resolution of ½ is "1", a motion vector resolution of ¼ is "2", and a motion vector resolution of ⅛ is "3", a resolution identification flag may be generated as shown in FIG. 14 by hierarchically encoding the motion vector resolutions of the areas as shown in FIG. 13 with the tag tree structure. In this event, the number assigned to each motion vector resolution may be changed.

In FIG. 14, pair of numbers (0,0), (0,1), etc. expressed in the respective areas correspond to reference numbers identifying the areas, and numerals "0111", "01", etc. correspond to bit values of resolution identification flags obtained by encoding the motion vector resolutions of the areas.

In the case of the resolution identification flag in the area identified by (0,0), Level 0 has its higher layer motion vector resolution numbered "0" as Level 1 has the motion vector resolution of ½ numbered "1" leading to subtracted value between the Level 1 number and the Level 0 number into "1" which is converted to a coded bit of "01". Again, Level 1 has a difference from its higher layer (Level 0) in their motion vector resolution numbers by subtracted value "0" which turns to a coded bit of "1". Yet again, Level 2 has a difference from its upper layer (Level 1) in their motion vector resolution numbers by subtracted value "0" which turns to a coded bit of "1". Furthermore, in Level 3, since the difference between the numbers of the motion vector resolutions of Level 3 and the higher layer (Level 2) is "0", an encoded bit of "1" is obtained. As a result, "0111" is finally obtained as encoded bits of the motion vector resolution of the area identified by (0,0).

In the case of the resolution identification flag of the area identified by (0,1), Level 0, Level 1, and Level 2 are already reflected in the resolution identification flag identified by (0,0). Therefore, only in Level 3, "1", which is the difference between the numbers of the motion vector resolutions of Level 3 and the higher layer (Level 2), is encoded, so as to obtain an encoded bit of "01". As a result, only "01" is finally obtained as a resolution identification flag of the area identified by (0,1).

In the case of the resolution identification flag of the area identified by (0,4), Level 0 is already reflected in the resolution identification flag identified by (0,0). Therefore, only Level 1, Level 2, and Level 3 are subjected to an encoding in the way described above, so that "0111" is finally obtained as the encoded bits.

Further, the resolution encoder 940 may generate a resolution identification flag by changing and encoding the number of bits allocated to the motion vector resolution according to the frequency of the motion vector resolution determined for each motion vector or area. To this end, the resolution encoder 940 may change and encode the number of bits allocated to the motion vector resolution of a corresponding area according to the occurrence frequency of the motion vector resolution up to the just previous area in the unit of area, or may change and encode the number of bits allocated to the motion vector resolution of a corresponding section, which includes a plurality of areas, according to the occurrence frequency of the motion vector resolution up to the just previous section or the occurrence frequency of the motion vector resolution of the just previous section in the unit of sections. To this end, the resolution encoder 940 may encode the motion vector resolution of each area by calculating the frequency of the motion vector resolution in the unit of areas or sections, allocating numbers to the motion vector resolutions in a sequence causing the smaller number to be allocated to a motion vector resolution having the larger frequency, and allocating the smaller number of bits to the motion vector resolutions allocated the smaller numbers.

For example, in the case where the resolution encoder 940 changes the bit numbers according to the occurrence frequency of the motion vector resolution up to the previous area in the unit of areas, if the motion vector resolution of ½ has occurred 10 times, the motion vector resolution of ¼ has occurred 15 times, and the motion vector resolution of ⅛ has occurred 8 times in all areas up to the previous area, the resolution encoder 940 allocates the smallest number (e.g. No. 1) to the motion vector resolution of ¼, the next smallest number (e.g. No. 2) to the motion vector resolution of ½, and the largest number (e.g. No. 3) to the motion vector resolution of ⅛, and allocates a smaller number of bits to the motion vector resolutions in a sequence from the smaller number to the larger number. Then, if the motion vector resolution of the area, for which the motion vector resolution is to be encoded, corresponds to the ¼ pixel unit, the resolution encoder 940 may allocate the smallest bits to the motion vector resolution, so as to encode the motion vector resolution of ¼ for the area.

Further, in the case where the resolution encoder 940 changes and encodes the bit numbers according to the frequency of occurrences of the motion vector resolution up to the previous area group in the unit of area groups, the resolution encoder 940 may encode the motion vector resolution of each area of the area group, for which the motion vector resolution is to be encoded, by updating the occurrence frequency of the motion vector resolution of each area up to the previous area group, allocating numbers to the motion vector resolutions in a sequence causing the smaller number to be allocated to a motion vector resolution having the larger frequency, and allocating the smaller number of bits to the motion vector resolutions allocated the smaller numbers. The area group may be a Quadtree, a Quadtree bundle, a tag tree, a tag tree bundle, a macroblock, a macroblock bundle, or an area in a predetermined size. For example, when the area group is appointed as including two macroblocks, it is possible to update the frequency of occurrence of the motion vector resolution for every two macroblocks and allocate a bit number of the motion vector resolution to the updated frequency. Otherwise, when the area group is appointed as including four Quadtrees, it is possible to update the frequency probability of the motion vector resolution for every four Quadtrees and allocate a bit number of the motion vector resolution to the updated frequency.

Further, the resolution encoder 940 may use different methods for encoding a resolution identification flag according to the distribution of the motion vector resolutions of surrounding areas of each area with respect to the motion vector resolution determined according to each area or motion vector. That is, the smallest bit number is allocated to a resolution having the highest probability that the resolution may be the resolution of a corresponding area according to the distribution of the motion vector resolutions of surrounding areas or area groups. For example, if a left side area of an area has a motion vector resolution of ½ and an upper side area of the area has a motion vector resolution of ½, it is most probable that the area has a motion vector resolution of ½, and the smallest bit number is thus allocated to the motion vector resolution of ½, which is then encoded. As another example, if a left side area of an area has a motion vector resolution of ¼, a left upper side area of the area has a motion vector resolution of ½, an upper side area of the area has a motion vector resolution of ½, and a right upper side area of the area has a motion vector resolution of ½, the bit numbers are allocated to the motion vector resolutions in a sequence causing the smaller bit number to be allocated to a motion vector resolution having the higher probability, such as in a sequence of ½, ¼, ⅛, . . . , and the motion vector resolutions are then encoded.

Further, in performing the entropy encoding by an arithmetic encoding, the resolution encoder 940 uses different methods of generating a bit string of a resolution identification flag according to the distribution of the motion vector resolutions of the surrounding areas of each area for the motion vector resolution determined according to each motion vector or area and applies different context models according to the distribution of the motion vector resolutions of the surrounding areas and the probabilities of the motion vector resolution having occurred up to the present for the arithmetic encoding and probability update.

Referring to FIG. 21 as an example, based on an assumption that an entropy encoding is performed using only three motion vector resolutions including ½, ¼, and ⅛ by the CABAC, if a left side area of a pertinent area has a motion vector resolution of ½ and an upper side area of the area has a motion vector resolution of ½, the shortest bit string is allocated to the motion vector resolution of ½ and the other bit strings are allocated to the motion vector resolutions in a sequence causing the smaller bit number to be allocated to a motion vector resolution having the higher probability. Specifically, if the motion vector resolution of ⅛ has the higher occurrence probability than that of the motion vector resolution of ¼, the bitstream of "00" is allocated to the motion vector resolution of ⅛ and the bitstream of "01" is allocated to the motion vector resolution of ½ for the arithmetic encoding.

Further, in encoding the first bit string, four different context models may be used, which include: a first context model in which the resolution of the left side area is equal to the resolution of the upper side area, which is equal to the resolution of the highest probability up to the present; a second context model in which the resolution of the left side area is equal to the resolution of the upper side area, which is different from the resolution of the highest probability up to the present; a third context model in which the resolutions of the left side area and the upper side area are different from each other and at least one of the resolutions of the left side area and the upper side area is equal to the resolution of the highest probability up to the present; and a fourth context model in which the resolutions of the left side area and the upper side area are different from each other and neither of them is equal to the resolution of the highest probability up to the present. In encoding the second bit string, two different context models may be used, which include: a first context model in which the resolutions of the left side area and the upper side area are different from each other and at least one of the resolutions of the left side area and the upper side area is equal to the resolution of the highest probability up to the present; and a second context model in which the resolutions of the left side area and the upper side area are different from each other and neither of them is equal to the resolution of the highest probability up to the present.

As another example, based on an assumption that an entropy encoding is performed using only three motion vector resolutions including ½, ¼, and ⅛ by the CABAC and the highest motion vector resolution up to the present is ¼, "1", which is the shortest bitstream, is allocated to the motion vector resolution of ¼ and "00" and "01" are then allocated to the other motion vector resolutions of ½ and ⅛, respectively. Further, in encoding the first bit string, three different context models may be used, which include: a first context model in which each of the resolutions of the left side area and the upper side area of a corresponding area is equal to the resolution of the highest probability up to the present; a second context model in which only one of the resolutions of the left side area and the upper side area of a corresponding area is equal to the resolution of the highest probability up to the present; and a third context model in which neither of the resolutions of the left side area and the upper side area of a corresponding area is equal to the resolution of the highest probability up to the present. In encoding the second bit string, six different context models may be used, which include: a first context model in which each of the resolution of the left side area and the resolution of the upper side area of a corresponding area corresponds to a motion vector resolution of ⅛; a second context model in which each of the resolutions of the left side area and the upper side area of a corresponding area corresponds to a motion vector resolution of ½; a third context model in which each of the resolutions of the left side area and the upper side area of a corresponding area corresponds to a motion vector resolution of ¼; a fourth context model in which one of the resolutions of the left side area and the upper side area of a corresponding area corresponds to a motion vector resolution of ⅛ and the other resolution corresponds to a motion vector resolution of ¼; a fifth context model in which one of the resolutions of the left side area and the upper side area of a corresponding area corresponds to a motion vector resolution of ½ and the other resolution corresponds to a motion vector resolution of ¼; and a sixth context model in which one of the resolutions of the left side area and the upper side area of a corresponding area corresponds to a motion vector resolution of ⅛ and the other resolution corresponds to a motion vector resolution of ½. The resolution of the highest probability up to now may be of the probability of resolution encoded up to the previous area, a probability of a certain area, or a predetermined fixed resolution.

Further, the resolution encoder 940 may determine whether a video decoding apparatus can estimate a motion vector resolution of each motion vector or area according to a prearranged estimation scheme. Then, for an area having an estimable motion vector resolution, the resolution encoder 940 may encode a positive identifier, which indicates that it can be estimated, so as to generate a resolution identification flag. In contrast, for an area having an inestimable motion vector resolution, the resolution encoder 940 may encode a negative identifier, which indicates that it cannot be estimated, and a motion vector resolution of a corresponding area, so as to generate a resolution identification flag.

That is, in order to encode a motion vector resolution of each motion vector or area, the resolution encoder 940 calculates a motion vector and a predicted motion vector of the area with multiple motion vector resolutions applied, encodes a differential motion vector between them, decodes the differential motion vector, and decodes the motion vector for each resolution by using the reconstruction of the decoded differential motion vector based on assumption that each resolution is the optimum resolution. Then, the resolution encoder 940 determines a motion vector resolution, which has the lowest cost according to a predetermined cost function when motions of surrounding pixels of a corresponding area by using the motion vector reconstructed based on an assumption that each resolution is the optimum resolution. When the motion vector resolution determined in the way described above is equal to a motion vector resolution of a corresponding area originally desired to be encoded (i.e. a motion vector resolution determined as an optimum motion vector resolution of the corresponding area, on condition that the optimum motion vector resolution does not imply that it always exhibits the optimum performance and simply refers to a motion vector resolution determined as optimum under the conditions for determining the motion vector resolution), the resolution encoder 940 may generate an identifier (e.g. "1"), indicating that the video decoding apparatus can estimate the motion vector resolution of the corresponding area, as a resolution identification flag of the corresponding area. In this event, the motion vector resolution of the corresponding area is not encoded. When the determined motion vector resolution is not equal to the motion vector resolution of the corresponding area intended to be encoded, the resolution encoder 940 may encode an identifier (e.g. "0"), indicating that the video decoding apparatus cannot estimate the motion vector resolution of the corresponding area, and the original motion vector resolution of the corresponding area, so as to generate a resolution identification flag of the corresponding area. In this event, various distortion functions, such as Mean Square Error (MSE) or Sum of Absolute Transformed Differences (SATD), may be used as the predetermined cost function.

Further, when each component of the differential motion vector is "0", the resolution encoder 940 may dispense with encoding the resolution of the motion vector or area. When each component of the differential motion vector is "0", a predicted motion vector is encoded to a motion vector, which makes it unnecessary to encode the motion vector resolution.

Figure 15:
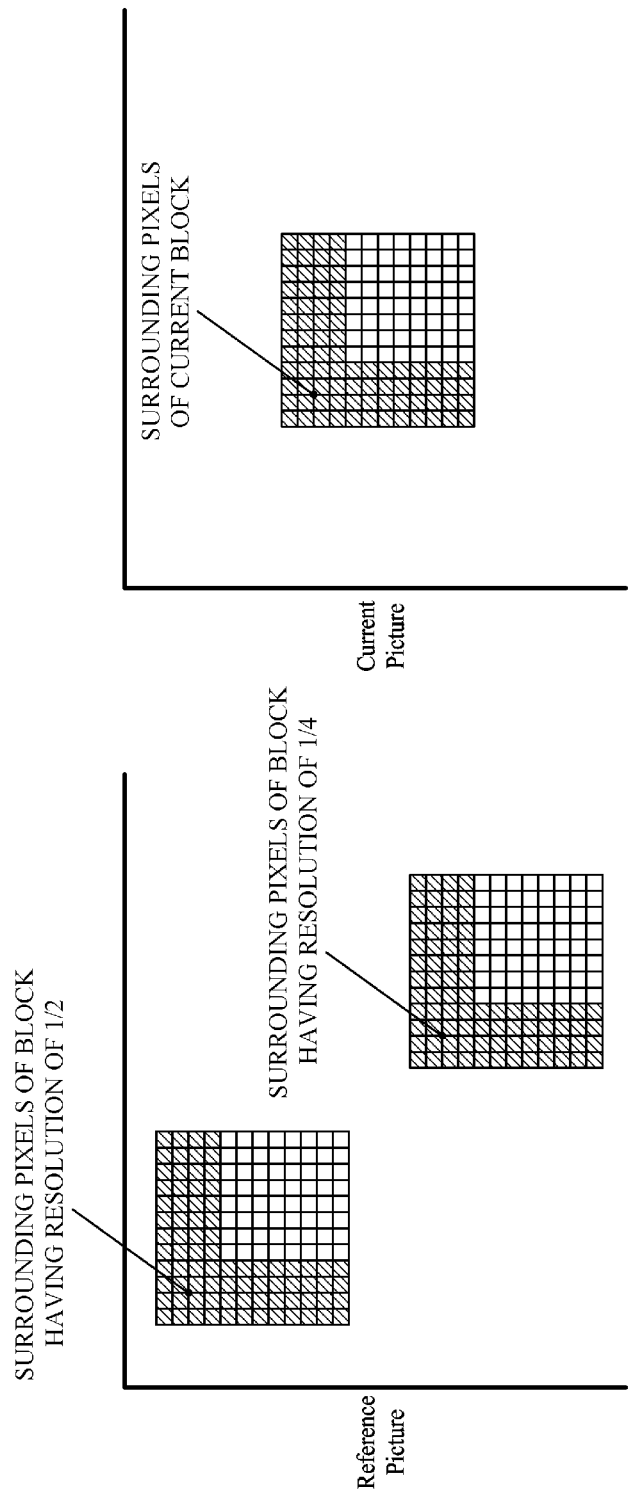
FIG. 15 illustrates an example of a process for determining a motion vector resolution by using surrounding pixels of an area according to an aspect of the present disclosure.

FIG. 15 illustrates an example of a process for determining a motion vector resolution by using surrounding pixels of an area according to an aspect of the present disclosure.

Referring to FIG. 15, if the optimum motion vector resolution determined as a result of the motion estimation for an area, the motion vector resolution of which is to be encoded by the resolution encoder 940, is a motion vector resolution of ½, a motion vector is (4, 10), and a predicted motion vector is (2, 7), the differential motion vector is (2, 3). In this event, based on an assumption that a video decoding apparatus can decode and reconstruct only a differential vector, the resolution encoder 940 may change the motion vector resolution into various motion vector resolutions, predict a predicted motion vector according to each motion vector resolution, reconstruct a motion vector according to each motion vector resolution, and determine a motion vector resolution having a least distortion between surrounding pixels of a current area and surrounding pixels of an area indicated by a motion vector according to each reconstructed motion vector resolution.

If the motion vector resolution corresponds to the ¼ pixel unit and the predicted motion vector is (3, 14), the differential motion vector reconstructed by the video decoding apparatus is (2, 3) and the motion vector of the corresponding reconstructed area is thus (5, 17). Further, if the motion vector resolution corresponds to a ½ pixel unit and the predicted motion vector is (2, 7), the differential motion vector reconstructed by the video decoding apparatus is (2, 3) and the motion vector of the corresponding reconstructed area is thus (4, 10). In the same way as described above, a motion vector of a corresponding area reconstructed by the video decoding apparatus is also calculated in the case where the motion vector resolution corresponds to the ⅛ pixel unit.

When the motion vector resolution having a least distortion between surrounding pixels of a corresponding area and surrounding pixels of an area having been motion-compensated in a reference picture by using a motion vector of a corresponding area reconstructed according to each motion vector resolution is equal to an optimum motion vector resolution determined in advance, the resolution encoder 940 encodes only an identifier, indicating that the video decoding apparatus can estimate the motion vector resolution, so as to generate a resolution identification flag of the corresponding area, and does not encode the motion vector resolution of the corresponding area.

When the size of a predicted motion vector or differential motion vector of a motion vector according to a motion vector resolution determined for each area or motion vector is larger than a threshold, the resolution determiner 930 may determine a predetermined value as the motion vector resolution of each area or motion vector. For example, when the size of a differential motion vector or the size of a predicted motion vector of an area or a motion vector is larger than a threshold, the resolution determiner 930 may determine a predetermined value as a motion vector resolution of the area or the motion vector without encoding the motion vector resolution of the area. Further, when the size of a motion vector of a surrounding area of an area or a motion vector is larger or the size of a motion vector of an area is larger than a threshold, the resolution determiner 930 may determine a predetermined value as a motion vector resolution of the area without encoding the motion vector resolution of the area. In this event, the motion vector resolution of the area or motion vector can be changed to a predetermined resolution even without a flag. The threshold may be a pre-appointed value or any inputted values, or may be calculated from a motion vector of a surrounding block.

When the resolution of the current block is identifiable with a reference picture index, the resolution determiner 930 may encode information on the resolution by encoding the reference picture index without generating a resolution identification flag.

For example, based on the distance between the current picture and the reference picture as shown in FIG. 30, the resolution determiner 930 may index and encode the reference picture. For example, based on an assumption that four reference pictures are used, candidates of reference pictures, which can be indexed when the current picture is No. 5, can be indexed as shown in FIG. 31.

FIG. 31 is a table illustrating an example of reference picture indexes according to reference picture numbers and resolutions.

With resolutions ¼ and ⅛ being used, in the event illustrated in FIG. 13 where the optimal reference picture is numbered 3 and has the resolution of ⅛, the reference picture index may be encoded into 3, and then the decoding apparatus will know that the reference picture number of 3 after extracting the same from the bitstream and that the resolution is ⅛ by using the same table as is used by the decoder.

The differential vector encoder 950 may differently encode differential vectors depending on the motion vector resolutions. That is, as the motion vector resolution increases, the size of the motion vector also increases and the required bit quantity thus increases. Therefore, by encoding differential vectors in different ways according to the motion vector resolutions, the differential vector encoder 950 can reduce the bit quantity.

For example, when the differential vector encoder 950 encodes the differential vector by using the UVLC, the differential vector encoder 950 may use the K-th order Exp-Golomb code in the encoding. In this event, the differential vector encoder 950 may change the degree of order (K) of the Exp-Golomb code according to the motion vector resolution determined for each area. For example, in the case of encoding the differential vector by using the UVLC, the degree of order (K) of the Exp-Golomb code can be set to "0" when the motion vector resolution corresponds to the ¼ pixel unit and the degree of order (K) of the Exp-Golomb code can be set to "1" when the motion vector resolution corresponds to the ⅛ pixel unit.

Further, when the differential vector encoder 950 encodes the differential vector by using the CABAC, the differential vector encoder 950 may use the Concatenated Truncated Unary/K-th Order Exp-Golomb Code in the encoding. In the encoding, the differential vector encoder 950 may change the degree of order (K) and the maximum value (T) of the Concatenated Truncated Unary/K-th Order Exp-Golomb Code according to the motion vector resolution determined for each area. For example, in the case of encoding the differential vector by using the CABAC, the degree of order (K) of the code may be set to "3" and the maximum value (T) of the code may be set to "6" when the motion vector resolution corresponds to the ¼ pixel unit, and the degree of order (K) of the code may be set to "5" and the maximum value (T) of the code may be set to "12" when the motion vector resolution corresponds to the ⅛ pixel unit.

In addition, when the differential vector encoder 950 encodes the differential vector by using the CABAC, the differential vector encoder 950 may differently calculate the accumulation probability according to the motion vector resolution determined for each area. For example, whenever encoding the differential vectors of the areas, the differential vector encoder 950 may update each context model according to the motion vector resolution determined for each area, and may use the updated context model according to each motion vector resolution when encoding a differential vector of another area. That is, when a motion vector resolution of an area corresponds to the ½ pixel unit, the differential vector encoder 950 may encode the differential vector by using the context model of the ½ pixel unit and update the context model of the ½ pixel unit. Further, when a motion vector resolution of an area corresponds to the ⅛ pixel unit, the differential vector encoder 950 may encode the differential vector by using the context model of the ⅛ pixel unit and update the context model of the ⅛ pixel unit.

Further, in order to calculate the differential vector of each area, the differential vector encoder 950 may predict a predicted motion vector for each area or motion vector by using motion vectors of surrounding areas of each area or motion vector. In this event, when the motion vector resolution of each area is not equal to the motion vector resolution of surrounding areas, the differential vector encoder 950 may convert the motion vector resolution of the surrounding areas to the motion vector resolution of said each area for the prediction. For the converting of the motion vector resolution, it is possible to use a round-off, a round-up, and a round-down. In this event, it is required to understand that the surrounding areas include adjacent areas.

Figure 16:
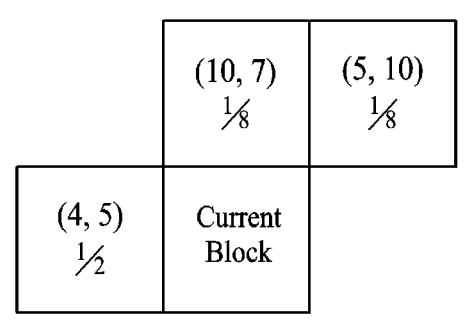

FIG. 16 is a view for illustrating the process of predicting a predicted motion vector according to an aspect of the present disclosure.

Referring to the example shown in FIG. 16, if motion vectors of surrounding areas of an area of a predicted motion vector to be predicted are (4, 5), (10, 7), and (5, 10) and a round-off is used for the converting, the predicted motion vector may be (5, 5) when the resolution of the motion vector of the area to be predicted is ¼, and the predicted motion vector may be (10, 10) when the resolution of the motion vector of the area to be predicted is ⅛.

Further, when the block mode of one or more areas among the areas is a skip mode, the differential vector encoder 950 may convert the motion vector resolution of the area of the motion vector to be predicted to the highest resolution among the motion vector resolutions of surrounding areas of the area and then perform the prediction. Referring to the example shown in FIG. 16, when the area to be predicted is in the skip mode, since the highest resolution among the motion vector resolutions of the surrounding areas is ⅛, a predicted motion vector of (10, 10) is obtained based on an assumption that the resolution of the area to be predicted is ⅛.

Moreover, in predicting a predicted motion vector of an area to be predicted by using motion vectors of surrounding areas of the area, the differential vector encoder 950 may convert the motion vectors of the surrounding areas to a predetermined resolution. In this event, when a predetermined motion vector resolution and the motion vector resolution of the area to be predicted are not equal to each other, the differential vector encoder 950 may convert the predetermined motion vector resolution to the motion vector resolution of the area of the predicted motion vector to be predicted, so as to obtain a final predicted motion vector. Referring to the example shown in FIG. 16, the predicted motion vector is converted to (3, 3) when the predetermined motion vector resolution corresponds to the ½ pixel unit. Further, when the motion vector resolution of the area to be predicted corresponds to the ⅛ pixel unit, which is not equal to the predetermined motion vector resolution, the predicted motion vector of (3, 3) is converted to the ⅛ pixel unit, so as to obtain a final predicted motion vector of (12, 12). In the same way, when the motion vector resolution of the area to be predicted corresponds to the ¼ pixel unit, it is possible to obtain a final predicted motion vector of (12, 12).

Figure 17:
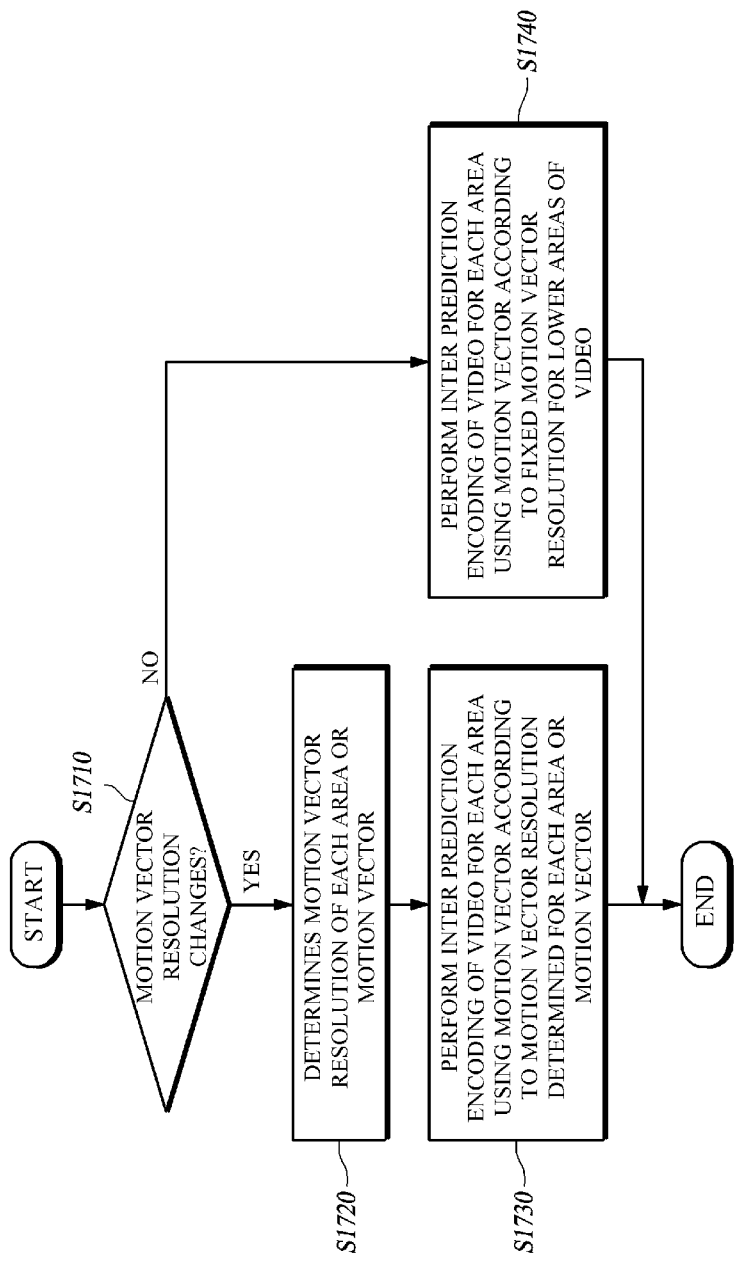
FIG. 17 is a flowchart for describing a method for encoding a video by using an adaptive motion vector resolution according to an aspect of the present disclosure.

FIG. 17 is a flowchart for describing a method for encoding a video by using an adaptive motion vector resolution according to a first aspect of the present disclosure.

In a method for encoding a video by using an adaptive motion vector resolution according to a first aspect of the present disclosure, a motion vector resolution is first determined for each area or motion vector, and an inter prediction encoding of a video is performed in the unit or areas by using a motion vector according to the motion vector resolution determined for each area or motion vector. To this end, a video encoding apparatus 900 using an adaptive motion vector resolution according to a first aspect of the present disclosure determines whether the motion vector resolution changes according to each area or motion vector of a video (step S1710). When the motion vector resolution changes according to each area or motion vector, the video encoding apparatus 900 determines the motion vector resolution of each area or motion vector (step S1720). Then, the video encoding apparatus 900 performs an inter prediction encoding of the video in the unit of areas by using a motion vector according to the motion vector resolution determined for each area or motion vector (step S1730). In contrast, when the motion vector resolution does not change but is fixed regardless of the area or motion vector, the video encoding apparatus 900 performs an inter prediction encoding of the video in the unit of areas by using a motion vector according to the fixed motion vector resolution for lower areas within some areas or all areas of the video (step S1740).

In this event, the motion vector resolution determined for each area may have different values for an x component and a y component of the area.

Further, the video encoding apparatus 900 may generate a resolution identification flag, which indicates whether to determine the motion vector resolution, according to each area or motion vector. For example, when it is determined in step S1710 that the motion vector resolution changes according to each area or motion vector, the video encoding apparatus 900 may generate a resolution identification flag (e.g. "1") indicating that the motion vector resolution changes according to each area or motion vector. Further, when it is determined in step S1710 that the motion vector resolution does not change but is fixed regardless of the area or motion vector, the video encoding apparatus 900 may generate a resolution identification flag (e.g. "0") indicating that the motion vector resolution does not change but is fixed regardless of the area or motion vector. In contrast, the video encoding apparatus 900 may generate a resolution identification flag according to the set information input from a user or an exterior, and may determine whether the motion vector resolution is determined for each area as in step S1710 based on the bit value of the generated resolution identification flag.

Further, the video encoding apparatus 900 may encode a motion vector resolution determined for each area or motion vector. For example, the video encoding apparatus 900 may hierarchically encode the motion vector resolutions determined for respective areas or motion vectors in a Quadtree structure by grouping areas having the same motion vector resolution together, may encode the motion vector resolution determined for each area or motion vector by using a motion vector resolution predicted using motion vector resolutions of surrounding areas of each area, may encode the motion vector resolution determined for each area or motion vector by using the run and length or may hierarchically encode the motion vector resolutions by using a tag tree, or may perform the encoding while changing the number of bits allocated to the motion vector resolution according to the frequency of the motion vector resolution determined for each area or motion vector. Also, the video encoding apparatus 900 may determine whether a video decoding apparatus can estimate the motion vector resolution determined for each area or motion vector according to a pre-promised estimation scheme, and then encode an identifier indicating the capability of estimation for an area having a motion vector resolution that can be estimated or encode an identifier indicating the incapability of estimation for an area having a motion vector resolution that cannot be estimated. In the case where the video encoding apparatus 900 hierarchically encodes the motion vector resolutions in a Quadtree structure or by using a tag tree, the video encoding apparatus 900 may encode an identifier, which indicates the size of an area indicated by the lowest node of the tag tree layers and the maximum number of the tag tree layers or the size of an area indicated by the lowest node of the Quadtree layers and the maximum number of the Quadtree layers, and then include the encoded identifier in a header.

Further, when the size of the differential motion vector or predicted motion vectors of the motion vector according to the motion vector resolution determined for each area is larger than a threshold, the video encoding apparatus 900 may determine a predetermined value or a certain value as the motion vector resolution determined for each area. Further, when each component of the differential motion vector is "0", the video encoding apparatus 900 may dispense with encoding the resolution of the motion vector or area.

Further, the video encoding apparatus 900 may encode a differential motion vector corresponding to a difference between a predicted motion vector and a motion vector according to the motion vector resolution determined for each area or motion vector. In this event, the video encoding apparatus 900 may differently encode the differential motion vector depending on the motion vector resolution. To this end, when the video encoding apparatus 900 encodes the differential vector by using the UVLC, the video encoding apparatus 900 may use the K-th order Exp-Golomb code in the encoding. In this event, the video encoding apparatus 900 may change the degree of order (K) of the Exp-Golomb code according to the motion vector resolution determined for each area. Further, when the video encoding apparatus 900 encodes the differential vector by using the CABAC, the video encoding apparatus 900 may use the Concatenated Truncated Unary/K-th Order Exp-Golomb Code in the encoding. In the encoding, the video encoding apparatus 900 may change the degree of order (K) and the maximum value (T) of the Concatenated Truncated Unary/K-th Order Exp-Golomb Code according to the motion vector resolution determined for each area. In addition, when the video encoding apparatus 900 encodes the differential vector by using the CABAC, the video encoding apparatus 900 may differently calculate the accumulation probability according to the motion vector resolution determined for each area.

Further, the video encoding apparatus 900 may predict a predicted motion vector for a motion vector of each area by using motion vectors of surrounding areas of each area. In this event, when the motion vector resolution of each area is not equal to the motion vector resolution of surrounding areas, the video encoding apparatus 900 may perform the prediction after converting the motion vector resolution of the surrounding areas to the motion vector resolution of said each area.

In addition, the video encoding apparatus 900 may use different methods of encoding a resolution identification flag according to the distribution of the motion vector resolutions of surrounding areas of each area with respect to the motion vector resolution determined according to each area or motion vector.

Further, in performing the entropy encoding by an arithmetic encoding, the video encoding apparatus 900 uses different methods of generating a bit string of a resolution identification flag according to the distribution of the motion vector resolutions of the surrounding areas of each area and applies different context models according to the distribution of the motion vector resolutions of the surrounding areas and the probabilities of the motion vector resolution having occurred up to the present, for the arithmetic encoding and probability update. Also, the video encoding apparatus 900 uses different context models according to the bit position for the arithmetic encoding and context model update.

Moreover, when the block mode of one or more areas among the areas is a skip mode, the video encoding apparatus 900 may convert the motion vector resolution of the area of the motion vector to be predicted to the highest resolution among the motion vector resolutions of surrounding areas of the area and then perform the prediction.

Figure 32:
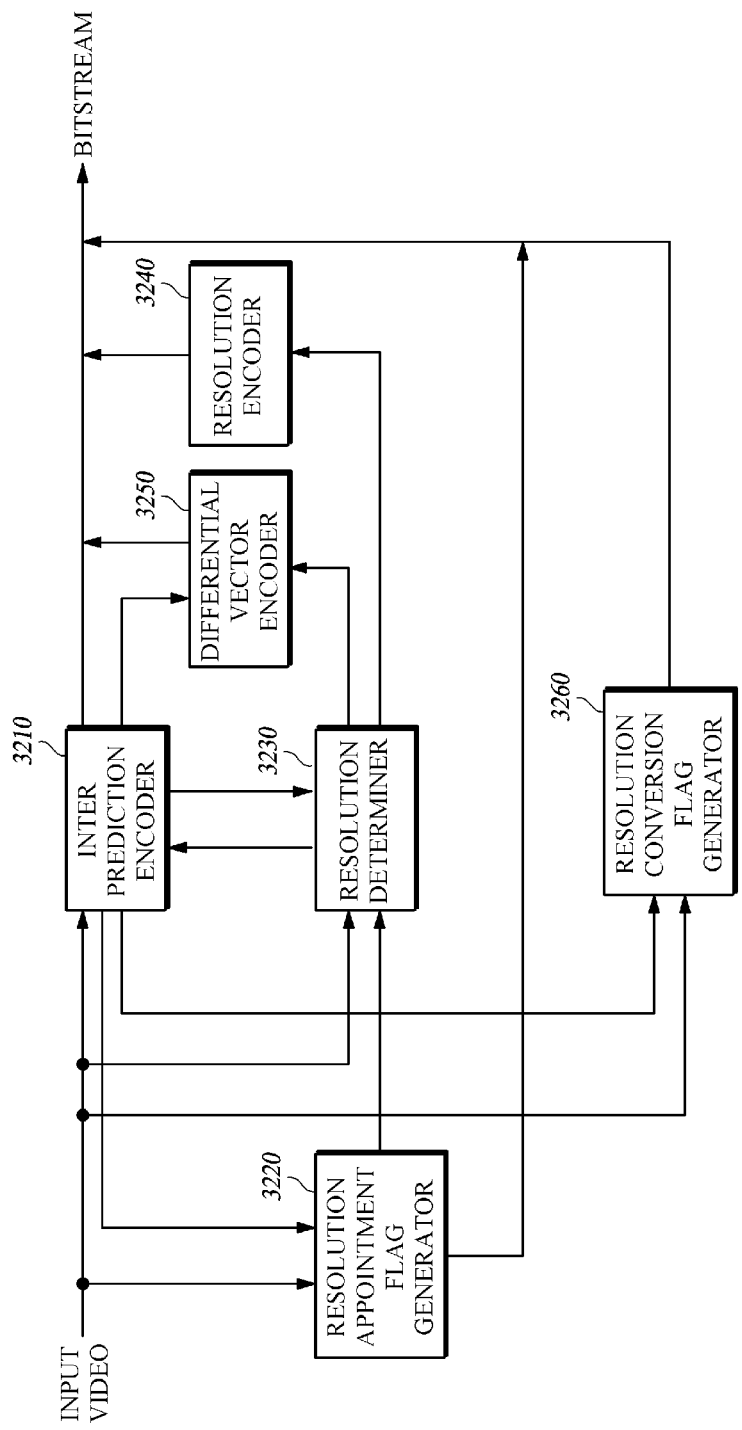
FIG. 32 is a schematic block diagram illustrating a video encoding apparatus 3200 using an adaptive motion vector according to the second aspect of the present disclosure.

FIG. 32 is a block diagram illustrating a video encoding apparatus 3200 using an adaptive motion vector according to the second aspect of the present disclosure.

A video encoding apparatus 3200 using an adaptive motion vector according to the second aspect of the present disclosure includes an inter prediction encoder 3210, a resolution appointment flag generator 3220, a resolution determiner 3230, a resolution encoder 3240, a differential vector encoder 3250, and a resolution conversion flag generator 3260. Meanwhile, it is not inevitably required that all of the resolution appointment flag generator 3220, resolution encoder 3240, the differential vector encoder 3250, and the resolution conversion flag generator 3260 should be included in the video encoding apparatus 3200, and they may be selectively included in the video encoding apparatus 3200.

The inter prediction encoder 3210 performs an inter prediction encoding of a video in the unit of areas of the image by using a motion vector according to a motion vector resolution determined for each motion vector or each area of the video. The inter prediction encoder 3210 can be implemented by the video encoding apparatus 100 described above with reference to FIG. 1. In this event, when one or more elements between the resolution encoder 3240 and the differential vector encoder 3250 of FIG. 32 are additionally included and the function of the additionally included element or elements overlaps with the function of the encoder 150 within the inter prediction encoder 3210, the overlapping function may be omitted in the encoder 150. Further, if there is an overlapping area between the function of the predictor 110 within the inter prediction encoder 3210 and the function of the resolution determiner 3230, the overlapping function may be omitted in the predictor 110.

Further, one or more elements between the resolution encoder 3240 and the differential vector encoder 3250 may be configured either as an element separate from the inter prediction encoder 3210 as shown in FIG. 32 or as an element integrally formed with the encoder 150 within the inter prediction encoder 3210. Further, the flag information generated in the resolution appointment flag generator 3220 or the resolution conversion flag generator 3260 may be transformed into a bitstream either by the resolution appointment flag generator 3220 or the resolution conversion flag generator 3260 or by the encoder 150 within the inter prediction encoder 3210.

Meanwhile, the functions of the inter prediction encoder 3210, the resolution encoder 3240, and the differential vector encoder 3250 may be equal or similar to those of the inter prediction encoder 910, the resolution encoder 940, and the differential vector encoder 950 in FIG. 9. Therefore, a detailed description on the inter prediction encoder 3210, the resolution encoder 3240, and the differential vector encoder 3250 is omitted here.

The resolution appointment flag generator 3220 may differently appoint the adaptability degree of the resolution according to each area or motion vector of a video. The resolution appointment flag generator 3220 may generate a resolution appointment flag appointing a set of motion vector resolutions and/or differential motion vector resolutions to each area or motion vector of a video, and then include the generated resolution appointment flag in a bitstream. The area using the resolution appointment flag to indicate a motion vector resolution and/or differential motion vector resolution may be a block, a macroblock, a group of blocks, a group of macroblocks, or an area having a predetermined size, such as M×N. That is, the resolution appointment flag generator 3220 may generate a resolution appointment flag indicating a resolution available for lower areas within some areas of a video or all areas of the video, and then include the generated resolution appointment flag in a bitstream. Such a resolution appointment flag may be determined and generated either according to configuration information input by a user or according to a predetermined determination criteria based on an analysis of the video to be encoded. The resolution appointment flag may be included in a header of a bitstream, such as a picture parameter set, a sequence parameter set, or a slice header.

If the resolution appointment flag appoints ½ and ¼ as the resolution options, the optimum resolution determined by the resolution determiner 3230 and the resolution identification flag encoded by the resolution encoder 3240 are selected from the resolutions of ½ and ¼ and the resolution identification flag may be encoded according to a predetermined method. FIG. 33 illustrates resolution identification flags in the case in which the appointed resolutions are ½ and ¼.

Further, the resolution identification flag may be encoded using a unary coding, a CABAC, or a Quadtree coding. For example, in the case of using the CABAC, a bit string may be first generated using the table shown in FIG. 33 and then subjected to an arithmetic and probability encoding. For example, according to the motion vector resolutions of surrounding motion vectors or blocks, the context models may be divided into three cases. FIG. 34 illustrates current block X and its surrounding blocks A, B, and C, and FIG. 35 illustrates a context model according to the conditions.

If the resolution appointment flag appoints ½, ¼, and ⅛ as the resolution options, the encoded resolution identification flag may be selected from the resolutions of ½, ¼, and ⅛ and the resolution identification flag may be encoded according to a predetermined method. FIG. 36 illustrates resolution identification flags in the case in which the appointed resolutions are ½, ¼, and ⅛. Referring to FIG. 36, the resolution identification flag may be 0, 10, or 11.

The resolution identification flag may be encoded using a unary coding, a CABAC, or a Quadtree coding. For example, in the case of using the CABAC, a bit string may be first generated using the table shown in FIG. 36 and then subjected to an arithmetic and probability encoding. For example, using the index of bin string and the motion vector resolutions of surrounding motion vectors or blocks, the context models may be divided into a total of six cases. In this event, based on FIG. 34 illustrating current block X and its surrounding blocks A, B, and C, FIG. 37 illustrates a context model according to the conditions.

In the meantime, the resolution appointment flag generated by the resolution appointment flag generator 3220 may indicate a single resolution. For example, in the case of fixing the resolution to ½ instead of adaptively applying the resolution, the resolution identification flag may be encoded to indicate that the resolution of the corresponding area is fixed to the resolution of ½.

Further, in the case of using multiple reference pictures, the adaptability degrees (i.e. resolution set) of the resolution may be set to be different according to the reference picture based on a predetermined criterion without encoding the resolution identification flag. For example, different adaptability degrees of the resolution may be employed according to the distance between the current picture and reference pictures.

FIGS. 38 and 39 illustrate examples of adaptability degrees according to distances between the current picture and reference pictures. As noted from FIG. 38, when the distance between the current picture and a reference picture is nearest (i.e. smallest) among the distances between the current picture and the multiple reference pictures, an optimum resolution may be selected from the resolution set including ⅟₁, ½, ¼, and ⅛ and a resolution identification flag may be encoded. When the distance between the current picture and a reference picture is farthest (i.e. largest) among the distances between the current picture and the multiple reference pictures, an optimum resolution may be selected from the resolution set including ½ and ¼ and a resolution identification flag may be encoded. When the distance between the current picture and a reference picture is neither nearest (i.e. smallest) nor farthest (i.e. largest) among the distances between the current picture and the multiple reference pictures, an optimum resolution may be selected from the resolution set including ½, ¼, and ⅛ and a resolution identification flag may be encoded. It is noted from FIG. 39 that it is possible to use a single resolution.

Further, at the time of generating reference pictures, different adaptability degrees of the resolution may be employed using an error measurement means, such as a Sum of Squared Difference (SSD) between resolutions. For example, if usable resolutions are ⅟₁, ½, ¼, and ⅛, in interpolating a reference picture, it is possible to set the resolution of ½ to be used only when an error value obtained using an error measurement means, such as an SSD, for the resolutions of ⅟₁ and ½ exceeds a predetermined threshold while setting the resolution of ½ not to be used when the error value does not exceed the predetermined threshold. Further, when it has been set that the resolution of ½ should not be used, it is determined whether an error value obtained using an error measurement means, such as an SSD, for the resolutions of ⅟₁ and ¼ exceeds a predetermined threshold. When the error value for the resolutions of ⅟₁ and ¼ does not exceed the predetermined threshold, the resolution of ¼ is set not to be used. In contrast, when the error value for the resolutions of ⅟₁ and ¼ exceeds the predetermined threshold, the resolutions of both ⅟₁ and ¼ are set to be used. Also, when the resolution of ¼ has been set to be used, it is determined whether an error value obtained using an error measurement means, such as an SSD, for the resolutions of ¼ and ⅛ exceeds a predetermined threshold. When the error value for the resolutions of ¼ and ⅛ does not exceed the predetermined threshold, the resolution of ⅛ is set not to be used. In contrast, when the error value for the resolutions of ¼ and ⅛ exceeds the predetermined threshold, all the resolutions of ½, ¼, and ⅛ are set to be used. The threshold may be different according to the resolutions or quantized parameters, or may be the same.

Further, it is possible to encode the employment of different adaptability degrees of the resolution according to the reference pictures. For example, in the case of using three reference pictures, it is possible to store different index numbers (resolution set indexes in FIG. 9, which may be reference picture numbers) according to predetermined resolution sets in a header and then transmit them to a decoding apparatus.

Figures 41, 42:
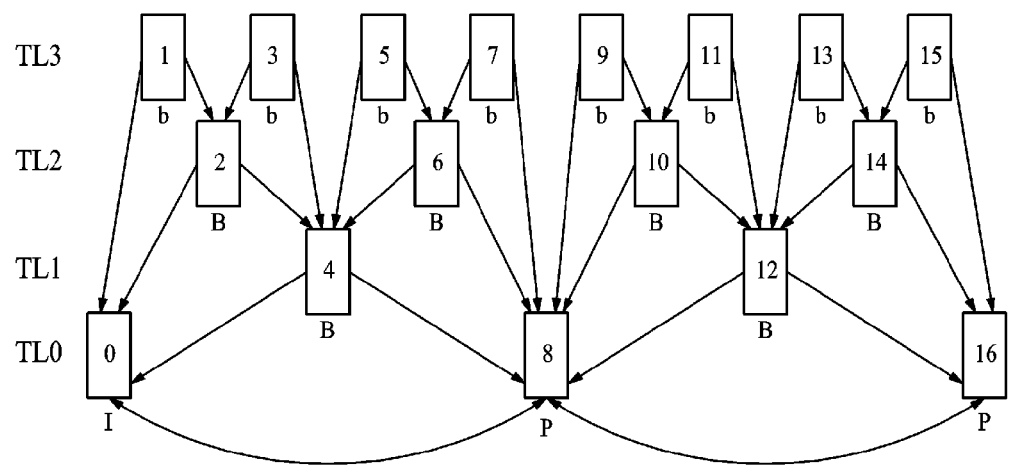
FIG. 41 illustrates an example of a structure for encoding of reference pictures.
FIG. 42 illustrates an example of resolution sets of reference pictures when the resolution sets are appointed to ½ and ¼.

FIG. 41 illustrates an example of a structure for encoding of reference pictures.

Meanwhile, the resolution appointment flag generator 3220 may use different resolution sets for a picture to be used as a reference picture and a picture not to be used as a reference picture, respectively. For example, it is assumed that reference pictures have been encoded with the structure as shown in FIG. 41, and pictures of time layers TL0, TL1, and TL2 correspond to pictures used as reference pictures while pictures of time layer TL3 correspond to pictures not used as reference pictures. In this event, when the resolution set has been appointed to ½ and ¼ by the resolution appointment flag generator 3220, the resolution sets according to the reference pictures may be arranged as shown in FIG. 42.

Referring to FIG. 42, the resolution sets at the time of encoding picture No. 6 are ½ and ¼, and the resolution identification flag or resolution appointment flag may be encoded in the unit of areas or motion vectors for the resolution sets determined as described above. At the time of encoding picture No. 9, the resolution is a single resolution and it is not required to encode the resolution identification flag or resolution appointment flag.

Meanwhile, the resolution appointment flag generator 3220 may include all functions of the resolution change flag generator 920 as described above with reference to FIG. 9.

The resolution conversion flag generator 3260 generates a resolution conversion flag, which indicates a change (or difference) between a resolution of an area to be currently encoded and a resolution of surrounding areas or a previous resolution.

FIG. 43 illustrates an example of a resolution of a current block and resolutions of surrounding blocks.

For example, when a resolution set includes ½, ¼, and ⅛ and resolutions of surrounding blocks and a current optimum resolution have values as shown in FIG. 43, the resolutions of the surrounding blocks are (⅛, ¼, ¼, and ¼) and the resolution having the highest frequency is ¼. Further, since the optimum resolution of current block X is also ¼, the resolution conversion flag is encoded to "0". In this event, the decoder can extract the resolution conversion flag from a bitstream. Also, when the resolution conversion flag is 0, the decoder can obtain information that the resolution having the highest frequency, ¼, is the resolution of current block X.

FIG. 44 illustrates another example of a resolution of a current block and resolutions of surrounding blocks, and FIG. 45 illustrates resolution identification flags according to resolutions.

In FIG. 44, since the optimum resolution of current block X is not ¼, which is the resolution of the surrounding block having the highest frequency among the resolutions of the surrounding blocks, the resolution conversion flag is encoded to 1 so as to indicate that it is a resolution different from those of the surrounding blocks, and the resolution identification flag of the resolution of current block X is encoded to 1 by using the table shown in FIG. 45. Since there is no possibility that ¼ is selected as the converted resolution when the current resolution is ¼, a resolution identification flag is not provided in the case of the resolution of ¼.

FIG. 46 illustrates an example of the resolution of the current block and the resolutions of surrounding blocks.

For example, when a resolution set includes ½ and ¼ and the encoding has been performed as shown in FIG. 46, since a previous block of current block X is A, the resolution conversion flag may indicate whether the resolution of block A and the resolution of current block X are identical to each other. Therefore, in the case described above, the resolution of block A and the resolution of current block X are not identical to each other, and the resolution conversion flag may thus have a value of 1. Further, since the resolution set includes ½ and ¼, it is possible to understand that the resolution of the current block is ¼, even with only the resolution conversion flag without additionally encoding the resolution identification flag.

Figure 47:
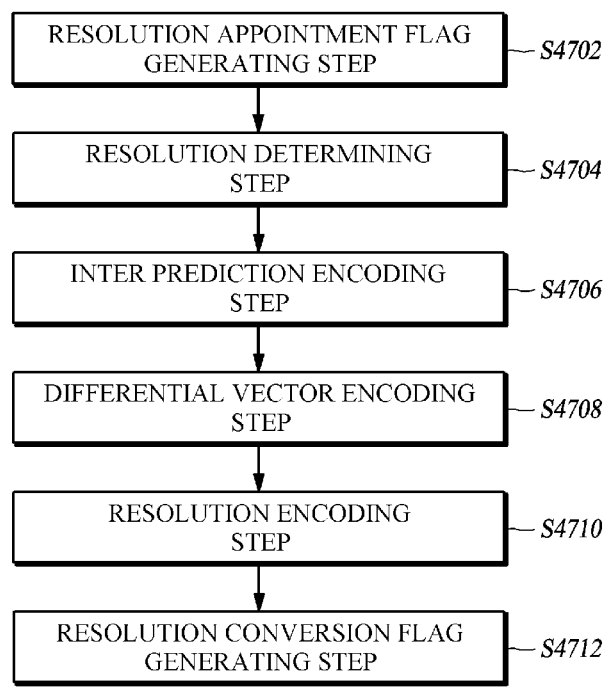
FIG. 47 is a flowchart illustrating a video encoding method using an adaptive motion vector resolution according to the second aspect of the present disclosure.

FIG. 47 is a flowchart illustrating a video encoding method using an adaptive motion vector resolution according to the second aspect of the present disclosure.

As shown in FIG. 47, the video encoding method using an adaptive motion vector resolution according to the second aspect of the present disclosure includes: a resolution appointment flag generating step (S4702), a resolution determining step (S4704), an inter prediction encoding step (S4706), a differential vector encoding step (S4708), a resolution encoding step (S4710), and a resolution conversion flag generating step (S4712).

The resolution appointment flag generating step (S4702) corresponds to the operation of the resolution appointment flag generator 3220, a resolution determining step (S4704) corresponds to the operation of the resolution determiner 3230, an inter prediction encoding step (S4706) corresponds to the operation of the inter prediction encoder 3210, a differential vector encoding step (S4708) corresponds to the operation of the differential vector encoder 3250, a resolution encoding step (S4710) corresponds to the operation of the resolution encoder 3240, and a resolution conversion flag generating step (S4712) corresponds to the operation of the resolution conversion flag generator 3260. Therefore, a detailed description on the process in each step is omitted here.

Further, the steps described above may include a step or steps, which can be omitted, depending on the existence or absence of each element of the video encoding apparatus 3200, from the method of encoding a video using an adaptive motion vector resolution according to the second aspect of the present disclosure.

Figure 18:
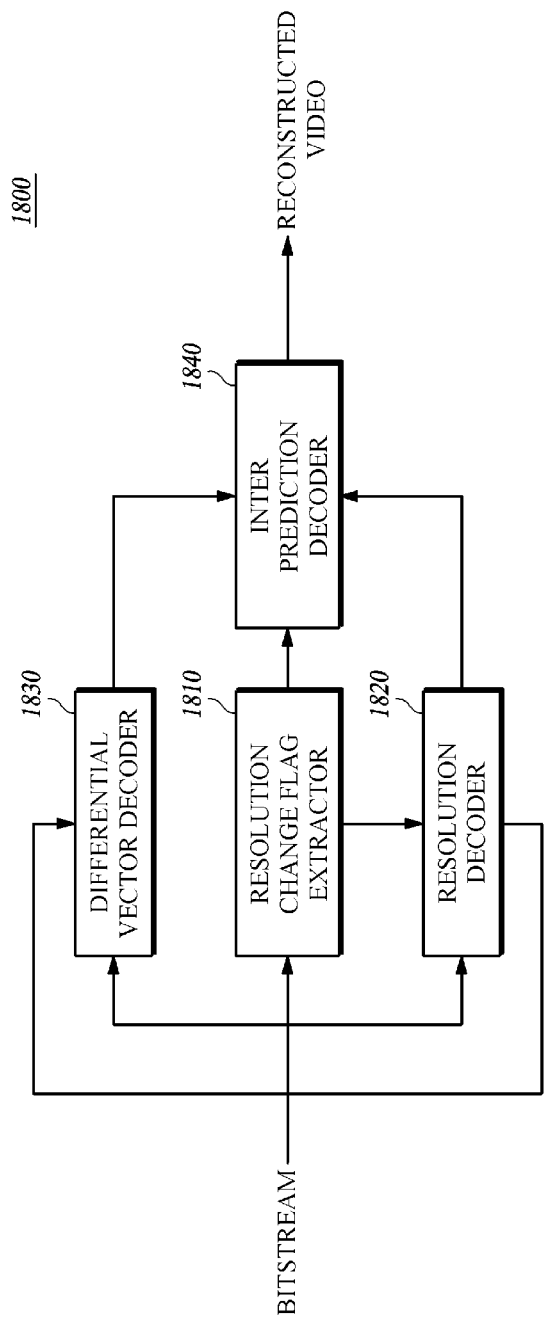
FIG. 18 is a schematic block diagram illustrating a video decoding apparatus using an adaptive motion vector according to an aspect of the present disclosure.

FIG. 18 is a block diagram illustrating a video decoding apparatus using an adaptive motion vector according to the first aspect of the present disclosure.

The video decoding apparatus 1800 using an adaptive motion vector according to the first aspect of the present disclosure includes a resolution change flag extractor 1810, a resolution decoder 1820, a differential vector decoder 1830, and an inter prediction decoder 1840.

The resolution change flag extractor 1810 extracts a resolution change flag from a bitstream. That is, the resolution change flag extractor 1810 extracts a resolution change flag, which indicates whether the motion vector resolution is fixed or changes according to each area, from a header of a bitstream. When the resolution change flag indicates that the motion vector resolution is fixed, the resolution change flag extractor 1810 extracts an encoded motion vector resolution from the bitstream and then decodes the extracted motion vector resolution, so as to make the inter prediction decoder 1840 perform an inter prediction decoding of all lower areas defined in the header with the reconstructed fixed motion vector resolution or a preset motion vector resolution and make the differential vector decoder 1830 reconstruct a motion vector of each area with the fixed motion vector. When the resolution change flag indicates that the motion vector resolution changes according to each area or motion vector, the resolution change flag extractor 1810 causes the resolution decoder 1820 to reconstruct a motion vector resolution of each lower area or motion vector defined in the header, causes the inter prediction decoder 1840 to perform an inter prediction decoding of each lower area or motion vector defined in the header with the reconstructed motion vector resolution, and causes the differential vector decoder 1830 to reconstruct a motion vector of each area with the reconstructed motion vector.

Further, when the size of a predicted motion vector or differential motion vector of a motion vector according to a motion vector resolution determined for each area or motion vector is larger than a threshold, the resolution change flag extractor 1810 may determine a predetermined value as the motion vector resolution of each area or motion vector. For example, when the size of a differential motion vector or the size of a predicted motion vector of an area or a motion vector is larger than a threshold, the resolution change flag extractor 1810 may determine a predetermined value as a motion vector resolution of the area or the motion vector without decoding the motion vector resolution of the area. Further, when the size of a motion vector of a surrounding area of an area or a motion vector is larger or the size of a motion vector of an area is larger than a threshold, the resolution change flag extractor 1810 may determine a predetermined value as a motion vector resolution of the area without decoding the motion vector resolution of the area. In this event, the motion vector resolution of the area or motion vector can be changed to a predetermined resolution even without a flag. The threshold may be a pre-appointed value or a certain input value, or may be calculated from a motion vector of a surrounding block.

The resolution decoder 1820 extracts an encoded resolution identification flag from a bitstream according to a resolution change flag extracted by the resolution change flag extractor 1810 and decodes the extracted resolution identification flag, so as to reconstruct the motion vector resolution of each area. Meanwhile, a decoding of a motion vector resolution by the resolution decoder 1820 simply described for convenience in the following discussion may actually include a decoding of one of or both of a motion vector resolution and a differential motion vector. Therefore, the resolution indicated by the resolution identification flag may be either a resolution of a motion vector or a resolution of a differential motion vector, or may indicate both a resolution of a motion vector and a resolution of a differential motion vector.

To this end, the resolution change flag extractor 1810 may reconstruct a motion vector resolution of each area or motion vector by decoding a resolution identification flag hierarchically encoded in a Quadtree structure by grouping areas having the same motion vector resolution together.

Referring to FIGS. 10 to 12, the resolution decoder 1820 reconstructs the motion vector resolutions by decoding the resolution identification flags with a Quadtree structure as shown in FIG. 10 according to the areas as shown in FIG. 12. For example, in the case of decoding the resolution identification flag generated through the encoding as shown in FIG. 11, the first bit has a value of "1", which implies a division into sub layers, and the second bit has a value of "0", which implies that the first node of level 1 has not been divided into sub layers. Therefore, by decoding the next bits, a motion vector resolution of ½ is reconstructed. In the same manner as described above, the resolution identification flags for level 1 and level 2 are decoded in the same manner as, but in a reverse order to, the encoding method as described above with reference to FIGS. 10 and 11, so as to reconstruct the resolution identification flags of the corresponding areas or motion vectors. Further, since an identifier indicating the size of an area indicated by the lowest node and the maximum number of layers included in a header defines that the maximum number of layers in level 3 should be 3, the resolution decoder 1820 determines that there are no more layers lower than level 3, and then reconstructs only the motion vector resolution of each area. To this end, the resolution decoder 1820 decodes an identifier, which indicates the size of the area indicated by the lowest node of Quadtree layers and the maximum number of Quadtree layers and is included in a header of a bitstream.

Although the above description discusses only two examples including an example in which a node is divided into lower layers (i.e. four areas) and another example in which a node is not divided into lower layers. There may be various cases as shown in FIG. 20, including a case in which a node is not divided into lower layers and cases in which a node is divided into lower layers in various ways, for example, a node may be divided into two transversely lengthy areas, two longitudinally lengthy areas, or four areas.

Further, the resolution decoder 1820 may reconstruct the motion vector resolution of each area or motion vector by decoding the resolution identification flag encoded using a predicted motion vector resolution predicted by motion vector resolutions of surrounding areas of the area or motion vector. For example, when the resolution identification flag extracted for each area or motion vector from a bitstream indicates that its resolution is identical to a motion vector resolution predicted using motion vector resolutions of surrounding areas (e.g. when the bit value of the resolution identification flag is "1"), the resolution decoder 1820 may reconstruct the motion vector resolution predicted using motion vector resolutions of surrounding areas without reading the next resolution identification flag from the bitstream. In contrast, when the resolution identification flag indicates that its resolution is not identical to the motion vector resolution predicted using motion vector resolutions of surrounding areas (e.g. when the bit value of the resolution identification flag is "0"), the resolution decoder 1820 may reconstruct the motion vector resolution by reading the next resolution identification flag from the bitstream and decoding the next resolution identification flag.

In addition, the resolution decoder 1820 may reconstruct the motion vector resolution of each area or motion vector by decoding the resolution identification flag of the motion vector resolution having an encoded run and length. For example, the resolution decoder 1820 may reconstruct the run and length of the motion vector resolution by decoding the encoded resolution identification flag of the differential motion vector resolutions and/or motion vector resolutions of a part of multiple areas, or may reconstruct the motion vector resolutions of the areas as shown in FIG. 12 by using the reconstructed run and length of the motion vector resolution.

Moreover, the resolution decoder 1820 may reconstruct the motion vector resolution of each area or motion vector by decoding the resolution identification flag hierarchically encoded using a tag tree. Referring to FIGS. 13 and 14 as an example, since one can see from the bit of the first area shown in FIG. 1, which is "0111", that the bits corresponding to level 0 are "01" and it is assumed that the number of the motion vector resolution of a higher level of level 0 is "0", the resolution decoder 1820 may reconstruct the motion vector resolution of ½, which has a resolution number difference value of 1 from a higher level. Further, since the next bit is "1", which has a resolution number difference value of "0" from a higher layer, ½ is reconstructed as the motion vector resolution in level 1 also. Also, since each of the following bits is also "1", ½ is reconstructed as the motion vector resolution in level 2 and level 3 also, respectively. Since the bits of the second area in FIG. 14 are "01" and the motion vector resolutions of level 0, level 1, and level 2 in the first area have been already decoded, a decoding of the motion vector resolution of only level 3 is required. In level 3, since the resolution number difference value from a higher layer is "1", it is possible to reconstruct a motion vector resolution of ¼. In the same manner, motion vector resolutions of the other areas can be reconstructed.

Further, the resolution decoder 1820 may change and decode the number of bits allocated to the resolution identification flag according to the occurrence frequency of the motion vector resolution determined for each motion vector or area. For example, the resolution decoder 1820 may calculate the occurrence frequency of the reconstructed motion vector resolution up to the just previous area, provide numbers to motion vector resolutions according to the calculated occurrence frequency, and allocate bit numbers according to the provided numbers, so as to decode the motion vector resolutions.

The area group may be a Quadtree, a Quadtree bundle, a tag tree, a tag tree bundle, a macroblock, a macroblock bundle, or an area with a predetermined size. For example, when the area group is appointed as including two macroblocks, it is possible to update the occurrence frequency of the motion vector resolution for every two macroblocks and allocate a bit number of the motion vector resolution to the updated frequency, for the decoding. Otherwise, when the area group is appointed as including four Quadtrees, it is possible to update the occurrence frequency of the motion vector resolution for every four Quadtrees and allocate a bit number of the motion vector resolution to the updated frequency, for the decoding.

Further, the resolution decoder 1820 may use different methods for decoding a resolution identification flag according to the distribution of the motion vector resolutions of surrounding areas of each area with respect to the motion vector resolution determined according to each area or motion vector. That is, the smallest bit number is allocated to a resolution having the highest probability that the resolution may be the resolution of a corresponding area according to the distribution of the motion vector resolutions of surrounding areas or area groups. For example, if a left side area of the corresponding area has a motion vector resolution of ½ and an upper side area of the area has a motion vector resolution of ½, it is most probable that the area may have a motion vector resolution of ½, and the smallest bit number is thus allocated to the motion vector resolution of ½, which is then decoded. As another example, if a left side area of the corresponding area has a motion vector resolution of ¼, a left upper side area of the area has a motion vector resolution of ½, an upper side area of the area has a motion vector resolution of ½, and a right upper side area of the area has a motion vector resolution of ½, the bit numbers are allocated to the motion vector resolutions in a sequence causing the smaller bit number to be allocated to a motion vector resolution having the higher probability, for example, in a sequence of ½, ¼, ⅛, . . . , and the motion vector resolutions are then decoded.

Further, in performing the entropy decoding by an arithmetic decoding, the resolution decoder 1820 uses different methods of generating a bit string of a resolution identification flag according to the distribution of the motion vector resolutions of the surrounding areas of each area for the motion vector resolution determined according to each motion vector or area and applies different context models according to the distribution of the motion vector resolutions of the surrounding areas and the probabilities of the motion vector resolution having occurred up to the present, for the arithmetic decoding and probability update. Further, in the arithmetic decoding and probability update, the resolution decoder 1820 may use different context models according to the positions of bits. For example, based on an assumption that an entropy decoding is performed using only three motion vector resolutions including ½, ¼, and ⅛ by the CABAC, if a left side area of a pertinent area has a motion vector resolution of ½ and an upper side area of the area has a motion vector resolution of ½, the shortest bit string ("0" in FIG. 21) is allocated to the motion vector resolution of ½ and the other bit strings are allocated to the other motion vector resolutions, i.e. ¼ and ⅛, in a sequence causing the smaller bit number to be allocated to a motion vector resolution having the higher probability.

In this event, if the motion vector resolution of ⅛ has the higher occurrence probability up to the present than that of the motion vector resolution of ¼, the bitstream of "00" is allocated to the motion vector resolution of ⅛ and the bitstream of "01" is allocated to the motion vector resolution of ½. Further, in decoding the first bit string, four different context models may be used, which include: a first context model in which the resolution of the left side area is equal to the resolution of the upper side area, which is equal to the resolution of the highest probability up to the present; a second context model in which the resolution of the left side area is equal to the resolution of the upper side area, which is different from the resolution of the highest probability up to the present; a third context model in which the resolutions of the left side area and the upper side area are different from each other and at least one of the resolutions of the left side area and the upper side area is equal to the resolution of the highest probability up to the present; and a fourth context model in which the resolutions of the left side area and the upper side area are different from each other and neither of them is equal to the resolution of the highest probability up to the present. In decoding the second bit string, two different context models may be used, which include: a first context model in which the resolutions of the left side area and the upper side area are different from each other and at least one of the resolutions of the left side area and the upper side area is equal to the resolution of the highest probability up to the present; and a second context model in which the resolutions of the left side area and the upper side area are different from each other and neither of them is equal to the resolution of the highest probability up to the present.

As another example, based on an assumption that an entropy decoding is performed using only three motion vector resolutions including ½, ¼, and ⅛ by the CABAC and the highest motion vector resolution up to the present is ¼, "1", which is the shortest bitstream, is allocated to the motion vector resolution of ¼, and "00" and "01" are then allocated to the other motion vector resolutions of ½ and ⅛, respectively.

Further, in decoding the first bit string, three different context models may be used, which include: a first context model in which each of the resolutions of the left side area and the upper side area of a corresponding area is equal to the resolution of the highest probability up to the present; a second context model in which only one of the resolutions of the left side area and the upper side area of a corresponding area is equal to the resolution of the highest probability up to the present; and a third context model in which neither of the resolutions of the left side area and the upper side area of a corresponding area is equal to the resolution of the highest probability up to the present. In decoding the second bit string, six different context models may be used, which include: a first context model in which each of the resolution of the left side area and the resolution of the upper side area of a corresponding area corresponds to a motion vector resolution of ⅛; a second context model in which each of the resolutions of the left side area and the upper side area of a corresponding area corresponds to a motion vector resolution of ½; a third context model in which each of the resolutions of the left side area and the upper side area of a corresponding area corresponds to a motion vector resolution of ¼; a fourth context model in which one of the resolutions of the left side area and the upper side area of a corresponding area corresponds to a motion vector resolution of ⅛ and the other resolution corresponds to a motion vector resolution of ¼; a fifth context model in which one of the resolutions of the left side area and the upper side area of a corresponding area corresponds to a motion vector resolution of ½ and the other resolution corresponds to a motion vector resolution of ¼; and a sixth context model in which one of the resolutions of the left side area and the upper side area of a corresponding area corresponds to a motion vector resolution of ⅛ and the other resolution corresponds to a motion vector resolution of ½. The resolution of the highest probability up to the present may be a probability of a resolution encoded up to the previous area, a probability of a certain area, or a predetermined fixed resolution.

Further, when the resolution identification flag decoded for each area or motion vector is a flag indicating the capability of estimation, the resolution decoder 1820 may estimate a motion vector resolution according to a pre-promised estimation scheme, so as to reconstruct the estimated motion vector resolution as a motion vector resolution of the area or motion vector. In contrast, when the resolution identification flag decoded for each area or motion vector is a flag indicating the incapability of estimation, the resolution decoder 1820 may reconstruct the motion vector resolution indicated by the decoded resolution identification flag as the motion vector of the area.

For example, when the resolution identification flag decoded for each area or motion vector indicates the capability of estimation, the resolution decoder 1820 predicts a predicted motion vector by changing each decoded motion vector resolution in a method equal or similar to the method of the video encoding apparatus 900, and reconstructs a motion vector by using the predicted motion vector and a differential motion vector reconstructed by the differential vector decoder 1830. First, based on an assumption that a motion vector resolution of a predetermined area corresponds to a ¼ pixel unit, when the predicted motion vector is (3, 14), the differential motion vector is (2, 3) and the reconstructed motion vector of the predetermined area is thus (5, 17). Based on an assumption that a motion vector resolution of a predetermined area corresponds to a ½ pixel unit, when the predicted motion vector is (2, 7), the reconstructed differential motion vector is (2, 3) and the reconstructed motion vector of the predetermined area is thus (4, 10). A resolution having the least distortion between surrounding pixels of a pertinent area and surrounding pixels of an area motion-compensated using a reconstructed motion vector of each resolution in a reference picture is an optimum motion vector resolution. Therefore, when surrounding pixels of an area motion-compensated in the unit of ½ pixels has the least distortion, the motion vector resolution of ½ is the optimum motion vector resolution.

Further, when the resolution identification flag decoded for each area or motion vector indicates the capability of estimation, the resolution decoder 1820 may reconstruct the motion vector resolution of the pertinent area or motion vector by additionally decoding the motion vector resolution in the resolution identification flag.

Further, the resolution decoder 1820 can reconstruct the motion vector resolution of each area or motion vector only when each component of the differential motion vector is not "0". That is, when a component of a differential motion vector of a particular area is "0", the resolution decoder 1820 may decode a predicted motion vector into a motion vector without reconstructing the motion vector resolution of the particular area.

The differential vector decoder 1830 extracts an encoded differential motion vector from a bitstream and decodes the extracted differential motion vector. Specifically, the differential vector decoder 1830 reconstructs the differential motion vector of each area or motion vector by performing the decoding according to the motion vector resolution of each reconstructed area or motion vector. Additionally, the inter prediction decoder 1840 may predict a predicted motion vector of each area and reconstruct a motion vector of each area by using the predicted motion vector and the reconstructed differential motion vector.

To this end, the differential vector decoder 1830 may use UVLC in decoding the differential motion vector. In this event, the differential vector decoder 1830 may use the K-th order Exp-Golomb code in the decoding and may change the degree of order (K) of the Exp-Golomb code according to the motion vector resolution determined for each reconstructed area. Further, the differential vector decoder 1830 may decode the differential vector by using the CABAC. In this event, the differential vector decoder 1830 may use the Concatenated Truncated Unary/K-th Order Exp-Golomb Code in the decoding and may change the degree of order (K) and the maximum value (T) of the Concatenated Truncated Unary/K-th Order Exp-Golomb Code according to the motion vector resolution determined for each reconstructed area or motion vector. In addition, when the differential vector decoder 1830 decodes the differential vector by using the CABAC, the differential vector decoder 1830 may differently calculate the accumulation probability according to the motion vector resolution determined for each reconstructed area or motion vector.

Further, the differential vector decoder 1830 may predict a predicted motion vector for each area or motion vector by using motion vectors of surrounding areas of each area or motion vector. In this event, when the motion vector resolution of each area is not equal to the motion vector resolution of surrounding areas, the differential vector decoder 1830 may convert the motion vector resolution of the surrounding areas to the motion vector resolution of said each area for the prediction. The predicted motion vector can be obtained in the same method by the video encoding apparatus and the video decoding apparatus. Therefore, various aspects for the motion vector resolution conversion and for obtaining a predicted motion vector by a video encoding apparatus as described above with reference to FIGS. 22 to 26 can also be applied to a video decoding apparatus according to the following aspects of the present disclosure.

Further, when at least one area among the areas is a block and the block mode of the block is a skip mode, the differential vector decoder 1830 may convert motion vector resolutions of surrounding areas of the area to the highest resolution among the motion vector resolutions of the surrounding areas and then perform the prediction.

Moreover, the resolution identification flag indicating the motion vector resolution decoded by the resolution decoder 1820 may indicate either both or each of the resolutions of an x component and a y component of a motion vector. That is, when a camera taking a video moves or when an object within a video moves, the resolution decoder 1820 may perform the decoding with different resolutions for the x component and the y component of a motion vector for motion estimation. For example, the resolution decoder 1820 may perform the decoding with a resolution of ⅛ pixel unit for the x component of a motion vector of a certain area while performing the decoding with a resolution of ½ pixel unit for the y component of the motion vector. Then, the inter prediction decoder 1840 may perform an inter prediction decoding of a pertinent area by performing a motion estimation and a motion compensation of a motion vector of the pertinent area by using different resolutions for the x component and the y component of the motion vector. The inter prediction decoder 1840 performs an inter prediction decoding of each area by using a motion vector of each area according to the motion vector resolution of each reconstructed area or motion vector. The inter prediction decoder 1840 may be implemented by the video decoding apparatus 800 described above with reference to FIG. 8. When functions of the resolution change flag extractor 1810, the resolution decoder 1820, and the differential vector decoder 1830 in FIG. 18 overlap with the function of the decoder 810 of the video decoding apparatus 800, the overlapping functions may be omitted in the decoder 810.

Further, when the operation of the resolution decoder 1820 overlaps with the operation of the predictor 850, the overlapping operation may be omitted in the predictor 850.

Also, the resolution change flag extractor 1810, the resolution decoder 1820, and the differential vector decoder 1830 may be constructed either separately from the inter prediction decoder 1840 as shown in FIG. 18 or integrally with the decoder 810 within the video decoding apparatus 1800.

However, although the above description with reference to FIG. 8 discusses decoding of a video in the unit of blocks by the video decoding apparatus 800, the inter prediction decoder 1840 may divide the video into areas with various shapes or sizes, such as blocks including macroblocks or subblocks, slices, or pictures, and perform the decoding in the unit of areas each having a predetermined size. Such a predetermined area may be not only a macroblock having a size of 16×16 but also blocks with various shapes or sizes, such as a block having a size of 64×64 and a block having a size of 32×16.

Further, although the video decoding apparatus 800 described above with reference to FIG. 8 performs an inter prediction decoding using motion vectors having the same motion vector resolution for all blocks of a video, the inter prediction decoder 1840 may perform an inter prediction decoding using motion vectors having motion vector resolutions differently determined according each area or motion vector. That is, in the inter prediction decoding of an area, the inter prediction decoder 1840 first enhances the resolution of an area by interpolating a reference picture having been already encoded, decoded, and reconstructed according to a motion vector resolution and/or a differential motion vector resolution of each area or motion vector reconstructed by the resolution decoder 1820, and then performs a motion estimation by using a motion vector and/or a differential motion vector according to the motion vector resolution and/or the differential motion vector resolution of the pertinent area or motion vector reconstructed by the differential vector decoder 1830. For the interpolation of the reference picture, it is possible to use various interpolation filters, such as a Wiener filter, a bilinear filter, and a Kalman filter and to apply resolutions in the unit of various integer pixels or fraction pixels, such as 2 pixel unit, 1 pixel unit, ⅔ pixel unit, ⅓ pixel unit, ½ pixel unit, ¼ pixel unit, and ⅛ pixel unit. Further, according to such various resolutions, it is possible to use different filter coefficients or different numbers of filter coefficients. For example, a Wiener filter may be used for the interpolation when the resolution corresponds to the ½ pixel unit and a Kalman filter may be used for the interpolation when the resolution corresponds to the ¼ pixel unit. Moreover, different numbers of taps may be used for the interpolation of the respective resolutions. For example, an 8-tap Wiener filter may be used for the interpolation when the resolution corresponds to the ½ pixel unit and a 6-tap Wiener filter may be used for the interpolation when the resolution corresponds to the ¼ pixel unit.

Further, the inter prediction decoder 1840 may decode the filter coefficient of each motion vector resolution and then interpolate a reference picture with an optimum filter coefficient for each motion vector resolution. In this event, it is possible to use various filters including a Wiener filter and a Kalman filter and to employ various numbers of filter taps. Further, it is possible to employ different numbers of filters or different numbers of filter taps according to the resolutions of the motion vectors. Moreover, the inter prediction decoder 1840 may perform the inter prediction decoding by using reference pictures interpolated using different filters according to the motion vector resolution of each area or motion vector. For example, a filter coefficient of a 6-tap Wiener filter may be decoded for the ½ resolution, a filter coefficient of an 8-tap Kalman filter may be decoded for the ¼ resolution, a filter coefficient of a linear filter may be decoded for the ⅛ resolution, and the reference picture for each resolution may be then interpolated and decoded. In the decoding, the inter prediction decoder 1840 may use a reference picture interpolated by a 6-tap Wiener filter when the resolution of the current area or motion vector is a ½ resolution, and may use a reference picture interpolated by a 8-tap Kalman filter when the resolution of the current area or motion vector is a ¼ resolution.

Figure 48:
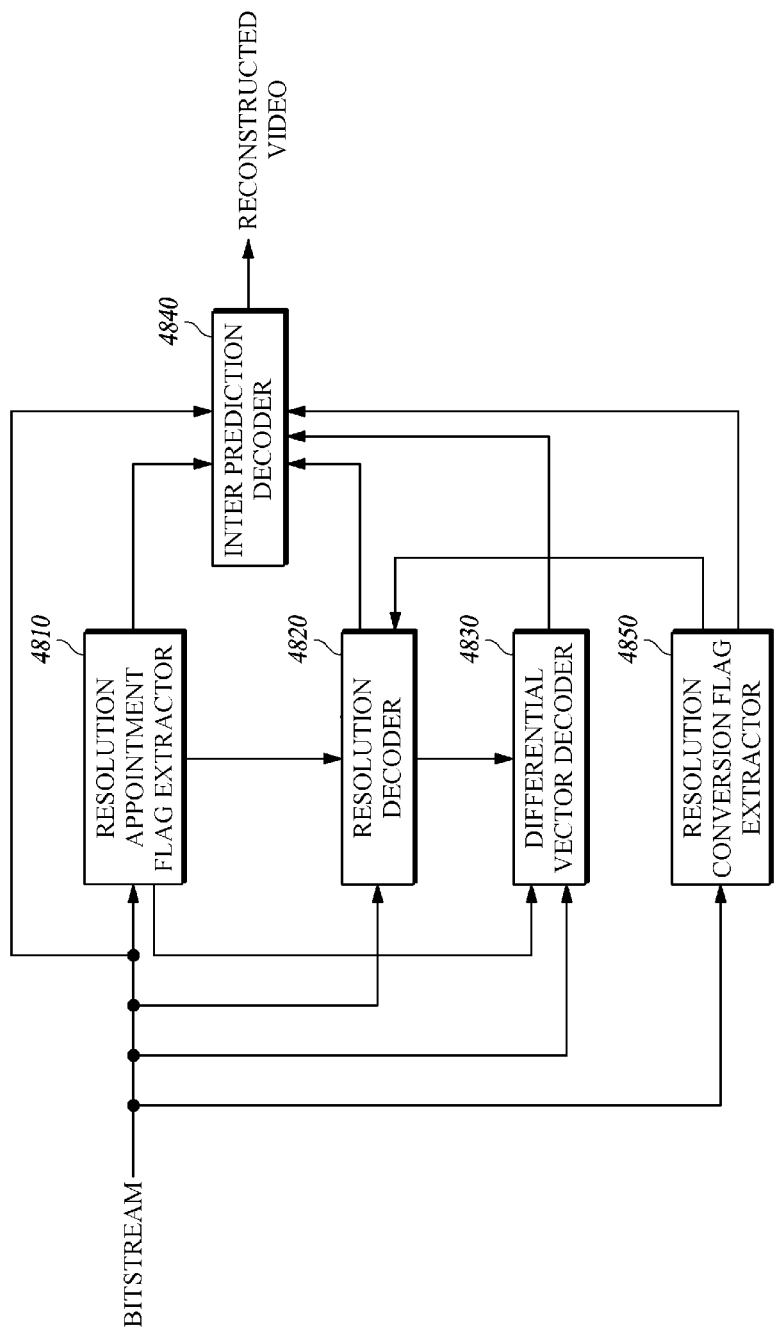
FIG. 48 is a schematic block diagram illustrating a video decoding apparatus using an adaptive motion vector according to the second aspect of the present disclosure.

FIG. 48 is a block diagram illustrating a video decoding apparatus using an adaptive motion vector according to the second aspect of the present disclosure.

The video decoding apparatus 4800 using an adaptive motion vector according to the second aspect of the present disclosure includes a resolution appointment flag extractor 4810, a resolution decoder 4820, a differential vector decoder 4830, an inter prediction decoder 4840, and a resolution conversion flag extractor 4850. In this event, all of the resolution appointment flag extractor 4810, the resolution decoder 4820, the differential vector decoder 4830, and the resolution conversion flag extractor 4850 are not necessarily included in the video decoding apparatus 4800 and may be selectively included in the video decoding apparatus 4800 according to the encoding scheme of a video encoding apparatus for generating an encoded bitstream.

Further, the inter prediction decoder 4840 performs an inter prediction decoding of each area by using a motion vector of each area according to the motion vector resolution of each reconstructed area or motion vector. The inter prediction decoder 4840 may be implemented by the video decoding apparatus 800 described above with reference to FIG. 8. When one or more functions of the resolution change flag extractor 4810, the resolution decoder 4820, the differential vector decoder 4830, and the resolution conversion flag extractor 4850 in FIG. 48 overlap with the function of the decoder 810 within the video decoding apparatus 4800, the overlapping functions may be omitted in the decoder 810. Further, when the operation of the resolution decoder 4820 overlaps with the operation of the predictor 850 within the inter prediction decoder 4840, the overlapping operation may be omitted in the predictor 850.

Also, the resolution change flag extractor 4810, the resolution decoder 4820, the differential vector decoder 4830, and the resolution conversion flag extractor 4850 may be constructed either separately from the inter prediction decoder 4840 as shown in FIG. 48 or integrally with the decoder 810 within the video decoding apparatus 4800.

The resolution appointment flag extractor 4810 extracts a resolution appointment flag from an input bitstream. The resolution appointment flag corresponds to a flag indicating that it is fixed to a single resolution or a resolution set including multiple resolutions.

The resolution appointment flag extractor 4810 extracts a resolution appointment flag from a bitstream. That is, the resolution appointment flag extractor 4810 extracts a resolution appointment flag, which indicates whether the motion vector resolution is fixed to a predetermined value or corresponds to a resolution set including different resolutions according to areas, from a header of a bitstream. When the resolution appointment flag indicates that the motion vector resolution and/or differential motion vector resolution is fixed to a predetermined resolution, the resolution appointment flag extractor 4810 transmits the fixed resolution indicated by the resolution appointment flag to the inter prediction decoder 4840 and the differential vector decoder 4830, and the differential vector decoder 4830 then decodes a differential motion vector by using the received resolution and then transmits the decoded differential motion vector to the inter prediction decoder 4840. Then, the inter prediction decoder 4840 performs an inter prediction decoding by using the received differential motion vector, the resolution received from the resolution appointment flag extractor 4810, and the received bitstream.

When the resolution appointment flag corresponds to a predetermined resolution set, the resolution change flag extractor 4810 causes the resolution decoder 4820 to reconstruct a motion vector resolution and/or differential motion vector resolution of each lower area or motion vector defined in the header, causes the inter prediction decoder 4840 to perform an inter prediction decoding of each lower area or motion vector defined in the header with the reconstructed motion vector resolution, and causes the differential vector decoder 4830 to reconstruct a motion vector of each area with the reconstructed motion vector.

Further, in the case of using multiple reference pictures, an adaptability degree (i.e. resolution set) of the resolution may be calculated for each reference picture based on a predetermined criterion when the resolution appointment flag is not extracted from a bitstream. For example, different adaptability degrees of the resolution may be employed according to the distance between the current picture and reference pictures. This configuration has been already described above with reference to FIGS. 38 and 39, so a detailed description thereof is omitted here.

Further, at the time of generating reference pictures, the resolution set may be calculated using an error measurement means, such as a Sum of Squared Difference (SSD) between resolutions. For example, if usable resolutions are $\frac{1}{1}$, $\frac{1}{2}$, $\frac{1}{4}$, and $\frac{1}{8}$, in interpolating a reference picture, it is possible to set the resolution of $\frac{1}{2}$ to be used only when an error value obtained using an error measurement means, such as an SSD, for the resolutions of $\frac{1}{1}$ and $\frac{1}{2}$ exceeds a predetermined threshold while setting the resolution of $\frac{1}{2}$ not to be used when the error value does not exceed the predetermined threshold. Further, when it has been set that the resolution of $\frac{1}{2}$ should not be used, it is determined whether an error value obtained using an error measurement means, such as an SSD, for the resolutions of $\frac{1}{1}$ and $\frac{1}{4}$ exceeds a predetermined threshold. When the error value for the resolutions of $\frac{1}{1}$ and $\frac{1}{4}$ does not exceed the predetermined threshold, the resolution of $\frac{1}{4}$ is set not to be used. In contrast, when the error value for the resolutions of $\frac{1}{1}$ and $\frac{1}{4}$ exceeds the predetermined threshold, the resolutions of both $\frac{1}{1}$ and $\frac{1}{4}$ are set to be used. Also, when the resolution of $\frac{1}{4}$ has been set to be used, it is determined whether an error value obtained using an error measurement means, such as an SSD, for the resolutions of $\frac{1}{4}$ and $\frac{1}{8}$ exceeds a predetermined threshold. When the error value for the resolutions of $\frac{1}{4}$ and $\frac{1}{8}$ does not exceed the predetermined threshold, the resolution of $\frac{1}{8}$ is set not to be used. In contrast, when the error value for the resolutions of $\frac{1}{4}$ and $\frac{1}{8}$ exceeds the predetermined threshold, all the resolutions of $\frac{1}{1}$, $\frac{1}{4}$, and $\frac{1}{8}$ are set to be used. The threshold may be different according to the resolutions or quantized parameters, or may be the same.

Further, in the case of encoding the employment of different adaptability degrees of the resolution according to the reference pictures, the resolution appointment flag extractor 4810 may extract a resolution set by extracting a reference picture index number instead of the resolution appointment flag from the bitstream and then storing and referring to the reference picture index number corresponding to each predetermined resolution set as shown in FIG. 40.

Also, when the resolution appointment flag indicates a resolution set, it is possible to set an actually usable resolution set according to the use or non-use of a reference picture by setting different resolution sets for a picture to be used as a reference picture and a picture not to be used as a reference picture, respectively. Therefore, the video decoding apparatus 4800 may also store a table as shown in FIG. 42 to be referred to by the resolution decoder 4820 in decoding the resolution. This configuration also has been already described above with reference to FIGS. 41 and 42, so a detailed description thereof is omitted here.

Further, when the size of a predicted motion vector or differential motion vector of a motion vector according to a motion vector resolution and/or differential motion vector resolution determined for each area or motion vector is larger than a threshold, the resolution appointment flag extractor 4810 may determine a predetermined value as the motion vector resolution and/or differential motion vector resolution determined for each area or motion vector. This configuration also has been already described above in the discussion relating to the resolution change flag extractor 1810 of the video decoding apparatus 1800 according to the first aspect, so a detailed description thereof is omitted here.

The resolution decoder 4820 extracts an encoded resolution identification flag from a bitstream according to a resolution appointment flag extracted by the resolution appointment flag extractor 4810 and decodes the extracted resolution identification flag, so as to reconstruct the motion vector resolution of each area.

To this end, the resolution appointment flag extractor 4810 may reconstruct a motion vector resolution of each area or motion vector by decoding a resolution identification flag hierarchically encoded in a Quadtree structure by grouping areas having the same motion vector resolution together. This configuration also has been already described above in the discussion relating to the resolution change flag extractor 1810 of the video decoding apparatus 1800 according to the first aspect, so a detailed description thereof is omitted here.

Further, the resolution decoder 4820 may reconstruct the motion vector resolution of each area or motion vector by decoding the resolution identification flag encoded using a predicted motion vector resolution predicted using motion vector resolutions of surrounding areas of the area or motion vector. This configuration also has been already described above in the discussion relating to the resolution change flag extractor 1810 of the video decoding apparatus 1800 according to the first aspect, so a detailed description thereof is omitted here.

In addition, the resolution decoder 4820 may reconstruct the motion vector resolution of each area or motion vector by decoding the resolution identification flag of the motion vector resolution having an encoded run and length for each area or motion vector. This configuration also has been already described above in the discussion relating to the resolution change flag extractor 1810 of the video decoding apparatus 1800 according to the first aspect, so a detailed description thereof is omitted here.

Moreover, the resolution decoder 4820 may reconstruct the motion vector resolution of each area or motion vector by decoding the resolution identification flag hierarchically encoded using a tag tree. This configuration also has been already described above in the discussion relating to the resolution change flag extractor 1810 of the video decoding apparatus 1800 according to the first aspect, so a detailed description thereof is omitted here.

Further, the resolution decoder 4820 may change and decode the number of bits allocated to the resolution identification flag according to the occurrence frequency of the motion vector resolution determined for each motion vector or area. For example, the resolution decoder 4820 may calculate the occurrence frequency of the reconstructed motion vector resolution up to the just previous area, provide numbers to motion vector resolutions according to the calculated occurrence frequency, and allocate bit numbers according to the provided numbers, so as to decode the motion vector resolutions. This configuration also has been already described above in the discussion relating to the resolution change flag extractor 1810 of the video decoding apparatus 1800 according to the first aspect, so a detailed description thereof is omitted here.

Further, the resolution decoder 4820 may use different methods for decoding a resolution identification flag according to the distribution of the motion vector resolutions of surrounding areas of each area with respect to the motion vector resolution determined according to each area or motion vector. That is, the smallest bit number is allocated to a resolution having the highest probability that the resolution may be the resolution of a corresponding area according to the distribution of the motion vector resolutions of surrounding areas or area groups. This configuration also has been already described above in the discussion relating to the resolution change flag extractor 1810 of the video decoding apparatus 1800 according to the first aspect, so a detailed description thereof is omitted here.

Further, in performing the entropy decoding by an arithmetic decoding, the resolution decoder 4820 may use different methods of generating a bit string of a resolution identification flag according to the distribution of the motion vector resolutions of the surrounding areas of each area for the motion vector resolution determined according to each motion vector or area and may apply different context models according to the distribution of the motion vector resolutions of the surrounding areas and the probabilities of the motion vector resolution having occurred up to the present, for the arithmetic decoding and probability update. Further, in the arithmetic decoding and probability update, the resolution decoder 4820 may use different context models according to the positions of bits. This configuration also has been already described above in the discussion relating to the resolution change flag extractor 1810 of the video decoding apparatus 1800 according to the first aspect, so a detailed description thereof is omitted here.

Further, when the resolution identification flag decoded for each area or motion vector is a flag indicating the capability of estimation, the resolution decoder 4820 may estimate a motion vector resolution according to a pre-promised estimation scheme, so as to reconstruct the estimated motion vector resolution as a motion vector resolution of the area or motion vector. In contrast, when the resolution identification flag decoded for each area or motion vector is a flag indicating the incapability of estimation, the resolution decoder 4820 may reconstruct the motion vector resolution indicated by the decoded resolution identification flag as the motion vector of the area. This configuration also has been already described above in the discussion relating to the resolution change flag extractor 1810 of the video decoding apparatus 1800 according to the first aspect, so a detailed description thereof is omitted here.

Further, when the resolution identification flag decoded for each area or motion vector indicates the capability of estimation, the resolution decoder 4820 may reconstruct the motion vector resolution of the pertinent area or motion vector by additionally decoding the motion vector resolution in the resolution identification flag. Further, the resolution decoder 4820 can reconstruct the motion vector resolution of each area or motion vector only when each component of the differential motion vector is not "0". That is, when a component of a differential motion vector of a particular area is "0", the resolution decoder 4820 may decode a predicted motion vector into a motion vector without reconstructing the motion vector resolution of the particular area. This configuration also has been already described above in the discussion relating to the resolution change flag extractor 1810 of the video decoding apparatus 1800 according to the first aspect, so a detailed description thereof is omitted here.

Further, the resolution decoder 4820 extracts a resolution identification flag according to the kind of the resolution of the resolution change flag decoded after being extracted from a header. Further, by using the extracted resolution identification flag, the differential vector decoder 4830 extracts a value of a differential motion vector corresponding to a pertinent resolution by referring to a code number extracted from a code number table of a differential motion vector according to the motion vector resolutions as shown in FIG. 25 stored by a video encoding apparatus. When the decoded resolution identification flag is ¼, the motion vector may be decoded using a differential motion vector extracted from a bitstream and a predicted motion vector obtained through a conversion into the resolution (i.e. ¼) of surrounding motion vectors. The predicted motion vector may be obtained by taking a median of surrounding motion vectors converted using multiplication and division like the encoder, without limiting the present disclosure to this construction.

FIG. 49 illustrates an example of surrounding motion vectors of current block X, and FIG. 50 illustrates an example of converted values of surrounding motion vectors according to the current resolution.

Further, the resolution decoder 4820 may calculate the resolution by using reference picture indexes without extracting a resolution identification flag. This configuration has been already described above in the discussion relating to the video encoding apparatus 3200 with reference to FIGS. 30 and 31, so a detailed description thereof is omitted here.

The inter prediction decoder 4840 may obtain and decode a motion vector by using a differential motion vector calculated by the differential vector decoder 4830 and a predicted motion vector obtained using a table as shown in FIG. 50.

When the differential motion vector resolution has been encoded and then transmitted through a bitstream as described above with reference to FIGS. 26 and 27, the resolution decoder 4820 extracts and decodes a resolution identification flag of a differential motion vector from the bitstream, and decodes a sign of a differential motion vector and a code number of the differential motion vector. When a code number extracted from a bitstream including a code number table of differential motion vectors according to the differential motion vector resolutions as shown in FIG. 27 is (1, 1), it is possible to obtain a differential motion vector of (−⅛, −¼) by referring to the code number extracted from a bitstream including a code number table of differential motion vectors according to the differential motion vector resolutions of FIG. 27. In this event, the inter prediction decoder 4840 may calculate a predicted motion vector in the same way as that of the video encoding apparatus as described below.

$PMVx = \text{median}(7/8, 1/8, 2/8) = 2/8$ $PMVy = \text{median}(-6/8, 1/8, -2/8) = -2/8$ As a result, PMV=(2/8, −2/8)=(¼, −¼).

Therefore, MV (⅛, −4/8)=MVD(−⅛, −¼)−PMV(¼, −¼), so that (⅛, −4/8) is obtained as the decoded motion vector.

Meanwhile, when the differential vector decoder 1830 receives a reference resolution flag, the differential vector decoder 1830 reconstructs a differential motion vector and decodes the reference resolution. In this event, the differential vector decoder 1830 extracts a code number included in the reference resolution flag, decodes the differential reference motion vector by referring to the code number table according to the differential reference motion vector resolution as shown in FIG. 29, and then reconstructs the differential motion vector by using the location information included in the reference resolution flag. That is, in decoding the differential motion vector, the differential vector decoder 1830 extracts a reference resolution from a bitstream and calculates the differential reference motion vector by referring to the code number table according to the differential reference motion vector resolution as shown in FIG. 29. In this event, the differential vector decoder 1830 may extract a reference resolution flag, which indicates a reference resolution and location coordinates of a motion vector, from a bitstream and then decode a differential motion vector from the extracted reference resolution flag by using the reference resolution flag.

If a motion vector has a resolution other than the reference resolution, it is possible to employ a method of additionally encoding a reference resolution flag. The reference resolution flag may include data indicating whether the motion vector has the same resolution as the reference resolution and data indicating a location of an actual motion vector.

Meanwhile, the differential vector decoder 4830 may have another function corresponding to the function of the differential vector decoder 1830 of the video decoding apparatus 1800 according to the first aspect as described above. This function has been already described above in the discussion relating to the differential vector decoder 1830 according to the first aspect, so a detailed description thereof is omitted here.

According to the value (e.g. 1) of the resolution change flag extracted from a bitstream, a resolution identification flag is decoded after being extracted from the bitstream by using the same resolution identification flag table as used in the encoder except for the resolution having the highest frequency among the surrounding resolutions.

Meanwhile, the resolution conversion flag extractor 4850 extracts a resolution conversion flag from a bitstream. Also, according to the value (e.g. 1) of the resolution change flag extracted from a bitstream, the resolution conversion flag extractor 4850 may decode a resolution identification flag after extracting the resolution identification flag from the bitstream by a resolution identification flag table (see the table shown in FIG. 45) except for the resolution having the highest frequency among the surrounding resolutions. Further, in the case of using the resolutions of surrounding blocks, the resolution conversion flag extractor 4850 may decode the resolution conversion flag into 0 when the resolution of the current block is equal to the lowest resolution among the resolutions of A and B, and may decode the resolution conversion flag into 1 when the resolution of the current block is equal to the highest resolution. When the resolution conversion flag is encoded into 1, the encoded flag may be excluded from the resolution identification flag.

Meanwhile, the resolution conversion flag extractor 4850 may obtain the resolution of the current block by extracting the value (i.e. 1) of the resolution conversion flag from a bitstream so as to enable the difference between the resolution of the current block and the resolution of previous block A to be understood. For example, when the resolution set includes ½ and ¼ and the resolution of the previous block is ½, it is possible to understand that the converted resolution is ¼.

In the meantime, a video encoding apparatus/video decoding apparatus according to an aspect of the present disclosure can be implemented by connecting a bitstream output port of the video encoding apparatus shown in FIG.

9 or 32 and a bitstream input port of the video decoding apparatus shown in FIG. 18 or 48 with each other.

A video encoding apparatus/video decoding apparatus according to an aspect of the present disclosure includes: a video encoder for determining a motion vector resolution of each area or motion vector and performing an inter prediction encoding of a video in the unit of areas of the video by using a motion vector according to the motion vector resolution determined for each area or motion vector; and a video decoder for reconstructing a resolution by extracting resolution information from a bitstream and then performing an inter prediction decoding of each area of a video by using a motion vector according to the motion vector resolution of each area or motion vector of the video.

Figure 19:
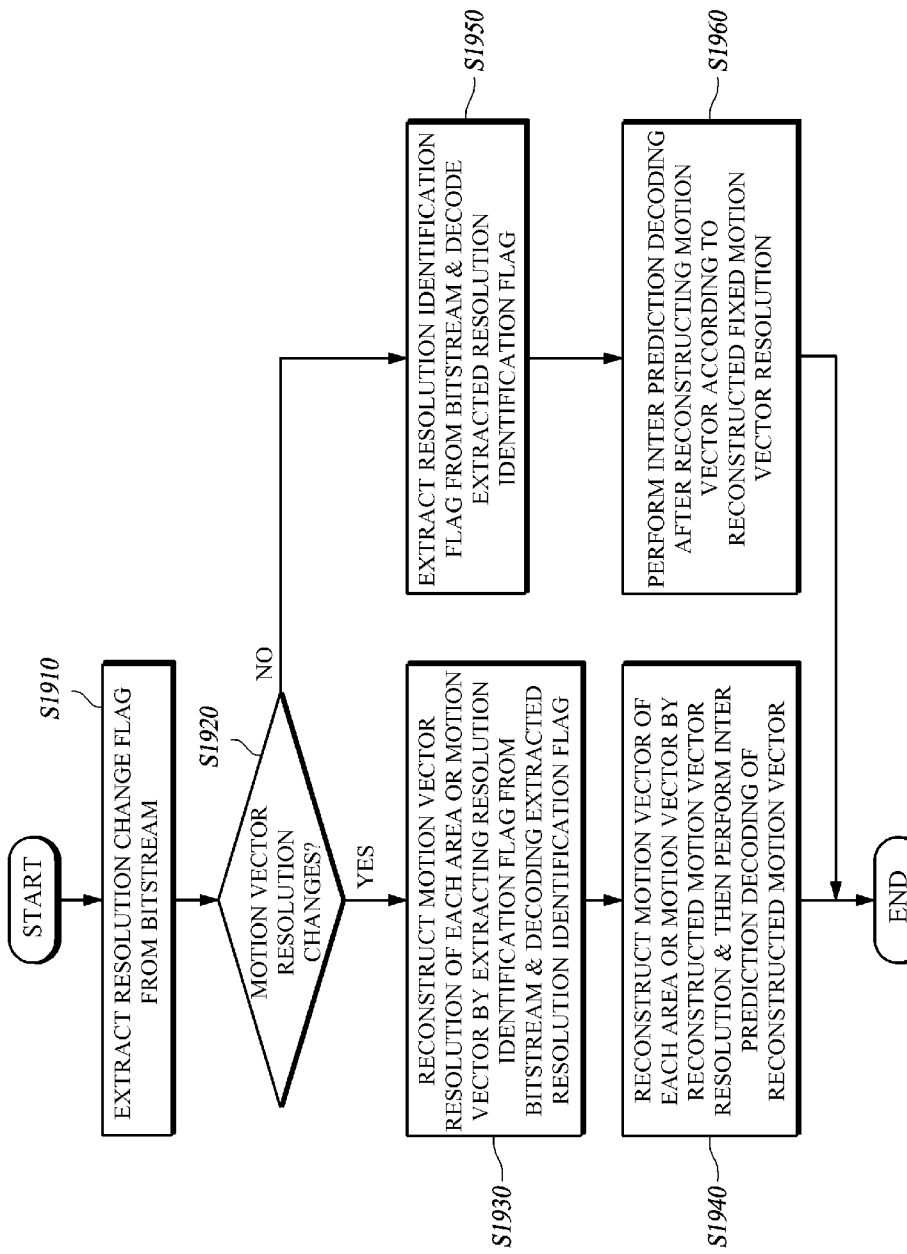
FIG. 19 is a flowchart of a method for decoding a video by using an adaptive motion vector resolution according to an aspect of the present disclosure.

FIG. 19 is a flowchart of a method for decoding a video by using an adaptive motion vector resolution according to the first aspect of the present disclosure.

In the method for decoding a video by using an adaptive motion vector resolution according to the first aspect of the present disclosure, a resolution change flag is extracted from a bitstream, an encoded resolution identification flag is extracted from a bitstream according to the extracted resolution change flag and is then decoded so that a motion vector resolution of each area or motion vector is reconstructed, and an inter prediction decoding of each area is performed using a motion vector of each area according to the motion vector resolution of each area or motion vector.

To this end, the video decoding apparatus 1800 extracts a resolution change flag from a bitstream (step S1910), determines if the extracted resolution change flag indicates that the motion vector resolution changes according to each area or motion vector (step S1920), reconstructs a motion vector resolution of each area or motion vector by extracting a resolution identification flag from a bitstream and decoding the extracted resolution identification flag when the resolution change flag indicates that the motion vector resolution changes according to each area or motion vector (step S1930), and reconstructs a motion vector of each area or motion vector by the reconstructed motion vector resolution and then performs an inter prediction decoding of the reconstructed motion vector (step S1940). Further, when the resolution change flag indicates that the motion vector resolution does not change according to each area or motion vector but is fixed, the video decoding apparatus 1800 reconstructs a motion vector resolution by extracting the resolution identification flag from a bitstream and decoding the extracted resolution identification flag (step S1950), and reconstructs a motion vector according to the fixed motion vector resolution for lower areas defined in a header according to the reconstructed motion vector resolution and then performs an inter prediction decoding of each area of the reconstructed motion vector (step S1960). In this event, the motion vector resolution decoded for each area or motion vector may have different values for an x component and a y component of the motion vector.

The video decoding apparatus 1800 may reconstruct the motion vector resolution of each area or motion vector by decoding a resolution identification flag hierarchically encoded in a Quadtree structure by grouping areas having the same motion vector resolution together, may reconstruct the motion vector resolution of each area by decoding a resolution identification flag hierarchically encoded using a motion vector resolution predicted using motion vector resolutions of surrounding areas of each area, may reconstruct the motion vector resolution of each area or motion vector by decoding a resolution identification flag in which the run and length of a motion vector resolution of each area or motion vector have been encoded, may reconstruct the motion vector resolution of each area or motion vector by decoding a resolution identification flag hierarchically encoded using a tag tree, may reconstruct the motion vector resolution of each area or motion vector by decoding a resolution identification flag with a changing number of bits allocated to the resolution identification flag according to the frequency of the motion vector resolution of each area or motion vector, may estimate a motion vector resolution according to a pre-promised estimation scheme and reconstruct the estimated motion vector resolution as a motion vector resolution of the corresponding area or motion vector when the resolution identification flag decoded for each area or motion vector corresponds to a flag indicating the capability of estimation, or may reconstruct a motion vector resolution indicated by the decoded resolution identification flag when the resolution identification flag decoded for each area or motion vector corresponds to a flag indicating the incapability of estimation. In this event, the video decoding apparatus 1800 may decode and reconstruct an identifier, which indicates the size of an area indicated by the lowest node of the Quadtree layers and the maximum number of the Quadtree layers or the size of an area indicated by the lowest node of the tag tree layers and the maximum number of the tag tree layers, from a header of a bitstream.

Further, the video decoding apparatus 1800 may extract and decode an encoded differential motion vector from a bitstream. In this event, the video decoding apparatus 1800 may decode and reconstruct a differential motion vector of each area or motion vector according to a motion vector resolution of each reconstructed area or motion vector. Additionally, the video decoding apparatus 1800 may predict a predicted motion vector of each area or motion vector and then reconstruct a motion vector of each area by using the reconstructed differential motion vector and the predicted motion vector.

To this end, the video decoding apparatus 1800 may decode the differential vector by using the UVLC. In this event, the video decoding apparatus 1800 may use the K-th order Exp-Golomb code in the decoding, and may change the degree of order (K) of the Exp-Golomb code according to the motion vector resolution determined for each area. The video decoding apparatus 1800 may decode the differential motion vector by using a text-based binary arithmetic coding. In the decoding, the video decoding apparatus 1800 may use the Concatenated Truncated Unary/K-th Order Exp-Golomb Code and may change the degree of order (K) and the maximum value (T) of the Concatenated Truncated Unary/K-th Order Exp-Golomb Code according to the motion vector resolution of each reconstructed area or motion vector. When the video decoding apparatus 1800 decodes the differential vector by using the CABAC, the video decoding apparatus 1800 may differently calculate the accumulation probability according to the motion vector resolution of each reconstructed area or motion vector.

Further, the video decoding apparatus 1800 may predict a predicted motion vector for a motion vector of each area by using motion vectors of surrounding areas of each area. In this event, when the motion vector resolution of each area is not equal to the motion vector resolution of surrounding areas, the video decoding apparatus 1800 may perform the prediction after converting the motion vector resolution of the surrounding areas to the motion vector resolution of said each area. The predicted motion vector may be obtained by the same method in the video encoding apparatus and the video decoding apparatus. Therefore, various aspects of deriving a predicted motion vector by a video encoding apparatus can be also implemented in a video decoding apparatus according to an aspect of the present disclosure.

In addition, the video decoding apparatus 1800 may use different methods of decoding a resolution identification flag according to the distribution of the motion vector resolutions of surrounding areas of each area with respect to the motion vector resolution determined according to each area or motion vector.

Further, in performing the entropy decoding by an arithmetic decoding, the video decoding apparatus 1800 may use different methods of generating a bit string of a resolution identification flag according to the distribution of the motion vector resolutions of the surrounding areas of each area and may apply different context models according to the distribution of the motion vector resolutions of the surrounding areas and the probabilities of the motion vector resolution having occurred up to the present, for the arithmetic decoding and probability update. Also, the video decoding apparatus 1800 may use different context models according to the bit positions for the arithmetic decoding and probability update.

Moreover, when one or more areas among the areas is a block and the block mode of the block is a skip mode, the video decoding apparatus 1800 may convert the motion vector resolution of the area of the motion vector to be predicted as the highest resolution among the motion vector resolutions of surrounding areas of the area and then perform the prediction.

Figure 51:
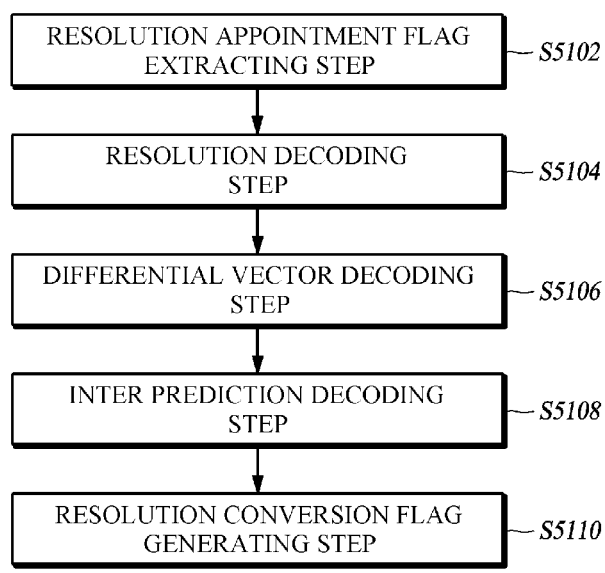
FIG. 51 is a flowchart illustrating a video decoding method using an adaptive motion vector resolution according to the second aspect of the present disclosure.

FIG. 51 is a flowchart illustrating a video decoding method using an adaptive motion vector resolution according to the second aspect of the present disclosure.

The video decoding method using an adaptive motion vector resolution according to the second aspect of the present disclosure includes: a resolution appointment flag extracting step (S5102), a resolution decoding step (S5104), a differential vector decoding step (S5106), an inter prediction decoding step (S5108), and a resolution conversion flag generating step (S5110).

The resolution appointment flag extracting step (S5102) corresponds to the operation of the resolution appointment flag extractor 4810, the resolution decoding step (S5104) corresponds to the operation of the resolution decoder 4820, the differential vector decoding step (S5106) corresponds to the operation of the differential vector decoder 4830, the inter prediction decoding step (S5108) corresponds to the operation of the inter prediction decoder 4840, and the resolution conversion flag generating step (S5110) corresponds to the operation of the resolution conversion flag extractor 4850. Therefore, a detailed description on each step is omitted here.

Meanwhile, a video encoding/decoding method according to an aspect of the present disclosure can be implemented by combining a video encoding method according to the first or second aspect and a video decoding method according to the first or second aspect of the present disclosure.

A video encoding/decoding method according to an aspect of the present disclosure includes: a video encoding step for determining a motion vector resolution of each area or motion vector and performing an inter prediction encoding of a video in the unit of areas of the video by using a motion vector according to the motion vector resolution determined for each area or motion vector; and a video decoding step for reconstructing a resolution by extracting resolution information from a bitstream and then performing an inter prediction decoding of each area of a video by using a motion vector according to the motion vector resolution of each area or motion vector of the video.

Figure 52:
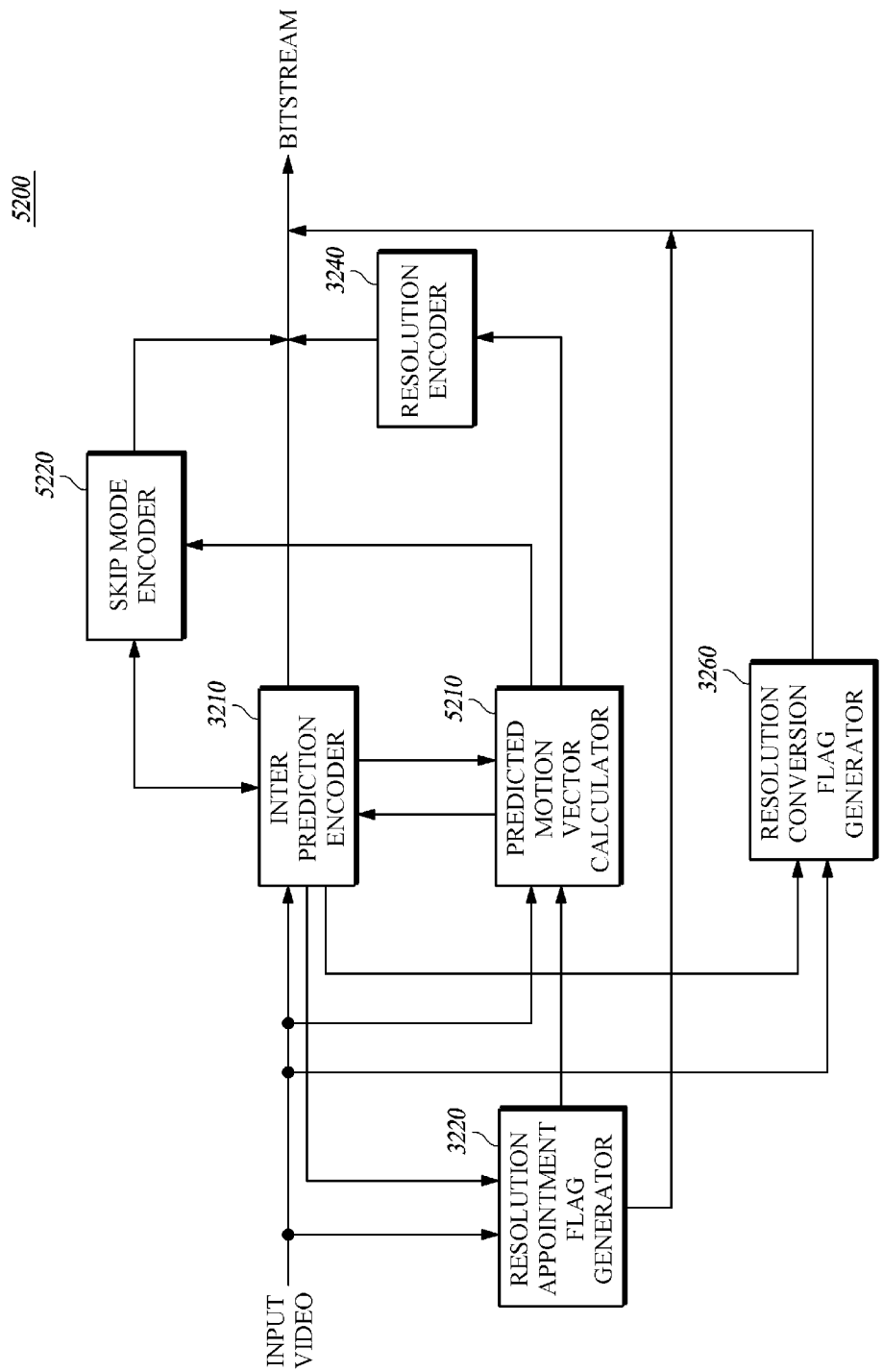
FIG. 52 is a block diagram illustrating a video encoding apparatus 5200 using an adaptive motion vector according to the third aspect of the present disclosure.

FIG. 52 is a block diagram illustrating a video encoding apparatus 5200 using an adaptive motion vector according to the third aspect of the present disclosure.

A video encoding apparatus 5200 using an adaptive motion vector according to the third aspect of the present disclosure includes an inter prediction encoder 3210, a resolution appointment flag generator 3220, a resolution encoder 3240, a resolution conversion flag generator 3260, a predicted motion vector calculator 5210, and a skip mode encoder 5220. Meanwhile, it is not inevitably required that all of the resolution appointment flag generator 3220, resolution encoder 3240, and the resolution conversion flag generator 3260 should be included in the video encoding apparatus 5200, and they may be selectively included in the video encoding apparatus 5200.

The inter prediction encoder 3210 performs an inter prediction encoding of a video in the unit of areas of the image by using a motion vector according to a motion vector resolution determined for each motion vector or each area of the video. The inter prediction encoder 3210 can be implemented by the video encoding apparatus 100 described above with reference to FIG. 1. In this event, when the resolution encoder 3240 of FIG. 52 is additionally included and the function of the additionally included resolution encoder 3240 overlaps with the function of the encoder 150 within the video encoding apparatus 5200, the overlapping function may be omitted in the encoder 150.

Further, the resolution encoder 3240 and the skip mode encoder 5220 may be configured either as elements separate from the inter prediction encoder 3210 as shown in FIG. 52 or as an element integrally formed with the encoder 150 within the inter prediction encoder 3210. Further, the flag information generated in the resolution appointment flag generator 3220, the resolution encoder 3240, or the resolution conversion flag generator 3260 may be transformed into a bitstream either by the resolution appointment flag generator 3220, the resolution encoder 3240, or the resolution conversion flag generator 3260 or by the encoder 150 within the inter prediction encoder 3210. Meanwhile, the operation of the predicted motion vector calculator 5210 may include the operation of the resolution determiner 3230. Further, the operations of the inter prediction encoder 3210, the resolution appointment flag generator 3220, the resolution encoder 3240, and the resolution conversion flag generator 3260 may include the functions of the inter prediction encoder 3210, the resolution appointment flag generator 3220, the resolution encoder 3240, and the resolution conversion flag generator 3260 as described above with reference to FIG. 32, respectively.

Further, when the function of the predicted motion vector calculator 5210 overlaps with the function of the predictor 110 within the inter prediction encoder 3210, the overlapping function may be omitted in the predictor 110. Further, the predicted motion vector calculator 5210 may be configured either as an element separate from the inter prediction encoder 3210 as shown in FIG. 52 or as an element integrally formed with the predictor 110 within the inter prediction encoder 3210.

Hereinafter, a description will be made with reference to FIG. 52.

The predicted motion vector calculator 5210 calculates a predicted motion vector of a current block to be encoded using motion vectors of one or more surrounding blocks.

When a result of the prediction on the current block and the predicted motion vector satisfy the skip condition, the skip mode encoder 5220 encodes information indicating that the current block is a skip block.

The resolution encoder 3240 encodes information indicating a resolution of a motion vector of the current block.

In this event, a resolution of at least one motion vector among the motion vectors of the surrounding blocks and the motion vector of the current block may have a value different from values of resolutions of the other motion vectors.

The predicted motion vector calculator 5210 may convert the resolution of a predicted motion vector or at least one motion vector among the motion vectors of the surrounding blocks.

The predicted motion vector calculator 5210 may convert the resolution of the predicted motion vector or at least one motion vector among the motion vectors of the surrounding blocks to a resolution equal to a preset resolution of the current block.

The predicted motion vector calculator 5210 may convert one or more resolutions among the resolutions of the motion vectors of the surrounding blocks.

The predicted motion vector calculator 5210 may convert the resolution of the predicted motion vector.

The predicted motion vector calculator 5210 may convert the resolutions so as to make the motion vectors of the surrounding blocks have the same resolution.

Meanwhile, the information indicating the resolution of the motion vector of the current block may indicate the resolution of the converted predicted motion vector.

Further, the information indicating the resolution of the motion vector of the current block may indicate the same resolution of the surrounding blocks.

In the meantime, the inter prediction encoder 3210 may store a block referred to by the predicted motion vector as a block constructed by encoding the current block, so as to enable the current block to be used as a reference picture.

Figure 53:
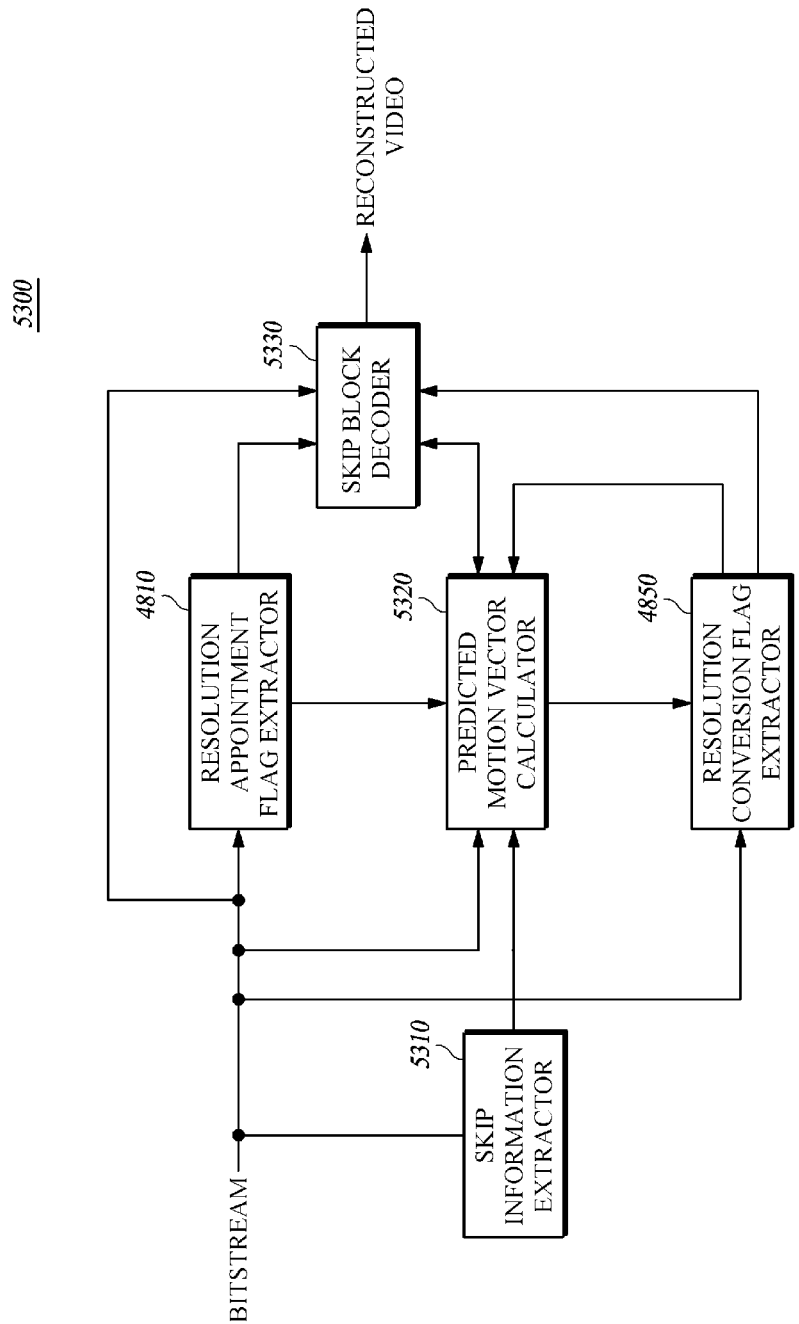
FIG. 53 is a block diagram illustrating a video decoding apparatus using an adaptive motion vector according to the third aspect of the present disclosure.

FIG. 53 is a block diagram illustrating a video decoding apparatus using an adaptive motion vector according to the third aspect of the present disclosure.

A video decoding apparatus 5300 using an adaptive motion vector according to the third aspect of the present disclosure includes a resolution appointment flag extractor 4810, a resolution conversion flag extractor 4850, a skip information extractor 5310, a predicted motion vector calculator 5320, and a skip block decoder 5330. In this event, it is not required that both of the resolution appointment flag extractor 4810 and the resolution conversion flag extractor 4850 should be included in the video decoding apparatus 5300, and they may be selectively included in the video decoding apparatus 5300 according to the encoding scheme of a video encoding apparatus for generating an encoded bitstream. The operation of the predicted motion vector calculator 5320 may include the operation of the resolution decoder 4820 of FIG. 48. Further, the operations of the resolution appointment flag extractor 4810 and the resolution conversion flag extractor 4850 may include the operations of the resolution appointment flag extractor 4810 and the resolution conversion flag extractor 4850.

The skip information extractor 5310 decodes information indicating the a current block to be decoded is a skip block.

The predicted motion vector calculator 5320 obtains a predicted motion vector of the current block to be decoded using motion vectors of one or more surrounding blocks.

The skip block decoder 5330 selects the predicted motion vector as the motion vector of the current block and then decodes the current block into the skip mode by using the motion vector of the current block.

In this event, a resolution of at least one motion vector among the motion vectors of the surrounding blocks and the motion vector of the current block may have a value different from values of resolutions of the other motion vectors.

The predicted motion vector calculator 5320 may convert the resolution of a predicted motion vector or at least one motion vector among the motion vectors of the surrounding blocks.

The predicted motion vector calculator 5320 may convert the resolution of the predicted motion vector or at least one motion vector among the motion vectors of the surrounding blocks to the same resolution as a resolution predetermined as the resolution of the motion vector of the skip block.

The resolution decoder 4820 decodes information indicating a resolution of a motion vector. In this event, the predicted motion vector calculator 5320 obtains a predicted motion vector of the current block by using the information indicating resolutions of a motion vector and motion vectors of one or more surrounding blocks.

The predicted motion vector calculator 5320 may convert one or more resolutions among the resolutions of the motion vectors of the surrounding blocks.

The predicted motion vector calculator 5320 may convert the resolution of the predicted motion vector.

The predicted motion vector calculator 5320 may convert the resolutions so as to make the motion vectors of the surrounding blocks have the same resolution.

In this event, the information indicating the resolution of the motion vector of the current block may indicate the resolution of the converted predicted motion vector. Further, the information indicating the resolution of the motion vector of the current block may indicate the same resolution of the surrounding blocks.

Hereinafter, an encoding and a decoding in a skip mode, to which an adaptive motion vector resolution according to the present disclosure has been applied, will be described with reference to the video encoding apparatus and the video decoding apparatus as shown in FIGS. 52 and 53.

The skip mode of the inter prediction can achieve a high efficiency encoding by signaling non-existence of information, required for decoding of the block to be decoded, within a bitstream to a video decoding apparatus.

For example, in a case in which the skip mode encoder 5220 tries to encode the current block in order to determine whether the skip condition is satisfied, if the motion vector of the current block is identical to the predicted motion vector, the reference picture index is 0, and it is determined that all quantized coefficients within the current block obtained by converting and quantizing the obtained residual signal (this determination can be made based on the result from the quantizer 140), the skip mode encoder 5220 encodes information indicating that the current block is a skip block, which implies that the current block can be decoded in the skip mode, and then transmits the encoded information to the video decoding apparatus 5300. Therefore, the skip mode implies that the motion vector of the current block is identical to the predicted motion vector, the reference picture index is 0, and there is no residual signal conversion coefficient data. Accordingly, at the time of encoding into the skip mode, it will do if the skip mode encoder 5220 encodes only the skip flag 1 bit.

In this event, the skip information extractor 5310 of the video decoding apparatus 5300 extracts a skip flag from a bitstream, and the predicted motion vector calculator 5320 calculates a predicted motion vector as the motion vector of the current block when the encoding mode of the current block is a skip mode, that is to say, when the skip flag indicates the skip mode. In this event, since the residual signal of the current block is 0, the skip block decoder 5330 uses the predicted block obtained using the motion vector determined in the way described above as a reconstructed block (i.e. decoded block) of the current block. The block encoded in the skip mode as described above is called a skip block.

Meanwhile, the present disclosure may use either a fixed value or an adaptively changing value as the resolution of the motion vector of the skip block. The resolution may be a resolution of a motion vector or a resolution of a predicted motion vector.

In the case of using a fixed motion vector resolution in encoding or decoding in the skip mode, the predicted motion vector calculator 5210 and the predicted motion vector calculator 5320 of a video encoding apparatus use the same resolution. Further, when the motion vector resolution is fixed, a predetermined resolution may be selected. For example, the highest resolution may be selected from possible resolutions. The predicted motion vector calculator 5210 of the video encoding apparatus and the predicted motion vector calculator 5320 of the video decoding apparatus may calculate a predicted motion vector of a skip block to be encoded or decoded using surrounding motion vectors based on a predetermined motion vector resolution. The predicted motion vector may be obtained by the same method in the predicted motion vector calculator 5210 of the video encoding apparatus and the predicted motion vector calculator 5320 of the video decoding apparatus. Therefore, various aspects of deriving the predicted motion vector as described above with reference to FIG. 22 and aspects relating to the motion vector resolution conversion as described above with reference to FIGS. 23 and 24 may be also applied to the encoding or decoding of the skip block described below.

If the motion vector resolution appointment flag appoints ½, ¼, and ⅛ as the kinds of resolutions and the motion vector resolution of a skip block is fixed to ⅛, the predicted motion vector calculator 5210 of the video encoding apparatus or the predicted motion vector calculator 5320 of the video decoding apparatus may obtain a predicted motion vector of the skip block by converting the motion vector resolution of motion vectors of the surrounding blocks to ⅛ using the conversion formula shown in FIG. 23 and then calculating a median value thereof. Otherwise, the predicted motion vector calculator 5210 of the video encoding apparatus or the predicted motion vector calculator 5320 of the video decoding apparatus may use a value, which is obtained by calculating a median value of the surrounding motion vectors without converting the resolution of the surrounding motion vectors and then converting the resolution of the median value to ⅛, as the predicted motion vector of the skip block. Otherwise, the predicted motion vector calculator 5210 of the video encoding apparatus or the predicted motion vector calculator 5320 of the video decoding apparatus may use a median value of the surrounding motion vectors without converting the resolution of the surrounding motion vectors, as the predicted motion vector of the skip block. Otherwise, the predicted motion vector calculator 5210 of the video encoding apparatus or the predicted motion vector calculator 5320 of the video decoding apparatus may obtain the predicted motion vector by using only the motion vector having a resolution of ⅛ among the surrounding motion vectors. In this event, the skip mode encoder 5220 of the video encoding apparatus encodes information (a skip mode flag) indicating that the current block has been encoded in the skip mode. The skip information extractor 5310 of the video decoding apparatus may extract a skip mode flag from a bitstream. Then, when the skip mode flag indicates the skip mode, the predicted motion vector calculator 5320 obtains the predicted motion vector and uses the predicted motion vector as the motion vector of the current block, like the predicted motion vector calculator 5210 of the video encoding apparatus.

Hereinafter, an aspect of adaptively selecting a motion vector resolution of a skip block will be described.

In the case of adaptively selecting a motion vector resolution of a skip block, the skip mode encoder 5220 according to the present disclosure encodes a skip mode flag, the resolution encoder 3240 encodes a motion vector resolution identification flag, and the resolution conversion flag generator 3260 encodes a motion vector resolution conversion flag.

The skip information extractor 5310 of the video decoding apparatus 5300 extracts a skip mode flag from a bitstream, and the resolution decoder 4820 and the resolution conversion flag extractor 4850 extract and decode a motion vector resolution identification flag and a motion vector resolution conversion flag, respectively. In this event, the predicted motion vector calculator 5320 may calculate the predicted motion vector of the skip block by using the motion vector resolution of the decoded motion vector. The predicted motion vector may be obtained by the same method as that of the predicted motion vector calculator 5210. Therefore, various aspects of deriving the predicted motion vector as described above with reference to FIG. 22 and aspects relating to the motion vector resolution conversion as described above with reference to FIGS. 23 and 24 may be also applied to the encoding or decoding according to the skip mode described below.

In the aspects described above, the motion vector of the current block has been determined, the resolution of the motion vector of surrounding blocks or the resolution of a predicted motion vector obtained using motion vectors of the surrounding blocks is converted to a resolution equal to the determined resolution of the motion vector of the current block. However, in the case of the skip block, a motion vector of the skip block does not exist.

Therefore, the predicted motion vector calculator 5210 of the video encoding apparatus 5200 according to an aspect of the present disclosure converts the motion vectors of the surrounding blocks with respective possible resolutions, and calculates a predicted motion vector of each resolution by using the converted motion vector resolutions of the surrounding blocks according to the respective resolutions. Then, the predicted motion vector calculator 5210 may select a motion vector having the best encoding efficiency among the predicted motion vectors obtained according to the resolutions as a motion vector of the skip block, and then encode a resolution of the selected motion vector by using the flags as described above.

The predicted motion vector calculator 5210 according to another aspect of the present disclosure obtains a predicted motion vector by using motion vectors of the surrounding blocks and then converts the predicted motion vector according to each resolution. Then, the predicted motion vector calculator 5210 may select a motion vector having the best encoding efficiency among the converted predicted motion vectors according to the resolutions as a motion vector of the skip block, and then encode a resolution of the selected motion vector by using the flags as described above.

If a motion vector resolution appointment flag appoints ½, ¼, and ⅛ as the kinds of motion vector resolutions and the motion vector resolution is encoded using the motion vector resolution identification flag, the predicted motion vector of the skip block may be obtained by converting the resolutions of the surrounding motion vectors to the motion vector resolution of the current skip mode and then taking a median thereof by using the conversion formula shown in FIG. 23. In this event, the skip mode encoder 5220 may encode the skip mode flag and encode the optimum resolution of the skip mode by using the resolution identification flag.

In this event, the skip information extractor 5310 of the video decoding apparatus 5300 extracts a skip flag from a bitstream. Then, when the encoding mode of the current block is a skip mode, the predicted motion vector calculator 5320 obtains a median value by decoding the motion vector resolution identification flag and converting the surrounding motion vectors according to a corresponding motion vector resolution, and then uses the median value as a predicted motion vector. This predicted motion vector is used as the motion vector of the skip block.

Further, the resolution of the motion vector may be indicated using the motion vector resolution conversion flag extracted by the resolution conversion flag extractor 4850 and the motion vector resolution identification flag extracted by the predicted motion vector calculator 5320. In this event, the motion vector resolution conversion flag may indicate whether a resolution conversion from the motion vector resolution of the previously encoded skip mode has been performed or not. Otherwise, the motion vector resolution conversion flag may indicate whether a resolution conversion from the motion vector resolution of the previous block has been performed or not.

If a motion vector resolution appointment flag extracted by the resolution appointment flag extractor 4810 appoints ¼ and ⅛ as the kinds of motion vector resolutions and the motion vector resolution is encoded using the motion vector resolution conversion flag, it is not necessary to encode the motion vector resolution identification flag. In this event, from the motion vector resolution conversion flag, the video decoding apparatus can determine whether the resolution is equal to the motion vector resolution of the previously decoded block or the previously decoded skip mode.

Further, the resolution identification flag, the resolution appointment flag, and the resolution conversion flag may indicate a resolution of a predicted motion vector. In this event, the predicted motion vector can be calculated using a selected predicted motion vector resolution. The predicted motion vector can be obtained in the same way in the video encoding apparatus and in the video decoding apparatus. Therefore, various aspects of deriving the predicted motion vector and aspects relating to the motion vector resolution conversion as described above with reference to FIGS. 22 to 26 may be also applied to the encoding or decoding of the skip block described below.

If the predicted motion vector resolution appointment flag appoints ½, ¼, and ⅛ as the kinds of predicted motion vector resolutions and encodes the resolution of the predicted motion vector by using the predicted motion vector resolution identification flag, the predicted motion vector may be calculated by converting the resolutions of the surrounding motion vectors according to the predicted motion vector resolution. Further, the predicted motion vector may be calculated using surrounding motion vectors having the same resolution as the predicted motion vector resolution.

In the meantime, a video encoding apparatus/video decoding apparatus according to an aspect of the present disclosure can be implemented by connecting a bitstream output port of the video encoding apparatus shown in FIG. 9, 32, or 52 and a bitstream input port of the video decoding apparatus shown in FIG. 18, 48, or 53 with each other.

An apparatus for encoding/decoding a video according to an aspect of the present disclosure includes: a video encoder for calculating a predicted motion vector of a current block to be encoded using motion vectors of one or more surrounding blocks, and encoding a result of prediction of the current block and information indicating that the current block is a skip block when the predicted motion vector satisfies a skip condition; and a video decoder for decoding information indicating that a current block to be decoded is a skip block, calculating a predicted motion vector of the current block to be decoded using motion vectors of one or more surrounding blocks, selecting the calculated predicted motion vector as a motion vector of the current block to be decoded, and decoding the current block in the skip mode by using the motion vector of the current block.

A video encoding method according to the third aspect of the present disclosure includes a predicted motion vector calculating step (S5402) for calculating a predicted motion vector of a current block to be encoded using motion vectors of one or more surrounding blocks and a skip mode encoding step (S5404) for encoding a result of prediction of the current block and information indicating that the current block is a skip block when the predicted motion vector satisfies a skip condition.

The predicted motion vector calculating step (S5402) corresponds to the operation of the predicted motion vector calculator 5210 and the skip mode encoding step (S5404) corresponds to the operation of the skip mode encoder 5220, so a more detailed description thereof is omitted here.

A video decoding method according to the fourth aspect of the present disclosure includes a predicted motion vector calculating step (S5502) for calculating a predicted motion vector of a current block to be encoded using motion vectors of one or more surrounding blocks, a skip mode encoding step (S5504) for encoding a result of prediction of the current block and information indicating that the current block is a skip block when the predicted motion vector satisfies a skip condition, and a resolution encoding step (S5506) for encoding information indicating a resolution of the motion vector of the current block.

The predicted motion vector calculating step (S5502) corresponds to the operation of the predicted motion vector calculator 5210, the skip mode encoding step (S5504) corresponds to the operation of the skip mode encoder 5220, and the resolution encoding step (S5506) corresponds to the operation of the resolution encoder 3240, so a more detailed description thereof is omitted here.

A video decoding method according to the third aspect of the present disclosure includes a skip information extracting step (S5602) for decoding information indicating that a current block to be decoded is a skip block, a predicted motion vector calculating step (S5604) for calculating a predicted motion vector of the current block to be decoded using motion vectors of one or more surrounding blocks, and a skip block decoding step (S5606) for selecting the calculated predicted motion vector as a motion vector of the current block to be decoded and decoding the current block in the skip mode by using the motion vector of the current block.

The skip information extracting step (S5602) corresponds to the operation of the skip information extractor 5310, the predicted motion vector calculating step (S5604) corresponds to the operation of the predicted motion vector calculator 5320, and the skip block decoding step (S5606)

corresponds to the operation of the skip block decoder 5330, so a more detailed description thereof is omitted here.

A video decoding method according to the fourth aspect of the present disclosure includes a skip information extracting step (S5702) for decoding information indicating that a current block to be decoded is a skip block, a resolution decoding step (S5704) for decoding information indicating a resolution of a motion vector, a predicted motion vector calculating step (S5706) for calculating a predicted motion vector of the current block to be decoded using motion vectors of one or more surrounding blocks, and a skip block decoding step (S5708) for selecting the calculated predicted motion vector as a motion vector of the current block to be decoded and decoding the current block in the skip mode by using the motion vector of the current block.

The skip information extracting step (S5702) corresponds to the operation of the skip information extractor 5310, the resolution decoding step (S5704) and the predicted motion vector calculating step (S5706) correspond to the operation of the predicted motion vector calculator 5320, and the skip block decoding step (S5708) corresponds to the operation of the skip block decoder 5330, so a more detailed description thereof is omitted here.

Meanwhile, a video encoding/decoding method according to an aspect of the present disclosure can be implemented by combining one of video encoding methods according to the first to fourth aspects of the present disclosure and one of video decoding methods according to the first to fourth aspects of the present disclosure.

A method for encoding/decoding a video according to an aspect of the present disclosure includes: a video encoding step of calculating a predicted motion vector of a current block to be encoded by using motion vectors of one or more surrounding blocks, and encoding a result of performing a prediction of the current block and information indicating that the current block is a skip block when the predicted motion vector satisfies a skip condition; and a video decoding step of decoding information indicating that a current block to be decoded is a skip block, calculating a predicted motion vector of the current block to be decoded using motion vectors of one or more surrounding blocks, selecting the calculated predicted motion vector as a motion vector of the current block to be decoded, and decoding the current block in the skip mode by using the motion vector of the current block.

As described above, according to aspects of the present disclosure, it is possible to determine a motion vector resolution may be determined in the unit of motion vector or area having a predetermined size of a video according to the characteristics of the video (e.g. the degree of complexity or the degree of movement of the video) and to perform an inter prediction encoding by using a motion vector having an adaptive motion vector resolution. Therefore, the present disclosure can improve the quality of the video while reducing the quantity of bits involved in the encoding, so as to enhance the compression efficiency. For example, an area (i.e. first area) in a certain picture of a video may have a high complexity and a small degree of movement while another area (i.e. second area) in the certain picture of the video may have a low complexity and a large degree of movement. In this event, for the first area, an inter prediction encoding may be performed after enhancing the motion vector resolution of the first area, so as to increase the exactness of the inter prediction, which can reduce residual signals and the quantity of encoded bits. Moreover, due to the small degree of movement of the first area, even the increase of the resolution in the first area does not greatly increase the quantity of bits, which can improve the video quality while reducing the encoded bit quantity. Further, in relation to the second area, even an inter prediction encoding with a lower motion vector resolution does not greatly degrade the video quality of the second area, and the second area can allow a low motion vector resolution, which can increase the quantity of encoded bits of the motion vector. As a result, without substantially degrading the video quality of the second area, the entire quantity of encoded bits can be reduced, which can improve the compression efficiency.

In the description above, although all of the components of the aspects of the present disclosure may have been explained as assembled or operatively connected as a unit, the present disclosure is not intended to limit itself to such aspects. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

INDUSTRIAL APPLICABILITY

As described above, the present disclosure is highly useful for application in the fields of compressing a video, performing an inter prediction encoding by adaptively changing a motion vector resolution in the unit of predetermined area, and thereby efficiently encoding a video.

The invention claimed is:

1. An apparatus for encoding a motion vector of a current block into a bitstream, the apparatus including a microprocessor,
 the microprocessor configured to encode, after the motion vector of the current block is determined, the determined motion vector of the current block,
  by using a predicted motion vector and a differential motion vector instead of encoding a value of the motion vector of the current block itself, the predicted motion vector being decided from one or more motion vectors of one or more blocks adjacent to the current block, the differential motion vector being derived from a difference between the motion vector of the current block and the predicted motion vector, the microprocessor comprising:

a resolution determiner configured to determine a motion vector resolution to be applied to a motion vector of either the current block or an image area in which the current block is located, wherein the motion vector resolution is a fractional pixel precision of a motion vector used for predicting the current block from a reference picture, the fractional pixel precision representing up to which fractional pixel location the reference picture is interpolated;

a predicted motion vector calculator configured to decide the predicted motion vector of the current block from the one or more motion vectors of the one or more blocks adjacent to the current block, check whether (i) a motion vector resolution of the predicted motion vector and (ii) the motion vector resolution determined by the resolution determiner are equal to each other, and convert the motion vector resolution of the predicted motion vector such that the converted motion vector resolution of the predicted motion vector is equal to the motion vector resolution determined by the resolution determiner, when the motion vector resolution of the predicted motion vector is different from the motion vector resolution determined by the resolution determiner, wherein the differential motion vector is encoded into the bitstream as a difference between the motion vector of the current block and the predicted motion vector having the converted motion vector resolution; and a mode encoder configured to encode mode information indicating that the differential motion vector is 0, when the differential motion vector is not encoded.

2. The apparatus of claim 1, further comprising:

a resolution encoder configured to encode the motion vector resolution determined by the resolution determiner.

3. The apparatus of claim 1, wherein the resolution determiner is configured to determine the motion vector resolution to be applied to the motion vector of either the current block or the image area in which the current block is located, as a preset motion vector resolution.

4. An apparatus for encoding a motion vector of a current block into a bitstream, the apparatus including a microprocessor, the microprocessor configured to encode, after the motion vector of the current block is determined, the determined motion vector of the current block, by using a predicted motion vector and a differential motion vector instead of encoding a value of the motion vector of the current block itself, the predicted motion vector being decided from one or more motion vectors of one or more blocks adjacent to the current block, the differential motion vector being derived from a difference between the motion vector of the current block and the predicted motion vector, the microprocessor comprising:

a resolution determiner configured to determine a motion vector resolution to be applied to a motion vector of either the current block or an image area in which the current block is located, wherein the motion vector resolution is a fractional pixel precision of a motion vector used for predicting the current block from a reference picture, the fractional pixel precision representing up to which fractional pixel location the reference picture is interpolated;

a predicted motion vector calculator configured to check whether (i) a motion vector resolution of at least one motion vector among the one or more motion vectors of the one or more blocks adjacent to the current block and (ii) the motion vector resolution determined by the resolution determiner are equal to each other, convert the motion vector resolution of the at least one motion vector such that the converted motion vector resolution of the at least one motion vector is equal to the motion vector resolution determined by the resolution determiner, when the motion vector resolution of the at least one motion vector is different from the motion vector resolution determined by the resolution determiner, and decide the predicted motion vector of the current block from the one or more motion vectors at least one of which has the converted motion vector resolution, wherein the differential motion vector is encoded into the bitstream as a difference between the motion vector of the current block and the predicted motion vector; and a mode encoder configured to encode mode information indicating that the differential motion vector is 0, when the differential motion vector is not encoded.

5. The apparatus of claim 4, further comprising:

a resolution encoder configured to encode the motion vector resolution determined by the resolution determiner.

6. An apparatus for decoding a motion vector of a current block from a bitstream, the apparatus including a microprocessor, the microprocessor configured to decode, instead of decoding a value of the motion vector itself of the current block to be extracted from a bitstream, the motion vector of the current block and mode information related to the motion vector of the current block, wherein the motion vector of the current block is decoded by using a predicted motion vector and a differential motion vector, instead of extracting a value of the motion vector itself of the current block from the bitstream, the predicted motion vector being decided from one or more motion vectors of one or more blocks adjacent to the current block, and the differential motion vector being a difference between the motion vector of the current block and the predicted motion vector, the microprocessor comprising:

an information extractor configured to decode, from the bitstream, the mode information indicating whether (i) the motion vector of the current block is identical to the predicted motion vector of the current block and (ii) thereby the differential motion vector between the motion vector of the current block and the predicted motion vector is not encoded in the bitstream;

a resolution determiner configured to determine a motion vector resolution to be applied to a motion vector of either the current block or an image area in which the current block is located, wherein the motion vector resolution is a fractional pixel precision of a motion vector used for predicting the current block from a reference picture, the fractional pixel precision representing up to which fractional pixel location the reference picture is interpolated;

a predicted motion vector calculator configured to
decide the predicted motion vector from the one or more motion vectors of the one or more blocks adjacent to the current block,
check whether (i) a motion vector resolution of the predicted motion vector and (ii) the motion vector resolution determined by the resolution determiner are equal to each other, and
convert the motion vector resolution of the predicted motion vector such that the converted motion vector resolution of the predicted motion vector is equal to the motion vector resolution determined by the resolution determiner, when the motion vector resolution of the predicted motion vector is different from the motion vector resolution determined by the resolution determiner; and
a decoder configured to
set the resolution-converted predicted motion vector as the motion vector of the current block, when the mode information indicates that (i) the motion vector of the current block is identical to the predicted motion vector of the current block and (ii) thereby the differential motion vector between the motion vector of the current block and the predicted motion vector is not encoded in the bitstream.

7. The apparatus of claim 6, wherein the resolution determiner is configured to determine the motion vector resolution to be applied to the motion vector of either the current block or the image area in which the current block is located, from the bitstream.

8. The apparatus of claim 6, wherein the resolution determiner is configured to determine the motion vector resolution to be applied to the motion vector of either the current block or the image area in which the current block is located, as a predetermined motion vector resolution.

9. An apparatus for decoding a motion vector of a current block from a bitstream, the apparatus including a microprocessor,
the microprocessor configured to decode, the motion vector of the current block and mode information related to the motion vector of the current block,
wherein the motion vector of the current block is decoded by using a predicted motion vector and a differential motion vector, instead of extracting a value of the motion vector itself of the current block from the bitstream, the predicted motion vector being decided from one or more motion vectors of one or more blocks adjacent to the current block, and the differential motion vector being a difference between the motion vector of the current block and the predicted motion vector,
the microprocessor comprising:
an information extractor configured to decode, from the bitstream, the mode information indicating whether (i) the motion vector of the current block is identical to the predicted motion vector of the current block and (ii) thereby the differential motion vector between the motion vector of the current block and the predicted motion vector is not encoded in the bitstream;
a resolution determiner configured to determine a motion vector resolution to be applied to a motion vector of either the current block or an image area in which the current block is located,
wherein the motion vector resolution is a fractional pixel precision of a motion vector used for predicting the current block from a reference picture, the fractional pixel precision representing up to which fractional pixel location the reference picture is interpolated;
a motion vector calculator configured to
check whether (i) a motion vector resolution of at least one motion vector among the one or more motion vectors of the one or more blocks adjacent to the current block and (ii) the motion vector resolution determined by the resolution determiner are equal to each other,
convert the motion vector resolution of the at least one motion vector such that the converted motion vector resolution of the at least one motion vector is equal to the motion vector resolution determined by the resolution determiner, when the motion vector resolution of the at least one motion vector is different from the motion vector resolution determined by the resolution determiner, and
decide the predicted motion vector from the one or more motion vectors at least one of which has the converted motion vector resolution; and
a decoder configured to
set the predicted motion vector as the motion vector of the current block, when the mode information indicates that (i) the motion vector of the current block is identical to the predicted motion vector of the current block and (ii) thereby the differential motion vector between the motion vector of the current block and the predicted motion vector is not encoded in the bitstream.

10. The apparatus of claim 9, wherein the resolution determiner is configured to determine the motion vector resolution to be applied to the motion vector of either the current block or the image area in which the current block is located, from the bitstream.

11. A method for encoding a motion vector of a current block into a bitstream, the method comprising:
encoding, after the motion vector of the current block is determined, the determined motion vector of the current block,
by using a predicted motion vector and a differential motion vector instead of encoding a value of the motion vector of the current block itself, the predicted motion vector being decided from one or more motion vectors of one or more blocks adjacent to the current block, the differential motion vector being derived from a difference between the motion vector of the current block and the predicted motion vector,
the encoding of the determined motion vector of the current block comprising:
determining a motion vector resolution to be applied to a motion vector of either the current block or an image area in which the current block is located,
wherein the motion vector resolution is a fractional pixel precision of a motion vector used for predicting the current block from a reference picture, the fractional pixel precision representing up to which fractional pixel location the reference picture is interpolated;
deciding the predicted motion vector of the current block from the one or more motion vectors of the one or more blocks adjacent to the current block;
checking whether (i) a motion vector resolution of the predicted motion vector and (ii) the motion vector resolution determined in the step of the determining of the motion vector resolution are equal to each other;
converting the motion vector resolution of the predicted motion vector such that the converted motion vector resolution of the predicted motion vector is equal to the motion vector resolution determined in the step of the determining of the motion vector resolution, when the motion vector resolution of the predicted motion vector is different from the motion vector resolution determined in the step of the determining of the motion vector resolution, wherein the differential motion vector is encoded into the bitstream as a difference between the motion vector of the current block and the predicted motion vector having the converted motion vector resolution; and encoding mode information indicating that the differential motion vector is 0, when the differential motion vector is not encoded.

12. The method of claim 11, further comprising:
encoding the motion vector resolution determined in the step of the determining of the motion vector resolution.

13. The method of claim 11, wherein the step of the determining of the motion vector resolution comprises: determining the motion vector resolution to be applied to the motion vector of either the current block or the image area in which the current block is located, as a preset motion vector resolution.

14. A method for encoding a motion vector of a current block into a bitstream, the method comprising:
encoding, after the motion vector of the current block is determined, the determined motion vector of the current block,
by using a predicted motion vector and a differential motion vector instead of encoding a value of the motion vector of the current block itself, the predicted motion vector being decided from one or more motion vectors of one or more blocks adjacent to the current block, the differential motion vector being derived from a difference between the motion vector of the current block and the predicted motion vector,
the encoding of the determined motion vector of the current block further comprising:
determining a motion vector resolution to be applied to a motion vector of either the current block or an image area in which the current block is located,
wherein the motion vector resolution is a fractional pixel precision of a motion vector used for predicting the current block from a reference picture, the fractional pixel precision representing up to which fractional pixel location the reference picture is interpolated;
checking whether (i) a motion vector resolution of at least one motion vector among the one or more motion vectors of the one or more blocks adjacent to the current block and (ii) the motion vector resolution determined in the step of the determining of the motion vector resolution are equal to each other;
converting the motion vector resolution of the at least one motion vector such that the converted motion vector resolution of the at least one motion vector is equal to the motion vector resolution determined in the step of the determining of the motion vector resolution, when a motion vector resolution of the at least one motion vector is different from the motion vector resolution determined in the step of the determining of the motion vector resolution;
deciding the predicted motion vector of the current block from the one or more motion vectors at least one of which has the converted motion vector resolution, wherein the differential motion vector is encoded into the bitstream as a difference between the motion vector of the current block and the predicted motion vector; and encoding mode information indicating that the differential motion vector is 0, when the differential motion vector is not encoded.

15. The method of claim 14, further comprising:
encoding the motion vector resolution determined in the step of the determining of the motion vector resolution.

16. A method for decoding a motion vector of a current block from a bitstream, the method comprising:
decoding, the motion vector of the current block and mode information related to the motion vector of the current block,
wherein the motion vector of the current block is decoded by using a predicted motion vector and a differential motion vector, instead of extracting a value of the motion vector itself of the current block from the bitstream, the predicted motion vector being decided from one or more motion vectors of one or more blocks adjacent to the current block, and the differential motion vector being a difference between the motion vector of the current block and the predicted motion vector,
the decoding of the motion vector of the current block comprising:
decoding, from the bitstream, the mode information indicating whether (i) the motion vector of the current is identical to the predicted motion vector of the current block and (ii) thereby the differential motion vector between the motion vector of the current block and the predicted motion vector is not encoded in the bitstream;
determining a motion vector resolution to be applied to a motion vector of either the current block or an image area in which the current block is located,
wherein the motion vector resolution is a fractional pixel precision of a motion vector used for predicting the current block from a reference picture, the fractional pixel precision representing up to which fractional pixel location the reference picture is interpolated;
deciding the predicted motion vector from the one or more motion vectors of the one or more blocks adjacent to the current block;
checking whether (i) a motion vector resolution of the predicted motion vector and (ii) the motion vector resolution determined in the step of the determining of the motion vector resolution are equal to each other;
converting the motion vector resolution of the predicted motion vector such that the converted motion vector resolution of the predicted motion vector is equal to the motion vector resolution determined in the step of the determining of the motion vector resolution, when the motion vector resolution of the predicted motion vector is different from the motion vector resolution determined in the step of the determining of the motion vector resolution;
setting the resolution-converted predicted motion vector as the motion vector of the current block, when the mode information indicates that (i) the motion vector of the current block is identical to the predicted motion vector of the current block and (ii) thereby the differential motion vector between the motion vector of the current block and the predicted motion vector is not encoded in the bitstream.

17. The method of claim 16, wherein the step of the determining of the motion vector resolution comprises: determining the motion vector resolution to be applied to the motion vector of either the current block or the image area in which the current block is located, from the bitstream.

18. The method of claim 16, wherein the step of the determining of the motion vector resolution comprises determining the motion vector resolution to be applied to the motion vector of either the current block or the image area in which the current block is located, as a predetermined motion vector resolution.

19. A method for decoding a motion vector of a current block from a bitstream, the method comprising:

decoding, the motion vector of the current block and mode information related to the motion vector of the current block, wherein the motion vector of the current block is decoded by using a predicted motion vector and a differential motion vector, instead of extracting a value of the motion vector itself of the current block from the bitstream, the predicted motion vector being one or more motion vectors of one or more blocks adjacent to the current block, and the differential motion vector being derived from a difference between the motion vector of the current block and the predicted motion vector, the decoding of the motion vector of the current block comprising:

decoding, from the bitstream, the mode information indicating whether (i) the motion vector of the current block is identical to the predicted motion vector of the current block and (ii) thereby the differential motion vector between the motion vector of the current block and the predicted motion vector is not encoded in the bitstream;

determining a motion vector resolution to be applied to a motion vector of either the current block or an image area in which the current block is located, wherein the motion vector resolution is a fractional pixel precision of a motion vector used for predicting the current block from a reference picture, the fractional pixel precision representing up to which fractional pixel location the reference picture is interpolated;

check whether (i) a motion vector resolution of at least one motion vector among the one or more motion vectors of the one or more blocks adjacent to the current block and (ii) the motion vector resolution determined in the step of the determining of the motion vector resolution are equal to each other;

converting the motion vector resolution of the at least one motion vector such that the converted motion vector resolution of the at least one motion vector is equal to the motion vector resolution determined in the step of the determining of the motion vector resolution, when the motion vector resolution of the at least one motion vector is different from the motion vector resolution determined in the step of the determining of the motion vector resolution;

deciding the predicted motion vector from the one or more motion vectors at least one of which has the converted motion vector resolution; and setting the predicted motion vector as the motion vector of the current block, when the mode information indicates that (i) the motion vector of the current block is identical to the predicted motion vector of the current block and (ii) thereby the differential motion vector between the motion vector of the current block and the predicted motion vector is not encoded in the bitstream.

20. The method of claim 19, wherein the step of the determining of the motion vector resolution comprises determining the motion vector resolution to be applied to the motion vector of either the current block or the image area in which the current block is located, from the bitstream.

* * * * *